:::

United States Patent
Goto et al.

(10) Patent No.: US 9,028,600 B2
(45) Date of Patent: *May 12, 2015

(54) INKJET INK, INKJET RECORDING METHOD, AND INKJET RECORDING DEVICE

(75) Inventors: Hiroshi Goto, Kanagawa (JP); Akihiko Gotoh, Kanagawa (JP); Kiyofumi Nagai, Tokyo (JP); Yuuki Yokohama, Kanagawa (JP); Hidetoshi Fujii, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/004,748

(22) PCT Filed: Mar. 9, 2012

(86) PCT No.: PCT/JP2012/056791
§ 371 (c)(1),
(2), (4) Date: Sep. 12, 2013

(87) PCT Pub. No.: WO2012/124790
PCT Pub. Date: Sep. 20, 2012

(65) Prior Publication Data
US 2014/0002539 A1   Jan. 2, 2014

(30) Foreign Application Priority Data

Mar. 14, 2011 (JP) ................. 2011-055543
Feb. 3, 2012 (JP) ................. 2012-021907

(51) Int. Cl.
*C09D 11/30* (2014.01)
*C09D 11/322* (2014.01)
*C09D 11/38* (2014.01)

(52) U.S. Cl.
CPC .............. *C09D 11/30* (2013.01); *C09D 11/322* (2013.01); *C09D 11/38* (2013.01)

(58) Field of Classification Search
CPC ....... C09D 11/30; C09D 11/322; C09D 11/38
USPC ......... 106/31.43, 31.58, 31.75, 31.86; 347/20
See application file for complete search history.

(56) References Cited

U.S. PATENT DOCUMENTS 5,224,987 A * 7/1993 Matrick ............. 106/31.43

7,919,544 B2   4/2011 Matsuyama et al.
(Continued)

FOREIGN PATENT DOCUMENTS

JP  2004-136458  5/2004
JP  2008-018711  1/2008

(Continued)

OTHER PUBLICATIONS

English translation of JP 2012/107210; Jun. 2012.*

(Continued)

*Primary Examiner* — Helene Klemanski
(74) *Attorney, Agent, or Firm* — Oblon, McClelland, Maier & Neustadt, L.L.P.

(57) ABSTRACT

An inkjet ink, which contains water, an organic solvent, a surfactant, and a colorant, wherein the organic solvent contains at least one polyhydric alcohol having an equilibrium moisture content of 30% by mass or higher at a temperature of 23° C. and humidity of 80% RH, at least an amide compound represented by the general formula (I), and at least one selected from the group consisting of compounds represented by the following general formulae (II) to (IV):

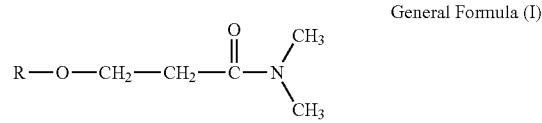

General Formula (I)

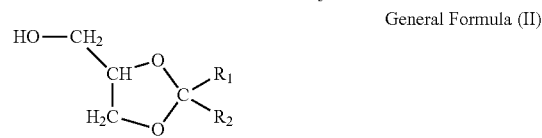

General Formula (II)

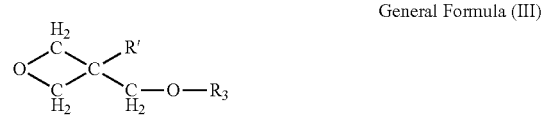

General Formula (III)

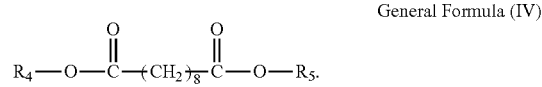

General Formula (IV)

10 Claims, 6 Drawing Sheets

(56) References Cited

U.S. PATENT DOCUMENTS

| | | |
|---|---|---|
| 8,109,622 B2 | 2/2012 | Goto et al. |
| 8,242,201 B2 | 8/2012 | Goto et al. |
| 8,382,271 B2 | 2/2013 | Goto et al. |
| 8,721,034 B2 * | 5/2014 | Yokohama et al. ............. 347/20 |
| 2007/0197685 A1 | 8/2007 | Aruga et al. |
| 2007/0291071 A1 | 12/2007 | Nakazawa et al. |
| 2008/0233363 A1 | 9/2008 | Goto |
| 2010/0196601 A1 | 8/2010 | Goto et al. |
| 2010/0196602 A1 | 8/2010 | Koyano et al. |
| 2010/0295891 A1 | 11/2010 | Goto et al. |
| 2011/0057981 A1 | 3/2011 | Aruga et al. |
| 2011/0069108 A1 | 3/2011 | Fukuda |
| 2011/0102496 A1 | 5/2011 | Fukuda |
| 2011/0292114 A1 * | 12/2011 | Sao et al. ................... 106/31.58 |
| 2012/0207983 A1 * | 8/2012 | Matsuyama et al. ....... 106/31.43 |
| 2013/0002776 A1 * | 1/2013 | Nagashima et al. .......... 347/100 |
| 2013/0071637 A1 * | 3/2013 | Matsuyama et al. ............ 347/20 |
| 2013/0113860 A1 | 5/2013 | Gotou et al. |
| 2013/0155145 A1 * | 6/2013 | Gotou et al. ................... 347/21 |
| 2013/0176369 A1 * | 7/2013 | Gotou et al. .................. 347/100 |
| 2013/0194344 A1 * | 8/2013 | Yokohama et al. ............. 347/20 |
| 2013/0194345 A1 | 8/2013 | Tamai et al. |
| 2013/0323474 A1 * | 12/2013 | Gotou et al. ............... 428/195.1 |
| 2014/0017461 A1 * | 1/2014 | Matsuyama .................. 428/207 |
| 2014/0072779 A1 * | 3/2014 | Matsuyama et al. ....... 428/195.1 |

FOREIGN PATENT DOCUMENTS

| | | | |
|---|---|---|---|
| JP | 2008-163238 | | 7/2008 |
| JP | 2008/163238 | * | 7/2008 |
| JP | 2009-052018 | | 3/2009 |
| JP | 2009-287014 | | 12/2009 |
| JP | 2010-180332 | | 8/2010 |
| JP | 2012/107210 | * | 6/2012 |

OTHER PUBLICATIONS

English translation of JP 2008/163238; Jul. 2008.*
U.S. Appl. No. 14/000,281, filed Aug. 19, 2013, Fujii, et al.
Written Opinion of the International Searching Authority Issued May 29, 2012 in PCT/JP12/056791 Filed Mar. 9, 2012.
International Search Report Issued May 29, 2012 in PCT/JP2012/056791 Filed Mar. 9, 2012.

* cited by examiner

INKJET INK, INKJET RECORDING METHOD, AND INKJET RECORDING DEVICE

TECHNICAL FIELD

The present invention relates to an inkjet ink, an inkjet recording method and an inkjet recording device.

BACKGROUND ART

An inkjet ink containing an aqueous pigment as a colorant has various advantages when it is used for printing on plain paper, such as fewer occurrences of bleeding, high image density, and less occurrences of strike through. In the case a deposition amount of the ink is large, such as printing photographs or diagrams, on plain paper, however, the printed plain paper tends to cause back curling. The back curling is a phenomenon that paper is warped to the opposite side to the side of the printed surface. If the back curling of plain paper occurs just after printing, a transfer failure of the paper occurs in the inkjet printer (within the device) during the paper conveying process. The conveyance of the paper is very difficult especially when the back curling of the paper occurs just after high speed printing or double-sided printing.

Therefore, it has been desired to develop an inkjet ink that gives no or less back curling when it is used with a large deposition amount thereof on plain paper, such as in printing photographs and drawings on plain paper. Especially a high-speed inkjet printer equipped with a line-head has a higher need for such the ink compared to a serial printer.

As the known technique for suppressing curling of paper, there is a method for applying an alcohol solution to paper prior to recording with an ink, allowing the paper to be substantially dry in a recording position, and carrying out recording with the ink (see PTL1). PTL1 teaches that hydroxyl groups of the alcohol solution are bounded to hydroxyl groups present at bonding points of hydrogen bonds between cellulose fibers of paper to block water molecules in the ink with hydrophobic groups of the alcohol solution. However, this method does not give the effect when a large amount of an aqueous ink is ejected during high speed printing, and therefore it has not been able to prevent curing of paper immediately after printing.

Moreover, there is a recording method for ejecting an ink and a reaction solution that reacts with the ink, and in this method the reaction solution is ejected to land on an opposite surface of a recording medium to the surface where the ink is recorded, corresponding to the data identical to the data for recording the ink (see PTL2). In accordance with this method, however, a configuration of a recording device for use is complex, and curling of printed paper cannot be prevented unless a reaction liquid formed of the substantially same formulation to that of the ink is ejected in the same or similar amount to that of the ink. Therefore, this method is economically disadvantageous. As a large amount of water is contained on both sides of paper when a solid image is printed on almost the entire area of the paper, the paper loses its stiffness, which makes it to difficult to convey the paper.

Further, PTL3 discloses an inkjet ink composition containing diglycerin or polyglycerin in combination with polyethylene glycol monoalkyl ether, and PTL4 discloses an inkjet ink composition containing polyethylene glycol monomethyl ether. This inkjet ink composition however does not exhibit any effect of preventing curling of paper when the aqueous ink is ejected in a large amount with high-speed printing. Therefore, the proposed inkjet ink composition does not satisfy the demands for preventing curling of paper just after being printed. Since the organic solvent contained in the inkjet ink composition has low equilibrium moisture content, moreover, the ink composition cannot secure ejection stability.

CITATION LIST

Patent Literature

PTL 1: Japanese Patent Application Laid-Open (JP-A) No. 2004-136458
PTL 2: JP-A No. 2008-18711
PTL 3: JP-A No. 2009-52018
PTL 4: JP-A No. 2009-287014

SUMMARY OF INVENTION

Technical Problem

The present invention aims to provide an inkjet ink capable of suppressing curling of plain paper just after being printed with the ink, and having excellent ejection stability, and to provide an inkjet recording method, and an inkjet recording device.

Solution to Problem

Means for solving the aforementioned problems are as follows:

An inkjet ink, which contains:
water;
an organic solvent;
a surfactant; and
a colorant,
wherein the organic solvent contains
at least one polyhydric alcohol having an equilibrium moisture content of 30% by mass or higher at a temperature of 23° C. and humidity of 80% RH,
at least an amide compound represented by the general formula (I), and
at least one selected from the group consisting of compounds represented by the following general formulae (II) to (IV):

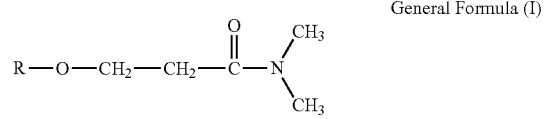

General Formula (I)

where R is a C4-C6 alkyl group,

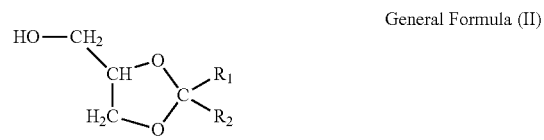

General Formula (II)

where $R_1$ is a hydrogen atom or a C1-C2 alkyl group, and $R_2$ is a C1-C4 alkyl group, General Formula (III)

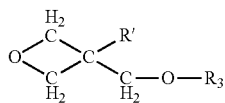

where R' is a C1-C2 alkyl group, and $R_3$ is a hydrogen atom, a C1-C8 alkyl group, a cyclic alkyl group, or an aromatic group, General Formula (IV)

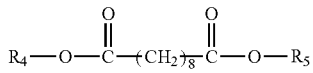

where $R_4$ and $R_5$ are both a C1-C8 alkyl group.

Since the organic solvent for use in the inkjet ink of the present invention contains at least one polyhydric alcohol having an equilibrium moisture content of 30% by mass or higher at a temperature of 23° C. and humidity of 80% RH, at least an amide compound represented by the general formula (I), and at least one selected from the group consisting of compounds represented by the following general formulae (II) to (IV), cockling and curling just after printing the ink can be reduced, which realizes excellent image formation of excellent image quality on plain paper, excellent correspondence to high speed printing, and excellent ejection stability.

Moreover, by using, as the colorant for use in the inkjet ink of the present invention, a self-dispersible pigment on a surface of which a functional group is provided, preferably the functional group being at least one selected from the group consisting of —COOM, —$SO_3$M, —$PO_3$HM, —$PO_3M_2$, —CONM2, —$SO_3NM_2$, —NH—$C_6H_4$—COOM, —NH—$C_6H_4$—$SO_3$M, —NH—$C_6H_4$—$PO_3$HM, —NH—$C_6H_4$—$PO_3M_2$, —NH—$C_6H_4$—$CONM_2$, and —NH—$C_6H_4$—$SO_3NM_2$ (M is a quaternary ammonium ion), there can be provided an inkjet ink having particularly high storage stability over time, and capable of suppressing the viscosity increase of the ink when the moisture is evaporated. It is presumed that use of the functional group using the quaternary ammonium as a counter ion in the inkjet ink enables to stably maintain the dispersion state of the water-dispersible pigment ether in the water-rich ink, or in the organic solvent-rich ink.

Further, by using a modified pigment as the colorant, preferably a modified pigment which has been modified with a geminal bisphosphonic acid group or a geminal bisphosphonate group, an inkjet ink having particularly high storage stability over time, and capable of suppressing the viscosity increase of the ink when the moisture is evaporated. It is presumed that the modification of the surface of the pigment with the geminal bisphosphonic acid group or geminal bisphosphonate group enables to stably maintain the dispersion state of the water-dispersible pigment ether in the water-rich ink, or in the organic solvent-rich ink.

When a common printing sheet is used for printing, high quality images having less beading (unevenness in image density), having excellent drying properties can be formed for printed images. Note that, the common printing sheet mentioned above is a recording medium which contains a support and a coating layer formed on at least one surface of the support, and has low ink absorption, i.e. an amount of pure water transferred to the recording medium as measured by a dynamic scanning absorptometer being 1 mL/m$^2$ to 35 mL/m$^2$ with contact duration of 100 ms, being 3 mL/m$^2$ to 40 mL/m$^2$ with contact duration of 400 ms.

The ink media set for use in the present invention contains the inkjet ink of the present invention and recording media. The recording medium contains a support, and a coating layer coated on at least one surface of the support, and a transferred amount of pure water to the recording medium as measured by a dynamic scanning absorptometer is 1 mL/m$^2$ to 35 mL/m$^2$ with contact duration of 100 ms, and is 3 mL/m$^2$ to 40 mL/m$^2$ with contact duration of 400 ms. As a result of this configuration of the recording medium in combination with the ink, it is possible to carry out image formation of high quality images for printing images, with excellent drying properties, without causing beading (density unevenness).

The ink cartridge for use in the present invention contains a container, and the inkjet ink of the present invention housed in the container. The ink cartridge is preferably used in printers of inkjet recording system. Use of the ink housed in the ink cartridge makes it possible to reduce the curling degree of plain paper just after printing, and to provide excellent images of image quality on plain paper corresponding to high speed printing. Moreover, it can reduce beading (unevenness in image density) of an image formed on a printing gloss paper, and the ink has excellent drying properties as well as excellent ejection stability from a nozzle, to thereby realize image recording of the quality similar to that of vivid prints.

The inkjet recording method of the present invention contains at least an ink jetting step, where the ink jetting step is applying stimuli to the inkjet ink of the present invention to make the inkjet ink jet to thereby form an image on a recording medium. In accordance with the inkjet recording method, stimuli (energy) is applied to the inkjet ink of the present invention, in the ink jetting step, to make the inkjet ink jet to form an image on a recording medium. Therefore, the inkjet recording method produces images of significantly improved color saturation, and excellent coloring ability even when the images are formed on plain paper. Further, the inkjet recording method of the invention can provide vivid images close to images of industrial prints, with less occurrences of beading (unevenness in image density) on gloss printing paper, excellent drying properties, drying speed, and correspondence to high speed printing, and desirable ejection stability of the ink from nozzles.

The inkjet recording device of the present invention contains at least an ink jetting unit configured to apply stimuli (energy) to the inkjet ink of the present invention to make the ink jet to form an image on a recording medium. In the inkjet recording device, the ink jetting unit applies stimuli (energy) to the inkjet ink of the present invention to make the ink jet to form an image on a recording medium. As a result, the formed image has significantly improved color saturation, and excellent coloring ability when the image is formed on plain paper. Further, the inkjet recording device can form vivid images close to images of industrial prints, with less occurrences of beading (unevenness in image density) on gloss printing paper, excellent drying properties, drying speed, and correspondence to high speed printing, and desirable ejection stability of the ink from nozzles.

Advantageous Effects of Invention

As it will be made clear through the descriptions below, the present invention can solve the various problems in the art, and provide an inkjet ink capable of suppressing curling of plain paper just after being printed with the ink, yielding excellent quality images, and having excellent response to high-speed printing, excellent ejection stability, and drying properties on general printing sheets, as well as providing an inkjet recording method, and an inkjet recording device.

BRIEF DESCRIPTION OF DRAWINGS

FIG. 6A is a schematic diagram of an elementary fibril, FIG. 6B is a schematic diagram of a cellulose molecule, and FIG. 6C is a diagram illustrating hydrogen bonds (α), (β) and (γ) formed between two cellulose molecules.

DESCRIPTION OF EMBODIMENTS

Inkjet Ink

Figure 1:
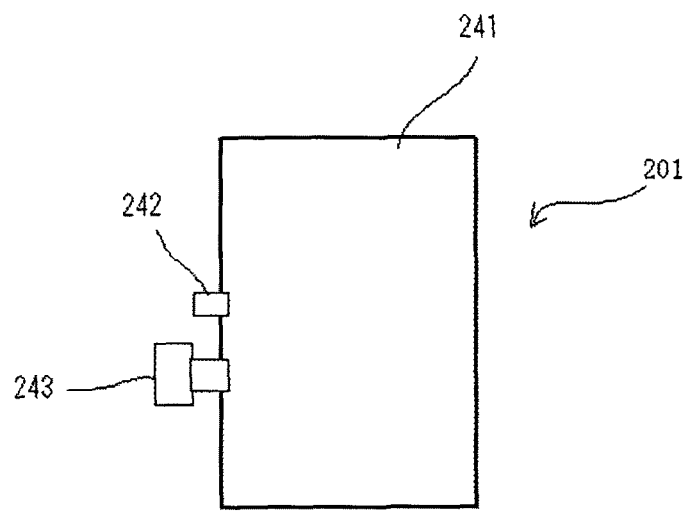
FIG. 1 is a schematic diagram illustrating one example of an ink cartridge for use in the present invention.

The present invention will be specifically explained hereinafter.

The inkjet ink of the present invention contains at least water, an organic solvent, a surfactant, and a colorant, and may further contain a penetrating agent, a water-dispersible resin, and other substances, if necessary.

<Organic Solvent>

The inkjet ink contains, as the organic solvent, at least one polyhydric alcohol having an equilibrium moisture content of 30% by mass or higher at a temperature of 23° C. and humidity of 80% RH, at least an amide compound represented by the general formula (I), and at least one selected from the group consisting of compounds represented by the following general formulae (II) to (IV). Use of these compounds as the organic solvent in the inkjet ink can suppress curling of paper just after printing, to thereby realize an inkjet ink capable of providing high quality images. This is because the organic solvent (e.g. the amide compound represented by the general formula (I) and the compounds represented by the general formulae (II) to (IV)) is unlikely to cleave hydrogen bonds between cellulose molecules of the paper when the organic solvent penetrates into the space between the cellulose molecules.

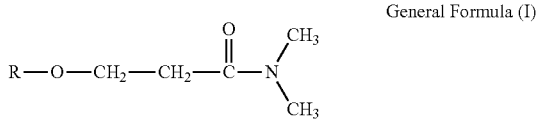

General Formula (I)

In the general formula (I), R is a C4-C6 alkyl group.

Examples of the C4-C6 alkyl group include a butyl group, an isobutyl group, a tertiary butyl group, a pentyl group, an isopentyl group, a hexyl group, and an isohexyl group.

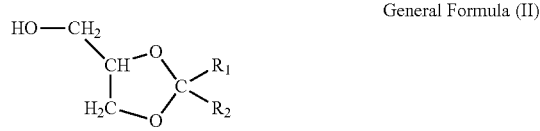

General Formula (II)

In the general formula (II), $R_1$ is a hydrogen atom or a C1-C2 alkyl group, and $R_2$ is a C1-C4 alkyl group.

Examples of the C1-C2 alkyl group include a methyl group, and an ethyl group.

Examples of the C1-C4 alkyl group include a methyl group, an ethyl group, a propyl group, an isopropyl group, a butyl group, an isobutyl group, and a tertiary butyl group.

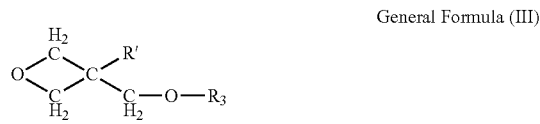

General Formula (III)

In the general formula (III), R' is a C1-C2 alkyl group, and $R_3$ is a hydrogen atom, a C1-C8 alkyl group, a cyclic alkyl group, or an aromatic group.

Examples of the C1-C2 alkyl group represented by R' include a methyl group, and an ethyl group.

Examples of the C1-C8 alkyl group represented by $R_3$ include a methyl group, an ethyl group, a propyl group, an isopropyl group, a butyl group, an isobutyl group, a tertiary butyl group, a pentyl group, an isopentyl group, a hexyl group, an isohexyl group, a heptyl group, an isoheptyl group, an octyl group, and an isooctyl group.

Examples of the cyclic alkyl group represented by $R_3$ include a cyclopropyl group, a cyclobutyl group, a cyclopentyl group, a cyclohexyl group, a cycloheptyl group, and a cyclooctyl group.

Examples of the aromatic group represented by $R_3$ include a phenyl group, a tolyl group, and a xylyl group.

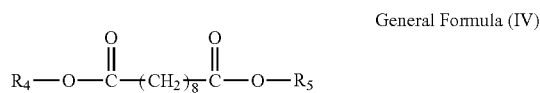

General Formula (IV)

In the general formula (IV), $R_4$ and $R_5$ are both a C1-C8 alkyl group.

Examples of the C1-C8 alkyl group include a methyl group, an ethyl group, a propyl group, an isopropyl group, a butyl group, an isobutyl group, a tertiary butyl group, a pentyl group, an isopentyl group, a hexyl group, an isohexyl group, a heptyl group, an isoheptyl group, an octyl group, and an isooctyl group.

Specific examples of the compounds represented by the general formulae (I) to (IV) are listed below, but not limited to these examples.

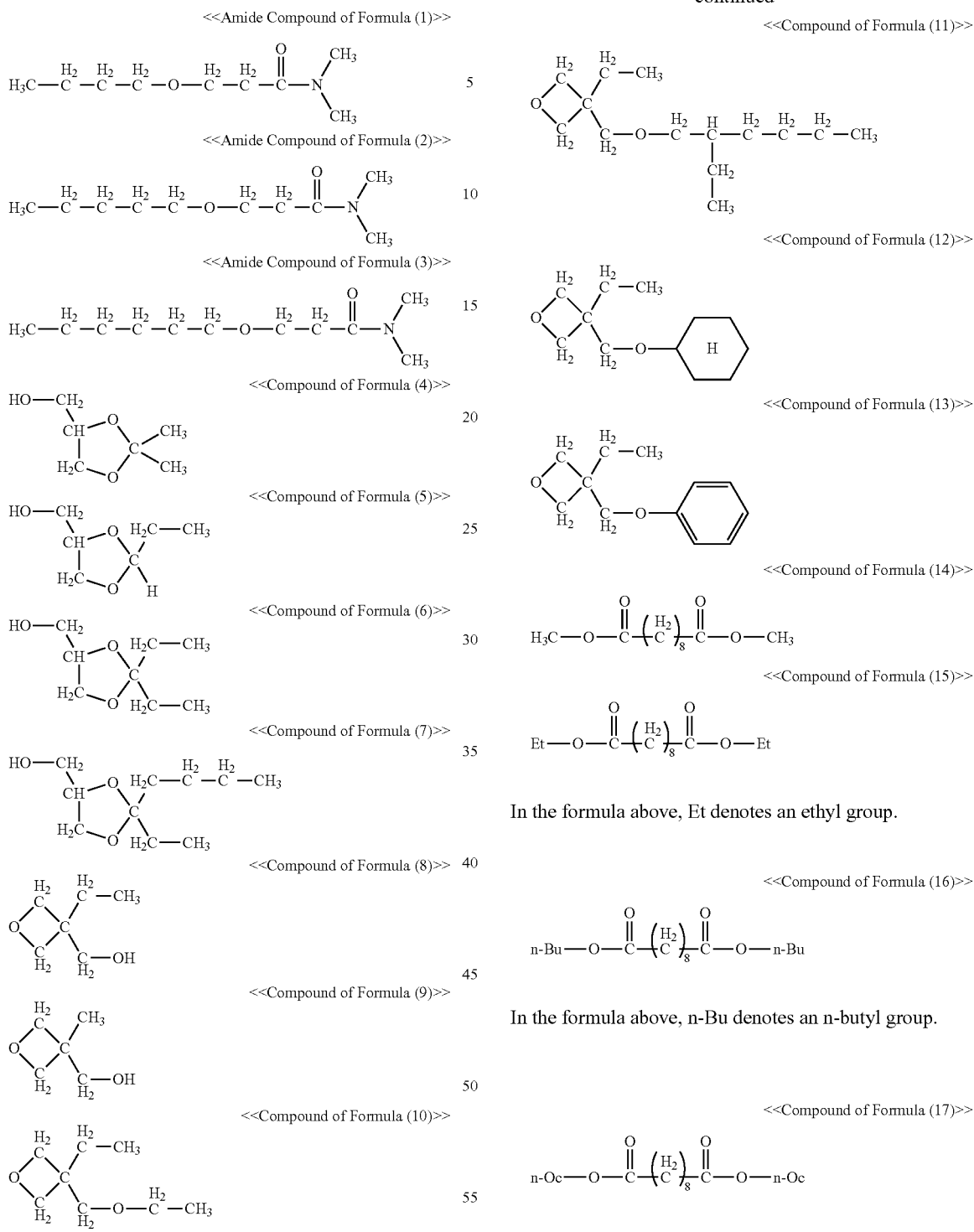

It is preferred in the present invention that as the organic solvent, at least one polyhydric alcohol having an equilibrium moisture content of 30% by mass or higher at the temperature of 23° C. and the humidity of 80% RH, at least the amide compound represented by the formula (1) above, and at least one selected from the compounds represented by the formulae (4), (8) and (18) be used in mixture.

Regarding a balance between hydrophilicity and hydrophobicity, the amide compound represented by the formula (1) and the compounds represented by the formulae (4), (8), and (18) lie on the hydrophobic side compared to the conventional organic solvent (e.g., glycerin, and butanediol), and have a low proportion of a hydrophilic group capable of forming a hydrogen bond (e.g. a hydroxyl group) within a molecule. Moreover, these solvents do not easily cleave a hydrogen bond between cellulose molecules even when they are penetrated into the space between cellulose molecules. This model can be simply referred to as "low aggressiveness to a hydrogen bond between cellulose molecules."

As the aforementioned organic solvent of the hydrophobic side has a low surface tension, it primary penetrates between cellulose molecules. The amide compound represented by the formula (1) is, as illustrated with the hydrogen bond (γ) of FIG. 6C mentioned below, forms a hydrogen bond between the amide group thereof and a hydroxyl group of a cellulose molecule to stay with the cellulose molecule part, and covers the hydrogen bond of the cellulose molecule with a hydrophilic group in the alkyl group part of the amide compound, to thereby inhibit a contact of the cellulose with water which is a volatile hydrophilic group-rich solvent. In this manner, the amide compound represented by the formula (1) makes cleavage of hydrogen bonds between cellulose molecules difficult. Similarly, a hydroxyl group, carbonyl group, or ether bond of the compounds represented by the formulae (4), (8), and (18) has the same effect to that of the amide group of the amide compound represented by the formula (1). This model can be simply referred to as "properties for covering hydrogen bonds of cellulose molecules".

The solvents that cover hydrogen bonds of cellulose molecules and inhibit any contact with an aqueous continuous phase (e.g., alcohol, and water) are the amide compound represented by the formula (1) and compounds represented by the formulae (4), (8), and (18). The organic solvent that is an auxiliary solvent to exhibit the aforementioned effect is, for example, alkyl alkane diol, or a glycol ether compound. Therefore, the ink containing these solvents as the organic solvents does not easily cause precipitation of the solids content thereof, solidification thereof, and reduction in fluidity thereof (i.e. the ink can maintain the ejection stability) even if water in the ink is evaporated.

Here, a difference in an effect to the interaction between cellulose molecules between water and a water-soluble organic material is explained with reference to FIGS. 6A to 6C.

Figure 6A:
FIGS. 6A to 6C are diagrams for explaining one example of a difference in an effect to the interaction between cellulose molecules between water and a water-soluble organic material containing a hydroxyl group.

FIG. 6A is a schematic diagram illustrating an elementary fibril. A plant fiber is formed of a thread structure called a fibril, the fibril is formed of microfibrils each having a diameter of several nanometers to 20 nm, and length of 1 μm to several micrometers, and each microfibril is formed of a few to several tens elementary fibrils.

Figure 6B:
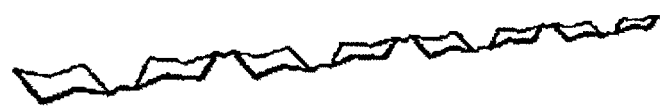

FIG. 6B is a schematic diagram illustrating a cellulose molecule. The elementary fibril is formed of several tens of lines in each of which cellulose molecules are aligned. Here, hydrogen bonds are formed between the adjacent cellulose molecules to form a bundle having a diameter of about 3 nm to about 4 nm.

Figure 6C:
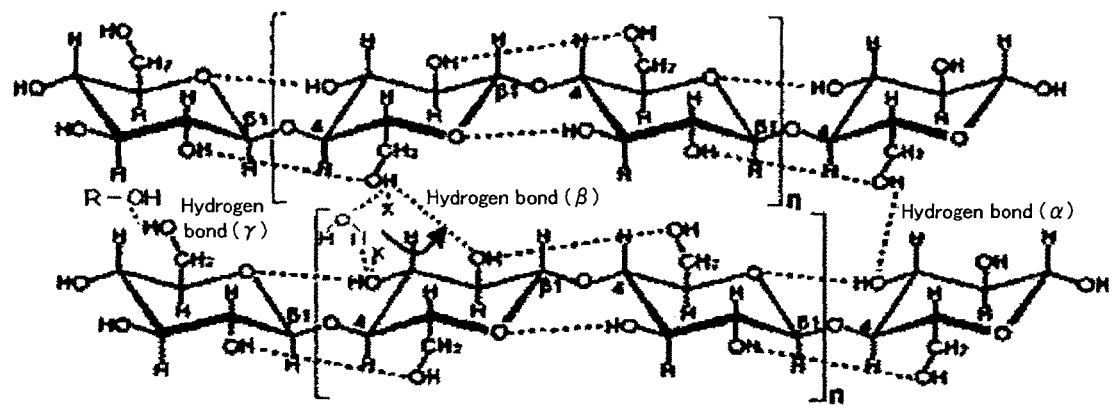

FIG. 6C is a model diagram illustrating embodiments of hydrogen bonds (α), (β) and (γ) formed between two cellulose molecules. The dotted line represents a hydrogen bond, and R represents a lipohilic group. The hydrogen bond (α) illustrates a normal state of a hydrogen bond between cellulose molecules. The hydrogen bond (β) illustrates the state where a water molecule is present in the hydrogen bond between the cellulose molecules, and the position of the hydrogen bond is shifted as the moisture evaporates. This phenomenon will be more specifically explained hereinafter. Once the bond between cellulose molecules is cleaved as illustrated in the drawing when water permeates paper, fibers of paper loosen and are elongated (back curling phenomenon). Then, if the water disappears due to drying or moving from there, the fibers shrink and the once cleaved hydrogen bonds are rebonded. In the course of rebonding the hydrogen bonds, however, pressure is not naturally applied to the paper unlike the time when the paper is produced, and the hydrogen bonds are formed in the free and loose state of the fibers in the drying process. Therefore, the paper forms a different form to the original form, i.e. causing face curling of the paper (the face curling is a phenomenon that the paper curls towards the surface on which images are formed or printed with the aqueous ink). The hydrogen bond (γ) illustrates a state where a hydrophilic group (amide group) of the amide compound represented by the formula (1) and a hydrophilic group (hydroxyl group, carbonyl group, or ether bond) of the compounds represented by the formulae (4), (8), and (18) are present at the hydroxyl groups of cellulose molecules where no hydrogen bond is formed to thereby inhibit approach of water molecules between cellulose molecules.

As mentioned above, the amide compound represented by the formula (1) and the compounds represented by the formulae (4), (8), and (18) are hydrophobic group rich in terms of a balance between hydrophilic groups and hydrophobic groups, and have within the molecule thereof low proportion of hydroxyl groups, which are hydrophilic groups, capable of forming hydrogen bonds. Therefore, these compounds do not easily cleave hydrogen bonds between cellulose molecules even when they permeate between cellulose molecules.

An amount of the amide compound represented by the general formula (I) in the inkjet ink is preferably 1% by mass to 50% by mass, more preferably 2% by mass to 40% by mass. When the amount thereof is smaller than 1% by mass, the resulting ink does not have an effect of suppressing curling of paper, an effect of improving image quality, and an effect of improving drying properties on general printing sheets. When the amount thereof is larger than 50% by mass, the resulting ink increases its viscosity, resulting in undesirable ejection stability of the ink.

Moreover, an amount of the compounds represented by the general formulae (II) to (IV) used in combination with the amide compound represented by the general formula (I) is preferably 1% by mass to 50% by mass, more preferably 2% by mass to 40% by mass. When the amount thereof is smaller than 1% by mass, the resulting ink does not have an effect of suppressing curling of paper, an effect of improving image quality, and an effect of improving drying properties on general printing sheets. When the amount thereof is larger than 50% by mass, the resulting ink increases its viscosity, resulting in undesirable ejection stability of the ink.

Further, as for the organic solvent for auxiliary exhibiting an effect of suppressing curling, there is alkyl alkane diol. As long as the alkyl alkane diol has a main chain of C3-C6 alkane diol and a branched chain of C1-C2 alkyl, the balance between the hydrophilic groups and hydrophobic groups falls in the hydrophobic groups rich side, as well as alkyl alkane diol being water soluble, and thus it desirably exhibits the aforementioned models "low aggressiveness to a hydrogen bond between cellulose molecules" and "properties for covering hydrogen bonds of cellulose molecules." Among them, 2-methyl-1,3-propanediol (bp: 214° C.), 3-methyl-1,3-butanediol (bp: 203° C.), 3-methyl-1,5-pentanediol (bp: 250° C.), and 2-ethyl-1,3-hexanediol (bp: 243.2° C.) are preferable.

An amount of the alkyl alkane diol in the inkjet ink is preferably 2% by mass to 40% by mass, more preferably 5% by mass to 30% by mass. When the amount thereof is smaller than 2% by mass, the resulting ink does not have an effect of suppressing curling of paper, an effect of improving image quality, and an effect of improving drying properties on general printing sheets. When the amount thereof is larger than 40% by mass, the resulting ink increases its viscosity, resulting in undesirable ejection stability of the ink.

The organic solvent used by mixing with curling suppressing solvents (e.g. the amide compound represented by the general formula (I), the compounds represented by the general formulae (II) to (IV), and the alkyl alkane diol) includes an amide compound represented by the structural formula (V).

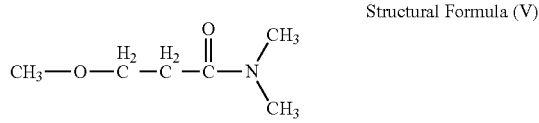

Structural Formula (V)

The amide compound represented by the structural formula (V) has a high boiling point (bp), i.e. 216° C., high equilibrium moisture content (EMC) at the temperature of 23° C. and relative humidity of 80%, i.e. 39.2% by mass, and very low fluid viscosity at 25° C., i.e. 1.48 mPa·s. Since the amide compound represented by the structural formula (V) is very easily dissolved in the organic solvent (e.g. the amide compound represented by the general formula (I), compounds represented by the general formulae (II) to (IV), and alkyl alkane diol) and water, the resulting inkjet ink can results in low viscosity. Therefore, the amide compound represented by the structural formula (V) is very preferable as an organic solvent for use in the inkjet ink. The inkjet ink containing the amide compound represented by the structural formula (V) has a high equilibrium moisture content, and low viscosity, and thus it has desirable storage stability and ejection stability, as well as being a suitable ink used with a maintenance device of an inkjet device.

An amount of the amide compound represented by the structural formula (V) in the inkjet ink is preferably 1% by mass to 50% by mass, more preferably 2% by mass to 40% by mass. When the amount thereof is smaller than 1% by mass, the amide compound represented by the structural formula (V) does not exhibit a sufficient effect of reducing the viscosity of the resulting ink, resulted in low ejection stability of the ink. When the amount thereof is larger than 50% by mass, the drying properties of the resulting ink on paper are not sufficient, which may cause formation of low character quality of a resulting image on plain paper.

Moreover, the organic solvent used together with the amide compound represented by the structural formula (V) is preferably a water-soluble organic solvent. Such the organic solvent includes at least one polyhydric alcohol having an equilibrium moisture content of 30% by mass or higher at the temperature of 23° C., humidity of 80% RH. Examples of the organic solvent preferably include the high equilibrium moisture content and high boiling point wetting agent A (the wetting agent A is a wetting agent having an equilibrium moisture content of 30% by mass or higher at the temperature of 23° C., and humidity of 80% RH and a boiling point of 250° C. or higher, and the equilibrium moisture content of the wetting agent A is preferably 40% by mass or higher), and a high equilibrium moisture content but low boiling point wetting agent B (the wetting agent B is a wetting agent having an equilibrium moisture content of 30% by mass or higher at 23° C., 80% RH, and boiling point of 140° C. to 250° C.).

Among the polyhydric alcohols, examples of the wetting agent A having a boiling point of higher than 250° C. under normal pressure include 1,2,3-butanetriol (bp: 175° C./33 hPa, EMC: 38% by mass), 1,2,4-butanetriol (bp: 190-191° C./24 hPa, EMC: 41% by mass), glycerin (bp: 290° C., EMC: 49% by mass), diglycerin (bp: 270° C./20 hPa, EMC: 38% by mass), triethylene glycol (bp: 285° C., EMC: 39% by mass), and tetraethylene glycol (bp: 324° C.-330° C., EMC: 37% by mass). Examples of the wetting agent B having the boiling point of 140° C. to 250° C. include diethylene glycol (bp: 245° C., EMC: 43% by mass), and 1,3-butanediol (bp: 203° C.-204° C., EMC: 35% by mass).

These wetting agent A and wetting agent B are both highly hygroscopic materials, each having an equilibrium moisture content of 30% by mass or higher at the temperature of 23° C., relative humidity of 80%. However, it is also true that the wetting agent B has a relatively higher vaporizability than that of the wetting agent A.

The polyhydric alcohol is particularly preferably is selected from the group consisting of glycerin, and 1,3-butanediol.

When the wetting agent A and the wetting agent B are used in combination, a ratio (mass ratio) B/A of the wetting agent B to the wetting agent A cannot be determined unconditionally because it more or less depends on an amount of another wetting agent C, which will be described later, or other additives for use (e.g. a penetrating agent) and amounts thereof. For example, the ratio B/A is preferably in the range of 10/90 to 90/10.

The equilibrium moisture content described here is an equilibrium moisture content measured using a potassium chloride-saturated aqueous solution and a desiccator in the following manner. The internal temperature of the desiccator is maintained at 23° C.±1° C. and the internal humidity thereof is maintained at 80% RH±3% RH. Then, each sample of the organic solvents is weighed by 1 g and placed on a dish, and the dish is placed in the desiccator and stored until there is no more change in mass of the sample, and an equilibrium moisture content of the sample can be determined by the following equation.

Equilibrium moisture content(%)=Amount of water absorbed into organic solvent/(Amount of organic solvent+Amount of water absorbed into organic solvent)×100

Use of the polyhydric alcohol in an amount of 50% by mass or larger relative to the total amount of the organic solvent is preferable as the resulting ink has desirable ejection stability, and is excellent in suppressing waste ink depositions in a maintenance device of an inkjet device.

In the inkjet ink of the present invention, other than the wetting agent A and the wetting agent B, other wetting agents C (for example, the wetting agent C is typically a wetting agent having an equilibrium moisture content of less than 30% by mass at 23° C., 80% RH) can be used partially replacing with the wetting agents A and B, or in combination with the wetting agents A and B.

Examples of the wetting agent C include polyhydric alcohols, polyhydric alcohol alkyl ethers, polyhydric alcohol aryl ethers, nitrogen-containing heterocyclic compounds, amides, amines, sulfur-containing compounds, propylene carbonate, ethylene carbonate, and other wetting agents.

Examples of the polyhydric alcohols include dipropylene glycol (bp: 232° C.), 1,5-pentanediol (bp: 242° C.), propylene glycol (bp: 187° C.), 2-methyl-2,4-pentanediol (bp: 197° C.), ethylene glycol (bp: 196° C.-198° C.), tripropylene glycol (bp: 267° C.), hexylene glycol (bp: 197° C.), polyethylene glycol (viscous liquid to solid), polypropylene glycol (bp: 187° C.), 1,6-hexanediol (bp: 253° C.-260° C.), 1,2,6-hexanetriol (bp: 178° C.), trimethylol ethane (solid, mp: 199° C.-201° C.), and trimethylol propane (solid, mp: 61° C.).

Examples of the polyhydric alcohol alkyl ethers include ethylene glycol monoethyl ether (bp: 135° C.), ethylene glycol monobutyl ether (bp: 171° C.), diethylene glycol monomethyl ether (bp: 194° C.), diethylene glycol monoethyl ether (bp: 197° C.), diethylene glycol monobutyl ether (bp: 231° C.), ethylene glycol mono-2-ethylhexyl ether (bp: 229° C.), and propylene glycol monoethyl ether (bp: 132° C.).

Examples of the polyhydric alcohol aryl ethers include ethylene glycol monophenyl ether (bp: 237° C.), and ethylene glycol monobenzyl ether.

Examples of the nitrogen-containing heterocyclic compounds include 2-pyrrolidone (bp: 250° C., mp: 25.5° C., EMC: 47% by mass to 48% by mass), N-methyl-2-pyrrolidone (bp: 202° C.), 1,3-dimethyl-2-imidazolidinone (bp: 226° C.), ε-caprolactam (bp: 270° C.), and γ-butyrolactone (bp: 204° C.-205° C.).

Examples of the amides include formamide (bp: 210° C.), N-methylformamide (bp: 199° C.-201° C.), N,N-dimethylformamide (bp: 153° C.), and N,N-diethylformamide (bp: 176° C.-177° C.).

Examples of the amines include monoethanolamine (bp 170° C.), diethanolamine (bp: 268° C.), triethanolamine (bp: 360° C.), N,N-dimethylmonoethanolamine (bp: 139° C.), N-methyldiethanolamine (bp: 243° C.), N-methylethanolamine (bp: 159° C.), N-phenylethanolamine (bp: 282° C.-287° C.), and 3-aminopropyldiethyl amine (bp: 169° C.).

Examples of the sulfur-containing compounds include dimethyl sulfoxide (bp: 139° C.), sulfolane (bp: 285° C.), and thiodiglycol (bp: 282° C.).

As for other solid wetting agents, saccharides are preferable.

Examples of the saccharides include monosaccharides, disaccharides, oligosaccharides (including trisaccharides, and tetrasaccharides), and polysaccharides. Specific examples thereof include glucose, mannose, fructose, ribose, xylose, arabinose, galactose, maltose, cellobiose, lactose, sucrose, trehalose, and maltotriose. Here, the above-mentioned polysaccharides mean saccharides in a broad sense, which may include materials existing widely in nature, such as α-cyclodextrin and cellulose. Moreover, other examples include derivatives of saccharides such as reducing sugars of saccharides (e.g., sugar alcohol, which is represented by the general formula: $HOCH_2(CHOH)_nCH_2OH$, where n is an integer of 2 to 5), oxidized sugars (e.g., aldonic acids and uronic acids), amino acids, and thio acids. Among these, sugar alcohol is preferable. Specific examples of sugar alcohol include maltitol and sorbitol.

A mass ratio between the pigment and the wetting agent largely affects ejection stability of the ink from a head, and also affects prevention of waste ink depositions in a maintenance device of an inkjet device. When a solid content of the pigment is large considering a small amount of the wetting agent, evaporation of the moisture of the ink near the ink meniscus of nozzles proceeds, and as a result, ejection defects may be caused.

As for organic solvents used in combination with the amide compound represented by the general formula (I), compounds represented by the general formulae (II) to (IV), the alkyl alkane diol, and the amide compound represented by the structural formula (V), there is an organic solvent including the wetting agents A, B, and C. An amount of the organic solvent including the wetting agents A, B, and C in the inkjet ink is preferably 20% by mass to 80% by mass, more preferably 30% by mass to 70% by mass.

When the amount thereof is smaller than 20% by mass, the effect of suppressing curling cannot be exhibited, and it may adversely affect the ejection stability, and prevention of waste ink depositions in a maintenance device.

When the amount thereof is larger than 80% by mass, the viscosity of the resulting inkjet ink because very high, which may make it difficult to eject the ink from an inkjet device. In addition, drying properties of the resulting ink on paper may be impaired, which may degrade qualities of printed characters on paper.

<Colorant>

Preferable embodiments where the colorant is a pigment include the following first to third embodiments.

(1) In the first embodiment, the colorant contains a dispersion liquid containing a pigment (may also referred to as "self-dispersible pigment" hereinafter), which has at least one hydrophilic group on a surface thereof, and exhibits dispersibility in water without a dispersant.

(2) In the second embodiment, the colorant contains a polymer emulsion (an aqueous dispersion liquid containing polymer particles each including a pigment) in which a water-insoluble or poorly soluble pigment is contained in each polymer particles.

As the pigment, an organic pigment, or an inorganic pigment can be used. Note that, the colorant may contain a dye in combination with the pigment for the purpose of adjusting the color tone, as long as the dye does not degrade the weather resistance of the resulting ink.

Examples of the inorganic pigment include titanium oxide, iron oxide, calcium carbonate, barium sulfate, aluminum hydroxide, barium yellow, cadmium red, chrome yellow, and carbon black. Among them, the carbon black is particularly preferable. Examples of the carbon black include those produced by the conventional methods such as a contact method, furnace method and thermal method.

Examples of the organic pigment include an azo pigment, polycyclic pigment, dye chelate, nitro pigment, nitroso pigment, and aniline black. Among them, the azo pigment, and polycyclic pigment are more preferable. Examples of the azo pigment include azo lake, an insoluble azo pigment, a condensed azo pigment, and a chelate azo pigment. Examples of the polycyclic pigment include a phthalocyanine pigment, a perylene pigment, a perynone pigment, an anthraquinone pigment, a quinacridon pigment, a dioxazine pigment, an indigo pigment, a thioindigo pigment, an isoindolinone pigment, and a quinophthalone pigment. Examples of the dye chelate include a basic dye chelate, and an acidic dye chelate.

A color of the colorant is appropriately selected depending on the intended purpose without any restriction, and examples thereof include a colorant for black, and a colorant for colors. These may be used independently, or in combination.

Examples of the colorant for black include: carbon blacks (C.I. Pigment Black 7) such as furnace black, lamp black, acetylene black, and channel black; metals such as copper, iron (C.I. Pigment Black 11), and titanium oxide; and organic pigments such as aniline black (C.I. Pigment Black 1).

Examples of the commercial products of the carbon black include carbon black obtained from Cabot Corporation under the trade names of Regal®, Black Pearls®, Elftex®, Monarch®, Mogul®, and Vulcan®.

Examples of the colorant for colors include: C.I. Pigment Yellow 1, 3, 12, 13, 14, 17, 24, 34, 35, 37, 42 (yellow iron oxides), 53, 55, 74, 81, 83, 95, 97, 98, 100, 101, 104, 408, 109, 110, 117, 120, 128, 138, 150, 151, 153, 155, 183, 213; C.I. Pigment Orange 5, 13, 16, 17, 36, 43, 51; C.I. Pigment Red 1, 2, 3, 5, 17, 22, 23, 31, 38, 48:2, 48:2 (Permanent Red 2B(Ca)), 48:3, 48:4, 49:1, 52:2, 53:1, 57:1 (Brilliant Carmine 6B), 60:1, 63:1, 63:2, 64:1, 81, 83, 88, 101 (colcothar), 104, 105, 106, 108 (Cadmium Red), 112, 114, 122 (quinacridon magenta), 123, 146, 149, 166, 168, 170, 172, 177, 178, 179, 185, 190, 193, 209, 219; C.I. Pigment Violet 1 (Rhodamine Lake), 3, 5:1, 16, 19, 23, 38; C.I. Pigment Blue 1, 2, 15 (phthalocyanine blue), 15:1, 15:2, 15:3 (phthalocyanine blue), 15:4 (phthalocyanine blue), 16, 17:1, 56, 60, 63; C.I. Pigment Green 1, 4, 7, 8, 10, 17, 18, 36. Other suitable pigments for use are disclosed in The Color Index, 3rd edit. (The Society of Dyers and Colourists, 1982).

—Colorant of First Embodiment—

The self-dispersible pigment of the first embodiment is a pigment whose surface has been modified so that at least one hydrophilic group is, directly or via another atom group, combined with the surface of the pigment. To achieve the surface modification, for example, the following methods are employed: a method in which a specific functional group (functional group such as a sulfone group and a carboxyl group) is chemically combined with the surface of a pigment, or a method in which the surface of a pigment is subjected to wet oxidization treatment using at least one of a hypohalous acid or a salt thereof. Among them, the embodiment where a carboxyl group is bonded to a surface of the pigment, which is dispersed in water, is particularly preferable. Since the self-dispersible pigment of the first embodiment has a surface modified in the manner mentioned above, and a carboxyl group bonded to the surface thereof, not only the dispersion stability but also higher print quality can be obtained, and the water resistance of recording media after printing is further improved.

An ink containing the self-dispersible pigment of the first embodiment is excellent in re-dispersibility after being dried, and thus excellent printing can be performed easily with a simple cleaning operation without causing clogging, even when the printing operation is stopped for a long period, and the moisture in the ink presented near the inkjet head nozzle is evaporated.

The volume average particle diameter ($D_{50}$) of the self-dispersible pigment in the ink is preferably 0.01 μm to 0.16 μm.

As the self-dispersible carbon black, for example, a self-dispersible carbon black having ionicity is preferable, and an anionically or cationically charged self-dispersible carbon black is suitably used.

Examples of the anionic hydrophilic group include —COOM, —SO$_3$M, —PO$_3$HM, —PO$_3$M$_2$, —CONM$_2$, —SO$_3$NM$_2$, —NH—C$_6$H$_4$—COOM, —NH—C$_6$H$_4$—SO$_3$M, —NH—C$_6$H$_4$—PO$_3$HM, —NH—C$_6$H$_4$—PO$_3$M$_2$, —NH—C$_6$H$_4$—CONM2, and —NH—C$_6$H$_4$—SO$_3$NM$_2$ (where M is a hydrogen atom, an alkali metal, quaternary ammonium or organic ammonium, preferably quaternary ammonium). Among them, —COOM, —SO$_3$M, —PO$_3$HM, —PO$_3$M$_2$, and —SO$_3$NM$_2$, are preferable, and color pigments on surfaces of which —COOM and —SO$_3$M are bonded are particularly preferable.

Examples of the alkali metal denoted by M include lithium, sodium and potassium. Examples of the organic ammonium denoted by M include monomethyl ammonium to trimethyl ammonium, monoethyl ammonium to triethyl ammonium, and monomethanol ammonium to trimethanol ammonium. As a method of obtaining the anionically charged color pigment, examples of the method for introducing —COONa to a surface of a color pigment include a method for oxidizing a color pigment with sodium hypochlorite, a method for sulfonating a color pigment, and a method in which a color pigment is reacted with the diazonium salt.

As for the cationic hydrophilic group, a quaternary ammonium group is preferable, and the quaternary ammonium groups represented by the following formulae are more preferable.

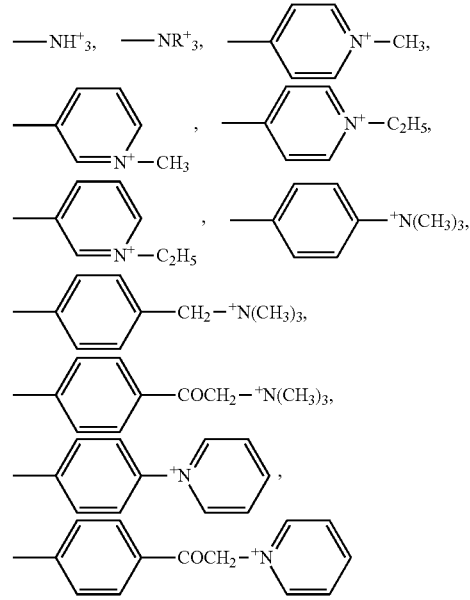

Specific examples of the quaternary ammonium ion include tetramethyl ammonium ion, tetraethyl ammonium ion, tetrapropyl ammonium ion, tetrabutyl ammonium ion, tetrapentyl ammonium ion, benzyltrimethyl ammonium ion, benzyltriethyl ammonium ion, and tetrahexyl ammonium ion. Among them, the tetraethyl ammonium ion, tetrabutyl ammonium ion, and benzyltrimethyl ammonium ion are preferable, and the tetrabutyl ammonium ion is particularly preferable.

Examples of the anionic functional group include anionic polar groups such as a carboxylic acid group, a sulfonic acid group, a phosphate group, an amide group, and a sulfonamide group. Preferable examples thereof are carboxylic acid, and p-aminobenzoic acid.

The anionic functional groups can be bonded to surfaces of pigment particles in accordance with the methods disclosed in Japanese Patent (JP-B) No. 4697757, JP-A No. 2003-513137, International Application Publication No. WO97/48769, and JP-A Nos. 10-110129, 11-246807, 11-57458, 11-189739, 11-323232, and 2000-265094.

Use of the water-dispersible pigment having the anionic functional group and quaternary ammonium ion enables to maintain the stable dispersion state of the water-dispersible pigment either in a water-rich ink, or in an organic solvent-rich ink from which the moisture has been evaporated, as the anionic functional group and quaternary ammonium ion exhibits affinity.

A method for producing the cationic self-dispersible carbon black to which the hydrophilic group is bonded is appropriately selected depending on the intended purpose without any restriction, and examples thereof include a method for binding N-ethyl pyridyl group represented by the following structural formula to carbon black, and a method for processing carbon black with 3-amino-N-ethylpyridinium bromide.

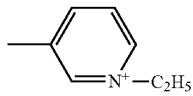

The hydrophilic group may be bonded to a surface of carbon black via another atom group.

Examples of another atom group include a C1-C12 alkyl group, a substituted or unsubstituted phenyl group, and a substituted or unsubstituted naphthyl group. Specific examples of the case where the hydrophilic group is bonded to the surface of the carbon black via another atom group include —$C_2H_4COOM$ (where M is an alkali metal or a quaternary ammonium), -$PhSO_3M$ (where Ph is a phenyl group, and M is an alkali metal or a quaternary ammonium), and —$C_5H_{10}NH_3^+$.

As another embodiment within the first embodiment, the colorant is preferably a modified pigment, which has been modified with a geminal bisphosphonic acid group, or a geminal bisphosphonate group.

Examples of such the modified pigment include modified pigments, which have been modified with any of the groups represented by the following structural formulae (1), (2), (3), and (4):

Structural Formula (1)

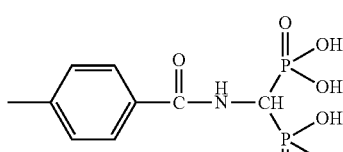

Structural Formula (2)

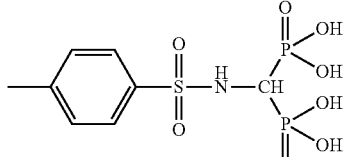

Structural Formula (3)

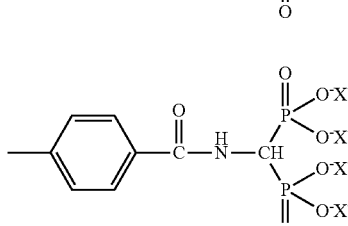

In the structural formula (3), $X^+$ is $Li^+$, $K^+$, $Na^+$, $NH_4^+$, $N(CH_3)_4^+$, $N(C_2H_5)_4^+$, $N(C_3H_7)_4^+$, or $N(C_4H_9)_4^+$.

Structural Formula (4)

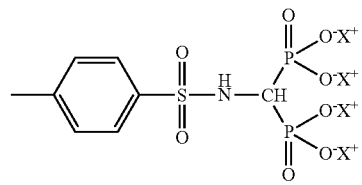

In the structural formula (4), $X^+$ is $Li^+$, $K^+$, $Na^+$, $NH_4^+$, $N(CH_3)_4^+$, $N(C_2H_5)_4^+$, $N(C_3H_7)_4^+$, or $N(C_4H_9)_4^+$.

The surface modification will be specifically explained next.

A dispersion liquid containing the modified pigment is prepared by one of the general methods. As the method, it is preferred that the pigment be allowed to react with the compounds represented by the following formulae (VI) and (VII), and the phosphonic acid group be substituted with alkali metal and organic ammonium to further enhance dispersibility of the pigment to water.

[Compound of Formula (VI)]

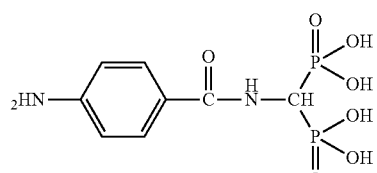

[Compound of Formula (VII)]

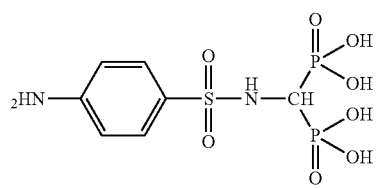

<Pigment Surface Modification Process>
[Method A]

In the room temperature environment, 20 g of carbon black, 20 mmol of the compound of the formula (VI) or the compound of the formula (VII), and 200 mL of ion-exchanged highly pure water are mixed by Silverson Mixer (6,000 rpm). When the obtained slurry has the pH value higher than 4, 20 mmol of nitric acid is added to the slurry. Thirty minutes later, sodium nitrite (20 mmol) dissolved in a small amount of ion-exchanged highly pure water is gradually added to the slurry. The resultant is heated to 60° C. with stirring, to thereby react for 1 hour. As a result, a modified pigment in which the compound of the formula (VI) or the compound of the formula (VII) has been added to the carbon black is generated. Subsequently, pH of the resultant was adjusted to 10 with a NaOH aqueous solution, to thereby obtain a modified dispersion liquid in 30 minutes time. The dispersion liquid containing the pigment bonded to at least either of a geminal bisphosphonic acid group or geminal bisphosphonate group and ion-exchanged highly pure water are used and subjected to ultrafiltration with a permeable membrane, and the resultant is further subjected to ultrasonic dispersion to thereby obtain a modified pigment dispersion liquid the solids content of which has been concentrated.

[Method B]

ProcessAll 4HV Mixer (4 L) is charged with 500 g of dry carbon black, 1 L of ion-exchanged highly pure water, and 1 mol of the compound of the formula (VI) or the compound of the formula (VII). Subsequently, the resulting mixture is mixed strongly at 300 rpm for 10 minutes, with heating to 60° C. To this, 20% by mass of a sodium nitrite aqueous solution [1 mole equivalent to the compound of the formula (VI) or the compound of the formula (VII)] is added over 15 minutes. The resulting mixture is mixed and stirred for 3 hours with heating to 60° C. The reactant is taken out while diluting with 750 mL of ion-exchanged highly pure water. The obtained modified pigment dispersion liquid and ion-exchanged highly pure water are used, and subjected to ultrafiltration with a permeable membrane, and the resultant is further subjected to ultrasonic dispersion to thereby obtain a modified pigment dispersion liquid the solids content of which has been concentrated. In the case where coarse particles are contained therein in a large amount, the coarse particles are preferably removed, for example, by a centrifugal separator.

A sodium ion content of each of the modified pigment dispersion liquids is measured by an ion meter. A total amount of phosphorous is measured by an elementary analysis. Furthermore, the volume average particle diameter ($D_{50}$) of the modified pigment in the dispersion liquid is measured by means of Microtrac® particle size distribution measuring device.

The volume average particle diameter ($D_{50}$) of the modified pigment dispersed elements in the ink is preferably 0.01 μm to 0.16 μm.

Moreover, an ink containing dispersed elements of a surface-treated pigment bonded to at least one geminal bisphosphonic acid group or geminal bisphosphonic acid sodium salt has excellent re-dispersibility even after the moisture in the ink is evaporated. Therefore, use of such ink enables excellent printing with easy cleaning operation, without causing clogging, when the printing operation is rested over a long period and the moisture of the ink adjacent to nozzles of an inkjet head. Further, the ink has high stability during the storage thereof, which is an ink capable of suppressing the viscosity increase as the moisture is evaporated, and having excellent properties in terms of the ejection reliability, and the prevention of the ink deposition in the head maintaining device.

—Colorant of Second Embodiment—

As for the colorant of the second embodiment, in addition to the aforementioned pigment, a polymer emulsion in which a pigment is contained in each of polymer particles is preferably used. The polymer emulsion in which the pigment is contained in each of the polymer particles means a polymer emulsion in which the pigment is encapsulated in each of the polymer particles, or the pigment is adsorbed on each surface of the polymer particles. In the polymer emulsion, all of the pigment particles do not need to be encapsulated or adsorbed, and part of the pigment particles may be dispersed in the emulsion provided that they do not adversely affect the obtainable effect of the present invention. Examples of the polymer for forming the polymer emulsion (the polymer of the polymer particles) include a vinyl polymer, a polyester polymer, and a polyurethane polymer. Polymers particularly preferably used are the vinyl polymer and the polyester polymer. For example, the polymers disclosed in Japanese Patent Application Laid-Open (JP-A) Nos. 2000-53897 and 2001-139849 can be used.

In the second embodiment, moreover, a composite pigment, in which commonly known organic or inorganic pigment particles are each coated with an organic pigment or carbon black, may be suitably used as the colorant. The composite pigment can be obtained by a method for precipitating an organic pigment under the presence of inorganic pigment particles, and a mechanochemical method in which an inorganic pigment and an organic pigment are mechanically mixed and ground. In this case, a layer of an organosiloxane compound formed from polysiloxane or alkyl silane may be optionally provided between the inorganic pigment and the organic pigment to improve the adhesion between layers of these pigments.

The organic pigment and the inorganic pigment are each appropriately selected from those listed earlier.

A mass ratio of the inorganic pigment particles to the organic pigment or carbon black as the colorant is preferably 3/1 to 1/3, more preferably 3/2 to 1/2. When the amount of the colorant is small, the coloring ability and tinting ability may be low. When the amount of the colorant is large, a transparency or color tone of the resulting ink may not be desirable.

As the colorant particles in which the inorganic pigment particles coated with the organic pigment or carbon black, a silica-carbon black composite material, a silica-phthalocyanine PB 15:3 composite material, a silica-diazo yellow composite material, and a silica-quinacridon PR122 composite material, which are manufactured by TODA KOGYO CORPORATION, are suitably used because these material have the small average primary particle diameters.

For example, if inorganic pigments having a primary particle diameter of 20 nm are coated with an equiamount of an organic pigment, the coated particles will have a primary diameter of approximately 25 nm. Therefore, provided that these particles are dispersed maintaining the state of primary particles by using an appropriate dispersant, an extremely finely dispersed pigment ink having a dispersed particle diameter of 25 nm can be obtained. Note that, not only the organic pigment present on the surface of the composite pigment contributes to the dispersion state thereof, but also the characteristics of the inorganic pigment present in the center of the composite pigment affect the dispersion state through the about 2.5 nm-thick layer of the organic pigment. Therefore, it is also important that a pigment dispersant that can stabilize both the organic pigment and inorganic pigment in the composite pigment in the dispersion is selected.

<<Colorant of Other Embodiments>>

In another embodiment, the colorant is a pigment dispersion liquid containing a pigment, a pigment dispersant, and a polymer dispersion stabilizer, where the polymer dispersion stabilizer is at least one selected from the group consisting of an α-olefin-maleic anhydride copolymer represented by the following general formula (A), a styrene-(meth)acryl copolymer, a water-soluble polyurethane resin, and a water-soluble polyester resin.

General Formula (A)

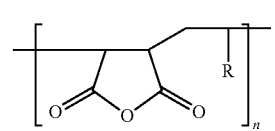

In the general formula (A) above, R is a C6-C30, preferably C12-22, more preferably C18-22 alkyl group, and n is an integer of 1 or greater, preferably 20 to 100.

The α-olefin-maleic anhydride copolymer represented by the general formula (A) can be synthesized by using a mixture of olefins including olefins having different numbers of carbon atoms, as a starting material. In this case, the resulting copolymer is a copolymer in which alkyl groups having difference numbers of carbon atoms are randomly introduced into a polymer chain. In the present invention, not only the α-olefin-maleic anhydride copolymer in which alkyl groups having the same numbers of carbon atoms are introduced into a polymer chain as R, but also the α-olefin-maleic anhydride copolymer in which alkyl groups each having different numbers of carbon atoms are randomly introduced into the polymer chain as R can be used as the α-olefin-maleic anhydride copolymer represented by the general formula (A).

The weight average molecular weight of the α-olefin-maleic anhydride copolymer represented by the general formula (A) is preferably 5,000 to 20,000.

Here, the weight average molecular weight of the α-olefin-maleic anhydride copolymer can be measured by the following method.

[Measurement of Weight Average Molecular Weight]

The average molecular weight of the copolymer can be measured by means of a gel permeation chromatography (GPC) analysis system.

First, the copolymer is dissolved in tetrahydrofuran, which is the same as an eluent, and KF806 L (for THF) is prepared as a GPC column. As molecular weight standard materials, three types of polystyrene whose molecular weights are known, and each having different molecular weights (of 1,000, 2,400, and 8,500) are measured to form a calibration curve.

Next, the copolymer is subjected to the GPC analysis. From the obtained SEC chromatograph, and a graph reflecting the differential molecular weight distribution curve and the calibration curve prepared by the molecular weight standard materials, a weight average molecular weight of the copolymer is calculated.

The α-olefin-maleic anhydride copolymer represented by the general formula (A), the styrene-(meth)acryl copolymer, the water-soluble polyurethane resin, and the water-soluble polyester resin are solids at normal temperature, and are hardly soluble in cold water. However, these copolymers and resins exhibit an effect as a dispersion stabilizer when they are used by being dissolved in an equivalent amount or more (preferably 1.0 time to 1.5 times the acid value) of an alkaline solution or alkaline aqueous solution to the acid values of the copolymers and resins.

Dissolving the polymer or resin in the alkaline solution or alkaline aqueous solution can be easily performed by heating and stirring. However, in the case where an olefin chain in the α-olefin-maleic anhydride copolymer is long, it is relatively difficult to dissolve the α-olefin-maleic anhydride copolymer in the alkaline solution or alkaline aqueous solution, and it is sometime the case that insoluble products remain. Having said that, the α-olefin-maleic anhydride copolymer dissolved in the alkaline solution or alkaline aqueous solution does not lose the effect as the dispersion stabilizer as long as these insoluble products are removed using an appropriate filter.

Examples of the base used in the alkali solution or alkaline aqueous solution include: hydroxides of alkali metal such as sodium hydroxide, potassium hydroxide, and lithium hydroxide; basic materials such as ammonium, triethyl amine, and morpholine; alcohol amine such as triethanol amine, diethanol amine, N-methyldiethanol amine, 2-amino-2-ethyl-1,3-propanediol, and choline.

The α-olefin-maleic anhydride copolymer represented by the general formula (A) may be appropriately synthesized for use, or selected from commercial products. Examples of the commercial product include T-YP112, T-YP115, T-YP114, and T-YP116 (all manufactured by SEIKO PMC CORPORATION).

The styrene-(meth)acryl copolymer may be appropriately synthesized for use, or selected from commercial products. Examples of the commercial product include: JC-05 (manufactured by SEIKO PMC CORPORATION); and ARUFON UC-3900, ARUFON UC-3910, and ARUFON UC-3920 (all manufactured by TOAGOSEI CO., LTD.).

The water-soluble polyurethane resin may be appropriately synthesized for use, or selected from commercial products. Examples of the commercial product thereof include TAKELAC W-5025, TAKELAC W-6010, and TAKELAC W-5661 (manufactured by Mitsui Chemicals, Inc.). The water-soluble polyester resin may be appropriately synthesized for use, or selected from commercial products. Examples of the commercial product thereof include: NICHIGO POLYESTER W-0030, NICHIGO POLYESTER W-0005S30WO, and NICHIGO POLYESTER WR-961 (manufactured by Nippon Synthetic Chemical Industry Co., Ltd.); and PESRESIN A-210, and PESRESIN A-520 (manufactured by TAKAMATSU OIL & FAT CO., LTD.).

The acid value of the polymer dispersion stabilizer is preferably 40 mgKOH/g to 400 mgKOH/g, more preferably 60 mgKOH/g to 350 mgKOH/g. When the acid value thereof is lower than 40 mgKOH/g, the polymer dispersion stabilizer may have poor solubility to an alkaline solution. When the acid value thereof is higher than 400 mgKOH/g, the viscosity of the pigment dispersion element increases, which may lead to the poor ejection ability of the resulting ink, or the dispersion stability of the pigment dispersion elements may decrease.

The mass average molecular weight of the polymer dispersion stabilizer is preferably 20,000 or smaller, more preferably in the range of 5,000 to 20,000. When the mass average molecular weight thereof is smaller than 5,000, the dispersion stability of the pigment dispersion elements may decrease. When the mass average molecular weight thereof is larger than 20,000, the polymer dispersion stabilizer may have a poor solubility to an alkaline solution, or the viscosity of the pigment dispersion elements may increase.

An amount of the polymer dispersion stabilizer is preferably 1 part by mass to 100 parts by mass, more preferably 5 parts by mass to 50 parts by mass on solid basis, relative to 100 parts by mass of the pigment. When the amount thereof is smaller than 1 part by mass, the polymer dispersion stabilizer may not be able to exhibit an effect of stabilizing a dispersion state. When the amount thereof is larger than 100 parts by mass, the viscosity of the resulting ink increases, which may degrade ejection ability of the ink from a nozzle, or the use thereof is not economical.

In the embodiment, the colorant preferably contains the pigment dispersant. As for the pigment dispersant, either of an anionic surfactant or a nonionic surfactant having the HLB value of 10 to 20 is preferable.

Examples of the anionic surfactant include polyoxyethylene alkyl ether acetic acid salts, alkyl benzene sulfonic acid salts (for example, of $NH_4$, Na, or Ca), alkyldiphenyl ether disulfonic acid salts (for example, of $NH_4$, Na, or Ca), dialkyl succinate sodium sulfonate (Na salt), a sodium naphthalene sulfonate-formalin condensate (Na salt), polyoxyethylene polycyclic phenyl ether sulfuric acid ester salt (for example, of $NH_4$, or Na), lauric acid salts, polyoxyethylene alkyl ether sulfate salt, and oleic acid salts. Among them, sodium dioctylsulfosuccinate (Na salt), and polyoxyethylene styrene phyenyl ether ammonium sulfonate ($NH_4$ salt) are particularly preferable.

Examples of the nonionic surfactant having the HLB value of 10 to 20 include polyoxyethylene alkyl ether, polyoxyalkylene alkyl ether, polyoxyethylene polycyclic phenyl ether, sorbitan fatty acid ester, polyoxyethylene sorbitan fatty acid ester, polyoxyethylene alkylphenyl ether, polyoxyethylene alkyl amine, polyoxyethylene alkyl amide, and acetylene glycol. Among them, polyoxyethylene lauryl ether, polyoxyethylene-β-naphthyl ether, polyoxyethylene sorbitan monooleate, and polyoxyethylene styrenephenyl ether are particularly preferable.

An amount of the pigment dispersant is preferably 1 part by mass to 100 parts by mass, more preferably 10 parts by mass to 50 parts by mass relative to 100 parts by mass of the pigment. When the amount of the dispersant for use is small, the pigment cannot be sufficiently finely dispersed. When the amount thereof is excessively large, an excessive portion thereof that is not adsorbed on the pigment influences on the physical properties of the resulting ink, which may cause smearing of images, low water resistance, and low abrasion resistance.

The pigment dispersion elements uniformly and finely dispersed in water by the pigment dispersant can be prepared by the method including dissolving the pigment dispersant in an aqueous medium, adding the pigment to the solution to sufficiently wet the pigment, and dispersing the mixture at high speed by means of a homogenizer, a disperser using balls (e.g. as a bead mill and a ball mill), a kneading disperser using shearing force (e.g. a roll mill), or an ultrasonic disperser.

In many cases, coarse particles are contained in the dispersion after the kneading and dispersion step mentioned above, which causes clogging of inkjet nozzles or supplying channels. Therefore, it is necessary to remove particles having diameters of 1 μm or larger by means of a filter or a centrifuge.

The average particle diameter ($D_{50}$) of the pigment dispersion elements is preferably 150 nm or smaller, more preferably 100 nm or smaller in the ink. When the average particle diameter ($D_{50}$) thereof is larger than 150 nm, the ejection stability of the resulting ink significantly is lowered, which may cause clogging of nozzles or bend a track of the jetted ink. Moreover, when the average particle diameter ($D_{50}$) thereof is 100 nm or smaller, the jetting stability of the resulting ink improves, and moreover, saturation of images formed with the resulting ink improves.

An amount of the colorant in the inkjet ink is preferably 2% by mass to 15% by mass, more preferably 3% by mass to 12% by mass on solid basis. When the amount thereof is smaller than 2% by mass, the coloring ability of the resulting ink and image density of the resulting image may be low. When the amount thereof is larger than 15% by mass, the resulting ink increases its viscosity, which may result in undesirable ejection properties, and is also not economically desirable.

<Surfactant>

The surfactant is preferably selected from those having low surface tension, high penetration ability and high leveling ability, provided that it does not impair the dispersion stability depending on a combination with the colorant for use, or the wetting agent for use. The surfactant is preferably at least one selected from the group consisting of an anionic surfactant, a nonionic surfactant, a silicone surfactant, and a fluorosurfactant. Among them, the silicone surfactant, the fluorosurfactant, an acetylene glycol or acetylene alcohol surfactant are particularly preferable. These surfactants may be used independently, or in combination.

As for the fluorosurfactant, a fluorosurfactant in which 2 to 16 carbon atoms are substituted with fluorine atoms is preferable, and a fluorosurfactant in which 4 to 16 carbon atoms are substituted with fluorine atoms is more preferable. When the number of the carbon atoms substituted with fluorine atoms is less than 2, an effect of fluorine cannot be attained. When the number thereof is more than 16, the resulting ink may have a problem in storage stability.

Examples of the fluorosurfactant include a perfluoroalkyl sulfonic acid compound, a perfluoroalkyl carboxylic acid compound, a perfluoroalkyl phosphate compound, perfluoroalkyl ethylene oxide adduct, and a polyoxyalkylene ether polymer compound having a perfluoroalkyl ether group in a side chain thereof. Among them, the polyoxyalkylene ether polymer compound having a perfluoroalkyl ether group in a side chain thereof is particularly preferable because it has low foamability. More preferably, the fluorosurfactant is a fluorosurfactant represented by the following general formula (VII) or (VIIa):

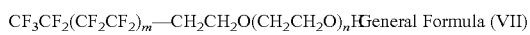

$CF_3CF_2(CF_2CF_2)_m$—$CH_2CH_2O(CH_2CH_2O)_n$H  General Formula (VII)

In the general formula (VII), m is an integer of 0 to 10, and n is an integer of 1 to 40.

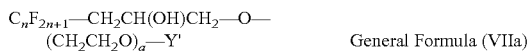

$C_nF_{2n+1}$—$CH_2CH(OH)CH_2$—O—$(CH_2CH_2O)_a$—Y'  General Formula (VIIa)

In the general formula (VIIa), n is an integer of 2 to 6, a is an integer of 15 to 50, and Y' is —$C_bH_{2b+1}$ (b is an integer of 11 to 19) or —$CH_2CH(OH)CH_2$—$C_dF_{2d+1}$ (d is an integer of 2 to 6).

Examples of the perfluoroalkyl sulfonic acid compound include perfluoroalkyl sulfonic acid, and perfluoroalkyl sulfonic acid salt.

Examples of the perfluoroalkyl carboxylic acid compound include perfluoroalkyl carboxylic acid, and perfluoroalkyl carboxylic acid salt.

Examples of the perfluoroalkyl phosphate compound include perfluoroalkyl phosphate, and perfluoroalkyl phosphoric acid ester salt.

Examples of the polyoxyalkylene ether polymer compound having the perfluoroalkyl ether group in a side chain thereof include polyoxyalkylene ether polymer having a perfluoroalkyl ether group in a side chain thereof, a sulfuric acid ester salt of polyoxyalkylene ether polymer having a perfluoroalkyl ether in a side chain thereof, and a salt of polyoxyalkylene ether polymer having a perfluoroalkyl ether group in a side chain thereof.

Examples of the counter ion of the salt of these fluorosurfactants include Li, Na, K, $NH_4$, $NH_3CH_2CH_2OH$, $NH_2(CH_2CH_2OH)_2$, and $NH(CH_2CH_2OH)_3$.

The fluorosurfactant may be appropriately synthesized for use, or selected from commercial products.

Examples of the commercial products include SURFLON S-111, S-112, S-113, S-121, S-131, S-132, S-141, S-145 (all manufactured by AGC SEIMI CHEMICAL CO., LTD); FLOURAD FC-93, FC-95, FC-98, FC-129, FC-135, FC-170C, FC-430, FC-431 (all manufactured by Sumitomo 3M Limited); MEGAFACE F-470, F-1405, F-474 (all manufactured by DIC Corporation); Zonyl TBS, FSP, FSA, FSN-100, FSN, FSO-100, FSO, FS-300, UR (all manufactured by Du Pont Kabushiki Kaisha); FT-110, FT-250, FT-251, FT-400S, FT-150, FT-400SW (all manufactured by NEOS COMPANY LIMITED); and PolyFox PF-151N (manufactured by Omnova Solutions, Inc.). Among them, FS-300 manufactured by Du Pont Kabushiki Kaisha, FT-110, FT-250, FT-251, FT-400S, FT-150, and FT-400SW manufactured by NEOS COMPANY LIMITED, and PolyFox PF-151N manufactured by Omnova Solutions, Inc. are particularly preferable because these can achieve desirable printing quality, particularly coloring ability, and can significantly improve uniform dye-affinity.

Specific examples of the fluorosurfactant preferably include those represented by the following general formula (VIII):

(1) Anionic Fluorosurfactant

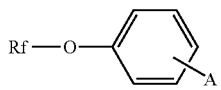
General Formula (VIII)

In the general formula (VIII), Rf represents a mixture of fluorine-containing hydrophobic groups represented by the following structural formulae (IX) to (X); and A is —$SO_3X$, —COOX, or —$PO_3X$ (where X is a counter anion specific examples of which include a hydrogen atom, Li, Na, K, $NH_4$, $NH_3CH_2CH_2OH$, $NH_2(CH_2CH_2OH)_2$, and $NH(CH_2CH_2OH)_3$).

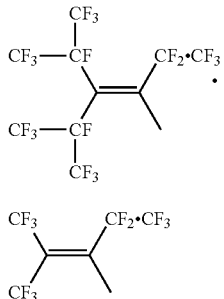
Structural Formula (IX)

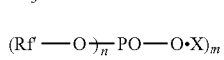
Structural Formula (X)

$(Rf'-O)_n-PO-O\cdot X)_m$    General Formula (XI)

In the general formula (XI), Rf' is the fluorine-containing group represented by the following general formula (XII), X represents the same as described before, n is an integer of 1 or 2, and m is 2-n.

$F-(CF_2CF_2)_n-CH_2CH_2-$    General Formula (XII)

In the general formula (XII), n is an integer of 3 to 10.

Rf—S—$CH_2CH_2$—COO'X.    General Formula (XIII)

In the general formula (XIII), Rf and X respectively represent the same as described before.

Rf—$SO_3$'X    General Formula (XIV)

In the general formula (XIV), Rf and X respectively represent the same as described before.

(2) Nonionic Fluorosurfactant

Rf—O—$(CH_2CH_2O)_n$H    General Formula (XV)

In the general formula (XV), Rf represents the same as described before, and n is an integer of 5 to 20.

Rf'—O—$(CH_2CH_2O)_n$H    General Formula (XVI)

In the general formula (XVI), Rf' represents the same as described before, and n is an integer of 1 to 40.

(3) Amphoteric Fluorosurfactant

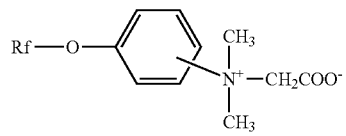
General Formula (XVII)

In the general formula (XVII), Rf represents the same as described before.

(4) Oligomer Fluorosurfactant

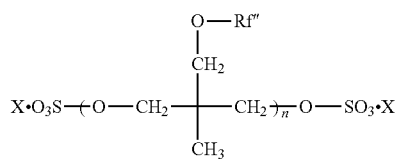
General Formula (XVIII)

In the general formula (XVIII), Rf" represents the fluorine-containing group represented by the following general formula (XIX), n is an integer of 0 to 10, and X represents the same as described before.

$F-(CF_2CF_2)_n-CH_2-$    General Formula (XIX)

In the general formula (XIX), n is an integer of 1 to 4.

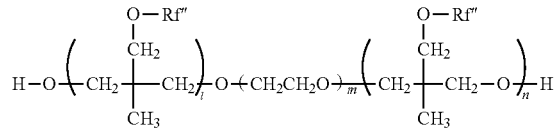
General Formula (XX)

In the general formula (XX), Rf" represents the same as described before, l is an integer of 1 to 10, m is an integer of 0 to 10, and n is an integer of 1 to 10.

Moreover, the compound represented by the general formula (VII) preferably satisfies the relationship of MWEO/MWF=2.2 to 10, where MWEO is a molecular weight of the polyoxyethylene group [the site of $(CH_2CH_2O)a$] and MWF is a molecular weight of the fluoroalkyl group (the side of $C_nF_{2n+1}$ and the side of $C_mF_{2m+1}$) in view of the functions as a surfactant, and the solubility balance to water.

Preferable examples of the compound represented by the general formula (VIIa) include the compounds represented by the following formulae (a) to (v), which are desirable because they have high performance for reducing the surface tension and have high permeability.

| | |
|---|---|
| $C_4F_9$—$CH_2CH(OH)CH_2O$—$(CH_2CH_2O)_{21}$—$C_{12}H_{25}$ | (a) |
| $C_4F_9$—$CH_2CH(OH)CH_2O$—$(CH_2CH_2O)_{25}$—$C_{12}H_{25}$ | (b) |
| $C_4F_9$—$CH_2CH(OH)CH_2O$—$(CH_2CH_2O)_{30}$—$C_{12}H_{25}$ | (c) |
| $C_4F_9$—$CH_2CH(OH)CH_2O$—$(CH_2CH_2O)_{20}$—$C_{14}H_{29}$ | (d) |
| $C_4F_9$—$CH_2CH(OH)CH_2O$—$(CH_2CH_2O)_{30}$—$C_{14}H_{29}$ | (e) |
| $C_4F_9$—$CH_2CH(OH)CH_2O$—$(CH_2CH_2O)_{20}$—$C_{16}H_{33}$ | (f) |
| $C_4F_9$—$CH_2CH(OH)CH_2O$—$(CH_2CH_2O)_{23}$—$C_{16}H_{33}$ | (g) |

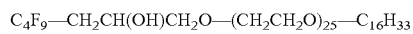 (h)

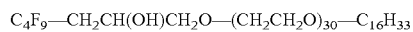 (i)

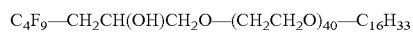 (j)

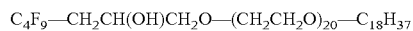 (k)

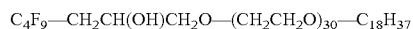 (l)

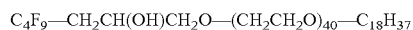 (m)

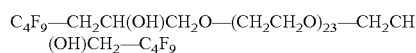 (n)

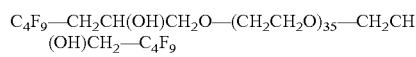 (o)

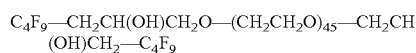 (p)

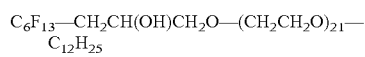 (q)

 (r)

 (s)

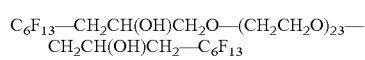 (t)

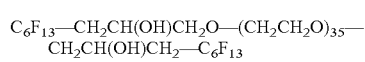 (u)

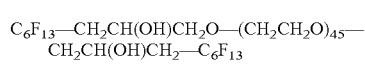 (v)

Among them, the compounds of (a) to (c) and (n) to (v) are particularly preferable because they have desirable affinity to the organic solvent.

The silicone surfactant is appropriately selected depending on the intended purpose without any restriction, but it is preferably selected from ones that are not decomposed in a high pH condition. Examples of the silicone surfactant include side chain-modified polydimethylsiloxane, both terminal-modified polydimethylsiloxane, one terminal-modified polydimethylsiloxane, and side chain and both terminals-modified polydimethylsiloxane. The silicone surfactant having, as a modified group, a polyoxyethylene group, or a polyoxyethylene polyoxypropylene group is particularly preferable because it has excellent properties as an aqueous surfactant.

These surfactants may be appropriately synthesized for use, or selected from commercial products.

The commercial products thereof can be readily available from BYK Japan K.K., Shin-Etsu Chemical Co., Ltd., Dow Corning Toray Co., Ltd.

The polyether modified silicone surfactant is appropriately selected depending on the intended purpose without any restriction, and examples thereof include a compound in which the polyalkylene oxide structure represented by the following general formula is introduced to a side chain from the Si of dimethyl polysiloxane.

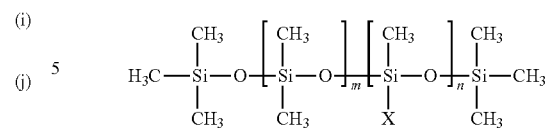

General Formula (XXI)

In the general formula (XXI), m, n, a, and b are each independently an integer of 1 or greater, and R and R' are each independently an alkyl group, or an alkylene group.

As for the polyether modified silicone surfactant, commercial products thereof can be used, and examples of the commercial products include KF-618, KF-642, and KF-643 (all manufactured by Shin-Etsu Chemical Co., Ltd.).

The acetylene glycol surfactant or acetylene alcohol surfactant is preferably a compound represented by the following formula (16), or (17). Specific examples thereof include the compound represented by the following formula (20).

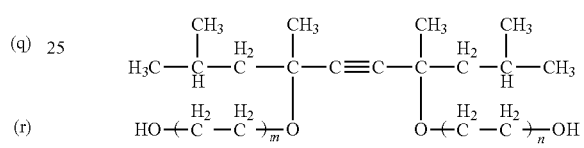

<Formula (16)>

In the general formula (16), m and n are each an integer of 1 or greater.

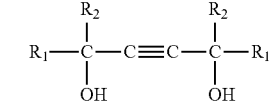

<General Formula (17)>

In the general formula (17), $R_1$ and $R_2$ are each an alkyl group.

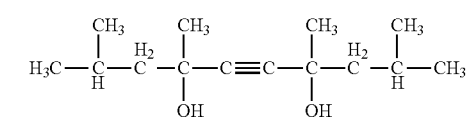

<Formula (20)>

As for the acetylene glycol surfactant or acetylene alcohol surfactant, commercial products thereof can be used. Examples thereof include: Dynol® 604, and Dynol® 607 (manufactured by Air Products and Chemicals Inc.); Surfynol® 104, Surfynol® 420, Surfynol® 440, and Surfynol® SE (available from Nissin Chemical Industry Co., Ltd.); OLFINE E1004, OLFINE E1010, OLFINE EXP.4001, OLFINE EXP.4200, OLFINE EXP.4051F, and OLFINE EXP.4123 (manufactured by Nissin Chemical Industry CO., Ltd.).

Examples of the anionic surfactant include an acetic acid salt of polyoxyethylene alkyl ether, dodecylbenzene sulfonic acid salt, lauric acid salt, and polyoxyethylene alkyl ether sulfate salt. Examples of the nonionic surfactant include polyoxyethylene alkyl ether, polyoxypropylene polyoxyethylene alkyl ether, polyoxyethylene alkyl ester, polyoxyethylene sorbitan fatty acid ester, polyoxyethylene alkylphenyl ether, polyoxyethylene alkylamine, and polyoxyethylene alkylamide.

An amount of the surfactant in the inkjet ink is preferably 0.01% by mass to 3.0% by mass, more preferably 0.5% by mass to 2.0% by mass.

When the amount thereof is smaller than 0.01% by mass, an effect of the surfactant may not be sufficiently exhibited. When the amount thereof is larger than 3.0% by mass, the penetration ability of the resulting ink to recording media is higher than necessary, which may cause reduction in the image density of the resulting image, or strike through.

<Penetrating Agent>

The inkjet ink of the present invention preferably contains, as a penetrating agent, at least one selected from the group consisting of a C8-C11 polyol compound and a glycol ether compound. The penetrating agent is preferably those having a solubility of 0.2% by mass to 5.0% by mass in water of 25° C. Among them, 2-ethyl-1,3-hexanediol [solubility: 4.2% (25° C.)], and 2,2,4-trimethyl-1,3-pentanediol [solubility: 2.0% (25° C.)] are particularly preferable. Examples of other polyol compounds include: aliphatic diol such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol, and 5-hexane-1,2-diol. Other penetrating agents used in combination with above are appropriately selected depending on the intended purpose without any restriction, provided that they dissolve in the ink to adjust the ink to have desirable properties, and examples thereof include: alkyl or aryl ethers of polyhydric alcohol such as diethylene glycol monophenyl ether, ethylene glycol monophenyl ether, ethylene glycol monoallyl ether, diethylene glycol monobutyl ether, propylene glycol monobutyl ether, and tetraethylene glycol chlorophenyl ether; and lower alcohols such as ethanol.

An amount of the penetrating agent in the inkjet ink is preferably 0.1% by mass to 4.0% by mass. When the amount thereof is smaller than 0.1% by mass, the resulting ink cannot have fast drying properties, which may cause formation of a blur image. When the amount thereof is larger than 4.0% by mass, the dispersion stability of the colorant is impaired to cause nozzle clogging, or the penetration ability of the resulting ink to recording media is higher than necessary, which may cause reduction in image density of the resulting image, or strike through.

<Water-Dispersible Resin>

As for the water-dispersible resin for use in the ink, a water-dispersible resin having excellent film formability (image formability) and having high water repellency, high water resistance, and high weather resistance is effective for image recording.

Examples of the water-dispersible resin include a condensed synthetic resin, an addition synthetic resin and a natural polymer compound.

Examples of the condensed synthetic resin include a polyester resin, a polyurethane resin, a polyepoxy resin, a polyamide resin, a polyether resin, a poly(meth)acrylic resin, an acryl-silicone resin, and a fluororesin. Examples of the addition synthetic resin include a polyolefin resin, a polystyrene resin, a polyvinyl alcohol resin, a polyvinyl ester resin, a polyacrylic acid resin, and an unsaturated carboxylic acid resin.

Examples of the natural polymer compound include cellulose, rosin, and natural rubbers.

Among them, polyurethane resin particles, acryl-silicone resin particles, and fluororesin particles are particularly preferable. Two or more of these water-dispersible resins may be used in combination, without any particular problems.

As for the fluororesin particles, fluororesin particles having fluoroolefin unit are preferable. Among them, fluorine-containing vinyl ether resin particles containing a fluoroolefin unit and a vinyl ether unit are particularly preferable.

The fluoroolefin unit is appropriately selected depending on the intended purpose without any restriction, and examples thereof include $-CF_2CF_2-$, $-CF_2CF(CF_3)-$, and $-CF_2CFCl-$.

The vinyl ether unit is appropriately selected depending on the intended purpose without any restriction, and examples thereof include the units represented by the following structural formulae.

TABLE 1

| | |
|---|---|
| $-CH_2CH-$<br>$\quad\vert$<br>$\quad OCH_3$ | (1) |
| $-CH_2CH-$<br>$\quad\vert$<br>$\quad OC_2H_5$ | (2) |
| $-CH_2CH-$<br>$\quad\vert$<br>$\quad OC_3H_7$ | (3) |
| $-CH_2CH-$<br>$\quad\vert$<br>$\quad OC_4H_9$ | (4) |
| $-CH_2CH-$<br>$\quad\vert$<br>$\quad OC_5H_{11}$ | (5) |
| $-CH_2CH-$<br>$\quad\vert$<br>$\quad OCH_2OH$ | (6) |
| $-CH_2CH-$<br>$\quad\vert$<br>$\quad OCH_2H_4OH$ | (7) |
| $-CH_2CH-$<br>$\quad\vert$<br>$\quad OCH_3H_6OH$ | (8) |
| $-CH_2CH-$<br>$\quad\vert$<br>$\quad OCH_4H_8OH$ | (9) |
| $-CH_2CH-$<br>$\quad\vert$<br>$\quad OCH_5H_{10}OH$ | (10) |
| $-CH_2CH-$<br>$\quad\vert$<br>$\quad OCH_2COOH$ | (11) |
| $-CH_2CH-$<br>$\quad\vert$<br>$\quad OC_2H_4COOH$ | (12) |
| $-CH_2CH-$<br>$\quad\vert$<br>$\quad OC_3H_6COOH$ | (13) |
| $-CH_2CH-$<br>$\quad\vert$<br>$\quad OC_4H_8COOH$ | (14) |
| $-CH_2CH-$<br>$\quad\vert$<br>$\quad OC_5H_{10}COOH$ | (15) |

TABLE 1-continued $$-\text{CHCH}-\quad(16)$$
$$\;\;\;\;\;|\;\;\;\;|$$
$$\text{H}_3\text{C}\;\;\text{OCH}_3$$

$$-\text{CHCH}-\quad(17)$$
$$\;\;\;\;\;|\;\;\;\;|$$
$$\text{H}_3\text{C}\;\;\text{OC}_2\text{H}_5$$

$$-\text{CHCH}-\quad(18)$$
$$\;\;\;\;\;|\;\;\;\;|$$
$$\text{H}_3\text{C}\;\;\text{OC}_3\text{H}_7$$

$$-\text{CHCH}-\quad(19)$$
$$\;\;\;\;\;|\;\;\;\;|$$
$$\text{H}_3\text{C}\;\;\text{OC}_4\text{H}_9$$

$$-\text{CHCH}-\quad(20)$$
$$\;\;\;\;\;|\;\;\;\;|$$
$$\text{H}_3\text{C}\;\;\text{OC}_5\text{H}_{11}$$

$$-\text{CHCH}-\quad(21)$$
$$\;\;\;\;\;|\;\;\;\;|$$
$$\text{H}_3\text{C}\;\;\text{OCH}_2\text{OH}$$

$$-\text{CHCH}-\quad(22)$$
$$\;\;\;\;\;|\;\;\;\;|$$
$$\text{H}_3\text{C}\;\;\text{OC}_2\text{H}_4\text{OH}$$

$$-\text{CHCH}-\quad(23)$$
$$\;\;\;\;\;|\;\;\;\;|$$
$$\text{H}_3\text{C}\;\;\text{OC}_3\text{H}_6\text{OH}$$

$$-\text{CHCH}-\quad(24)$$
$$\;\;\;\;\;|\;\;\;\;|$$
$$\text{H}_3\text{C}\;\;\text{OC}_4\text{H}_8\text{OH}$$

$$-\text{CHCH}-\quad(25)$$
$$\;\;\;\;\;|\;\;\;\;|$$
$$\text{H}_3\text{C}\;\;\text{OC}_5\text{H}_{10}\text{OH}$$

$$-\text{CHCH}-\quad(26)$$
$$\;\;\;\;\;|\;\;\;\;|$$
$$\text{H}_3\text{C}\;\;\text{OCH}_2\text{COOH}$$

$$-\text{CHCH}-\quad(27)$$
$$\;\;\;\;\;|\;\;\;\;|$$
$$\text{H}_3\text{C}\;\;\text{OC}_2\text{H}_4\text{COOH}$$

$$-\text{CHCH}-\quad(28)$$
$$\;\;\;\;\;|\;\;\;\;|$$
$$\text{H}_3\text{C}\;\;\text{OC}_3\text{H}_6\text{COOH}$$

$$-\text{CHCH}-\quad(29)$$
$$\;\;\;\;\;|\;\;\;\;|$$
$$\text{H}_3\text{C}\;\;\text{OC}_4\text{H}_8\text{COOH}$$

$$-\text{CHCH}-\quad(30)$$
$$\;\;\;\;\;|\;\;\;\;|$$
$$\text{H}_3\text{C}\;\;\text{OC}_5\text{H}_{10}\text{COOH}$$

As the fluorine-containing vinyl ether resin particles each containing a fluoroolefin unit and a vinyl ether unit, an alternated copolymer, in which the fluoroolefin unit and the vinyl ether unit are alternately copolymerized, is preferable.

These fluororesin particles may be appropriately synthesized, or selected from commercial products. Examples of the commercial products thereof include: FLUONATE FEM-500 and FEM-600, DICGUARD F-52S, F-90, F-90M, F-90N and AQUAFURFURAN TE-5A manufactured by Dainippon Ink Chemical Industries Co., Ltd.; and LUMIFLON FE4300, FE4500, FE4400, ASAHI GUARD AG-7105, AG-950, AG-7600, AG-7000, and AG-1100 manufactured by AGC SEIMI CHEMICAL CO., LTD.

As for the water-dispersible resin, a homopolymer may be used, or a copolymer may be used as a composite resin. Moreover, the water-dispersible resin for use may have a monophase structure or core-shell structure, or may be prepared by power-feed emulsion.

As the water-dispersible resin, it is possible to use a resin itself having a hydrophilic group and self-dispersibility, and a resin itself having no dispersibility but to which the dispersibility is imparted with use of a surfactant and another resin having a hydrophilic group. Among these resins, an ionomer of a polyester resin or a polyurethane resin, or an emulsion of resin fine particles obtained by emulsification polymerization or suspension polymerization of an unsaturated monomer is most suitably used. In the case of emulsification polymerization of the unsaturated monomer, a resin emulsion is obtained by reacting water into which an unsaturated monomer, a polymerization initiator, a surfactant, a chain transfer agent, a chelating agent and a pH adjustor are added. Thus, a water-dispersible resin can be easily obtained, and desired properties are easily obtained because the resin components can be changed.

Examples of the unsaturated monomer include unsaturated carboxylic acids, monofunctional or polyfunctional (meth) acrylic acid ester monomers, (meth)acrylic acid amide monomers, aromatic vinyl monomers, vinyl cyano compound monomers, vinyl monomers, allyl compound monomers, olefin monomers, diene monomers, and oligomers having unsaturated carbons. These may be used independently, or in combination. By combining these monomers, properties of the resulting resin can be flexibly modified. The properties of the resulting resin can be also modified with use of an oligomer type polymerization initiator, through a polymerization reaction or graft reaction.

Examples of the unsaturated carboxylic acids include acrylic acid, methacrylic acid, itaconic acid, fumaric acid, and maleic acid.

Examples of the monofunctional (meth)acrylic acid ester monomers include methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethyl amino ethyl methacrylate, methacryloxyethyltrimethylammonium salt, 3-methacryloxypropyltrimethoxysilane, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethyl amino ethyl acrylate, and acryloxyethyltrimethyl ammonium salt.

Examples of the polyfunctional (meth)acrylic acid ester monomers include ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis (4-methacryloxydiethoxyphenyl)propane, trimethylol propane trimethacrylate, trimethylol ethane trimethacrylate, polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, 2,2'-bis(4-acryloxydiethoxyphenyl)propane trimethylol propane triacrylate, trimethylol ethane triacrylate, tetramethylol methane triacrylate, ditrimethylol tetraacrylate, tetramethylol methane tetraacrylate, pentaerythritol tetraacrylate, and dipentaerythritol hexacrylate.

Examples of the (meth)acrylic acid amide monomers include acryl amide, methacryl amide, N,N-dimethyl acryl amide, methylene bisacryl amide, and 2-acrylamide-2-methylpropane sulfonic acid.

Examples of the aromatic vinyl monomers include styrene, α-methylstyrene, vinyl toluene, 4-t-butylstyrene, chlorostyrene, vinyl anisole, vinyl naphthalene, and divinyl benzene.

Examples of the vinyl cyano compound monomers include acrylonitrile, and methacrylonitrile.

Examples of the vinyl monomers include vinyl acetate, vinylidene chloride, vinyl chloride, vinyl ether, vinyl ketone, vinyl pyrrolidone, vinylsulfonic acid or salts thereof, vinyl trimethoxysilane, and vinyl triethoxysilane.

Examples of the allyl compound monomers include allyl sulfonic acids or salts thereof, allyl amine, allyl chloride, diallyl amine, and diallylmethyl ammonium salt.

Examples of the olefin monomers include ethylene, and propylene.

Examples of the diene monomers include butadiene, and chloroprene.

Examples of the oligomers having unsaturated carbon atoms include styrene oligomer having a methacryloyl group, styrene-acrylonitrile oligomer having a methacryloyl group, methyl methacrylate oligomer having a methacryloyl group, dimethyl siloxane oligomer having a methacryloyl group, and polyester oligomer having an acryloyl group.

The water-dispersible resin suffers from breakage of the molecular chains, such as dispersion breakage and hydrolysis, in the presence of a strong alkali or strong acid, and thus the pH of the water-dispersible resin is preferably 4 to 12, and particularly, from the view point of miscibility with water-dispersible colorants, it is more preferably 6 to 11, and still more preferably 7 to 9.

The average particle diameter ($D_{50}$) of the water-dispersible resin is relevant to the viscosity of the dispersion liquid. In the case of water-dispersible resins having the same composition, the smaller the particle diameter becomes, the higher the viscosity is at the same solid content. The average particle diameter ($D_{50}$) of the water-dispersible resin is preferably 50 nm or larger to prevent the resulting ink from having excessively high viscosity. When the average particle diameter is several tens micrometers, the water-dispersible resin cannot be used because the diameter of the water-dispersible resin is greater than that of nozzle holes of an inkjet head. When the diameter of the water-dispersible resin is smaller than that of nozzle holes but particles having large particle diameters are present in an ink, the ink ejection stability degrades. In order not to impair the ink ejection stability, the average particle diameter ($D_{50}$) of the water-dispersible resin is preferably 200 nm or smaller, and more preferably 150 nm or smaller.

The water-dispersible resin preferably has a function to fix the water-dispersible colorant on the surface of paper, to form a coat at normal temperature and to improve fixability of the colorant. Therefore, the minimum film forming temperature (MFT) of the water-dispersible resin is preferably 30° C. or lower. Further, when the glass transition temperature of the water-dispersible resin is −40° C. or lower, tucks occur in printed matters because of the increased viscosity of the resin coat. Thus, the water-dispersible resin preferably has a glass transition temperature of −30° C. or higher.

An amount of the water-dispersible resin in the inkjet ink is preferably 2% by mass to 30% by mass, more preferably 5% by mass to 25% by mass on solid basis.

Here, the solids content of the colorant, pigment contained in the colorant, and water-dispersible resin can be determined by a method of separating only the colorant and water-dispersible resin components from the ink. When the pigment is used as the colorant, a mass reduction ratio of the ink is evaluated through a thermal mass analysis, thereby making it possible to measure a mass ratio between the colorant and the water-dispersible resin. When the molecular structure of the colorant is apparently known, in the case where the colorant is a pigment or dye, it is possible to determine the solid content of the colorant using the NMR; in the case where the colorant is an inorganic pigment contained in heavy metal atoms and molecular skeleton, or a metal-containing organic pigment or metal-containing dye, the solid content of the colorant can be determined using the fluorescent X-ray analysis.

<Other Components>

The aforementioned other components are appropriately selected depending on the intended purpose without any restriction, and examples thereof include a foam inhibitor (a defoaming agent), a pH regulator, an antiseptic-antifungal agent, a chelating agent, an anti-rust agent, an antioxidant, a ultraviolet absorber, an oxygen absorber, and a photostabilizer.

—Foam Inhibitor—

The foam inhibitor is used by adding in a small amount thereof to an inkjet ink to thereby inhibit foaming. Here, "foaming" means that air is encapsulated with thin films of the liquid. The foaming is related to properties of the inkjet ink such as surface tension, and viscosity. Namely, with a liquid having high surface tension, such as water, a force for minimizing the surface area of the liquid as little as possible works, and therefore such liquid is difficult to foam. In contrast, the inkjet ink having high viscosity and high permeability has low surface tension. Therefore, the inkjet ink easily forms, and the produced bubbles tend to be remained because of the viscosity of the ink, hence the inkjet ink is difficult to defoam.

The foam inhibitor typically destroys bubbles by partially reducing the surface tension of the film of the bubble, or by scattering the foam inhibitor insoluble to the foaming liquid on a surface of the foaming liquid. In the case where a fluorosurfactant, which has very strong effect of reducing the surface tension, is used as a surfactant in the inkjet ink, the foam inhibitor of the former mechanism cannot partially reduce the surface tension of the film of the bubble. Therefore, it is generally not used. Accordingly, the latter foam inhibitor which is insoluble to the foaming liquid (e.g. the ink) is used. In this case, the stability of the inkjet ink reduces because of the foam inhibitor insoluble to the ink.

Contrary to these, the foam inhibitor represented by the general formula (19) has high affinity to the fluorosurfactant, though it does not have a high effect of reducing the surface tension compared to the fluorosurfactant. Therefore, the foam inhibitor is effectively included in the bubble film, and the surface of the bubble film becomes partially unbalanced because of the difference in the surface tension between the fluorosurfactant and the foam inhibitor, which destroys the bubbles.

As for the foam inhibitor, a compound represented by the following formula (19) is used.

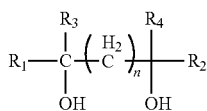

<General Formula (19)>

In the general formula (19), $R_1$ and $R_2$ are each independently a C3-C6 alkyl group; $R_3$ and $R_4$ are each independently a C1-C2 alkyl group; and n is an integer of 1 to 6.

Preferable examples of the compound represented by the general formula (19) include 2,4,7,9-tetramethyldecane-4,7-diol, and 2,5,8,11-tetramethyldodecane-5,8-diol. Among them, 2,5,8,11-tetramethyldodecane-5,8-diol is particularly preferable because it has high foam inhibiting effect, and high affinity to the ink.

An amount of the foam inhibitor in the inkjet ink is preferably 0.01% by mass to 10% by mass, more preferably 0.1% by mass to 5% by mass. When the amount of the foam inhibitor is smaller than 0.01% by mass, the defoaming effect may not be attained. When the amount thereof is greater than 10% by mass, the effect of inhibiting foaming reaches the peak, and the excessive amount thereof may adversely affect the physical properties of the ink such as viscosity, and particle diameters.

—pH Regulator—

The pH regulator is appropriately selected depending on the intended purpose without any restriction, provided that it does not adversely affect an ink to be prepared, and can adjust pH of the ink to 7 to 11. Examples of the pH regulator include alcohol amines, hydroxides of alkali metal elements, hydroxides of ammonium, phosphonium hydroxides, and carbonates of alkali metals. When the pH of the inkjet ink is lower than 7 or higher than 11, problems such as degeneration and leakage of ink and ejection defects may occur due to the large amount of ink dissolving an inkjet head and an ink supply unit used.

Examples of the alcohol amines include diethanol amine, triethanol amine, and 2-amino-2-ethyl-1,3-propanediol.

Examples of the hydroxides of alkali metal elements include lithium hydroxide, sodium hydroxide, and potassium hydroxide.

Examples of the hydroxides of ammonium include ammonium hydroxide, and quaternary ammonium hydroxide.

Examples of the phosphonium hydroxides include quaternary phosphonium hydroxide.

Examples of the carbonates of alkali metals include lithium carbonate, sodium carbonate, and potassium carbonate.

—Antiseptic-Antifungal Agent—

Examples of the antiseptic-antifungal agent include sodium dehydroacetate, sodium sorbate, sodium 2-pyridinethiol-1-oxide, sodium benzoate, and sodium pentachlorophenol.

—Chelating Agent—

Examples of the chelating agent include sodium ethylenediamine tetraacetate, sodium nitrilotriacetate, sodium hydroxyethylethylenediamine triacetate, sodium diethylenetriamine pentaacetate, and sodium uramil diacetate.

—Anti-Rust Agent—

Examples of the anti-rust agent include acid sulfite, sodium thiosulfate, thiodiglycolic acid ammonium, diisopropyl ammonium nitrate, pentaerythritol tetranitrate, and dicyclohexyl ammonium nitrate.

—Antioxidant—

Examples of the antioxidant include a phenolic antioxidant (including hindered phenolic antioxidant), an amine antioxidant, a sulfuric antioxidant, and a phosphoric antioxidant.

Examples of the phenolic antioxidant (including hindered phenolic antioxidant) include butylated hydroxyanisole, 2,6-di-tert-butyl-4-ethyl phenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenebis (3-methyl-6-tert-butylphenol), 3,9-bis[1,1-dimethyl-2-[p-(3-tert-butyl-4-hydroxy-5-methylphenyl)propionyloxy]ethyl]2,4,8,10-tetraoxaspiro[5,5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene, and tetrakis[methylene-3-(3',5'-di-tert-butyl-4'-hydroxyphenyl)propionate]methane.

Examples of the amine antioxidant include phenyl-β-naphthyl amine, α-naphthyl amine, N,N'-di-sec-butyl-p-phenylene diamine, phenothiazine, N,N'-diphenyl-p-phenylene diamine, 2,6-di-tert-butyl-p-cresol, 2,6-di-tert-butylphenol, 2,4-dimethyl-6-tert-butyl-phenol, butylhydroxyanisole, 2,2'-methylenebis(4-methyl-6-tert-butylphenol), 4,4'-butylidenebis(3-methyl-6-tert-butylphenol), 4,4'-thiobis (3-methyl-6-tert-butylphenol), tetrakis[methylene-3(3,5-di-tert-butyl-4-dihydroxyphenyl)propionate]methane, and 1,1,3-tris(2-methyl-4-hydroxy-5-tert-butylphenyl)butane.

Examples of the sulfuric antioxidant include dilauryl-3,3'-thiodipropionate, distearylthiodipropionate, laurylstearylthiodipropionate, dimyristyl-3,3'-thiodipropionate, distearyl-β,β'-thiodipropionate, 2-mercaptobenzoimmidazole, and dilauryl sulfide.

Examples of the phosphoric antioxidant include triphenyl phosphate, octadecyl phosphate, triisodecyl phosphate, trilauryltrithio phosphate, and trinonylphenyl phosphate.

—Ultraviolet Absorber—

Examples of the ultraviolet absorber include a benzophenone ultraviolet absorber, a benzotriazole ultraviolet absorber, a salicylate ultraviolet absorber, a cyanoacrylate ultraviolet absorber, and a nickel complex salt ultraviolet absorber.

Examples of the benzophenone ultraviolet absorber include 2-hydroxy-4-n-octoxybenzophenone, 2-hydroxy-4-n-dodecyloxybenzophenone, 2,4-dihydroxybenzophenone, 2-hydroxy-4-methoxybenzophenone, and 2,2',4,4'-tetrahydroxybenzophenone.

Examples of the benzotriazole ultraviolet absorber include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole, and 2-(2'-hydroxy-3'-tert-butyl-5'-methylphenyl)-5-chlorobenzotriazole.

Examples of the salicylate ultraviolet absorber include phenyl salicylate, p-tert-butylphenyl salicylate, and p-octylphenyl salicylate.

Examples of the cyanoacrylate ultraviolet absorber include ethyl-2-cyano-3,3'-diphenyl acrylate, methyl-2-cyano-3-methyl-3-(p-methoxyphenyl)acrylate, and butyl-2-cyano-3-methyl-3-(p-methoxyphenyl)acrylate.

Examples of the nickel complex salt ultraviolet absorber include nickelbis(octylphenyl)sulfide, nickel(II) 2,2'-thiobis (4-tert-octylferrate)-n-butyl amine, nickel(II) 2,2'-thiobis(4-tert-octylferrate)-2-ethylhexyl amine, and nickel(II) 2,2'-thiobis(4-tert-octylferrate)triethanol amine.

The inkjet ink of the present invention can be prepared by dispersing or dissolving, in an aqueous medium, water, the organic solvent (wetting agent), the colorant, the surfactant, optionally the penetrating agent, the water-dispersible resin, and other component, and optionally and stirring and mixing the mixture. The dispersing can be performed, for example, by a sand mill, a homogenizer, a ball mill, a paint shaker, or an ultrasonic disperser, and the stirring and mixing can be performed by an agitator using an agitating blade, a magnetic stirrer, or a high-speed disperser.

The physical properties of the inkjet ink of the present invention are appropriately selected depending on the intended purpose without any restriction. For example, the viscosity, and the surface tension are preferably within the following ranges.

The viscosity of the inkjet ink is preferably 5 mPa·s to 25 mPa·s, more preferably 7.0 mPa·s to 20 mPa·s at 25° C. When the viscosity of the ink is 5 mPa·s or higher, the printing density and character qualities of images formed with the resulting ink can be improved. When the viscosity of the ink is 25 mPa·s or lower, the ejection ability of the resulting ink can be secured.

The viscosity can be measured, for example, by means of a viscometer (RL-550, manufactured by Toki Sangyo Co., Ltd.) at 25° C.

The dynamic surface tension of the inkjet ink is preferably 35 mN/m or lower, more preferably 32 mN/m or lower at 25° C. with the surface bubble lifetime of 15 ms in the maximum bubble pressure method. When the surface tension thereof is higher than 35 mN/m, the resulting ink is not easily leveled on recording media, which may prolong the time required for drying.

The coloration of the inkjet ink of the present invention is appropriately selected depending on the intended purpose without any restriction, and examples thereof include yellow, magenta, cyan, and black. Recording using an ink set containing two or more of these colors of inks in combination enables to form multi-color images, and recording using an ink set containing all of these colors of inks enables to form full-color images.

The inkjet ink of the present invention can be suitably used with a printer equipped with any of a piezo inkjet head, a thermal inkjet head, an electrostatic inkjet head, where the piezo inkjet head is configured to eject ink droplets by deforming a vibration plate constituting of a wall surface of an ink flow channel to change the volume inside the ink flow channel using a piezoelectric element as a pressure generating unit for compressing the ink within the ink (see JP-A No. 02-51734), the thermal inkjet head is configured to generate air bubbles by heating an ink within an ink flow channel using a heat element (see JP-A No. 61-59911), and the electrostatic inkjet heat is configured to eject ink droplets by deforming a vibration plate with electrostatic force generated between the vibration plate and an electrode provided on a wall surface of an ink flow channel to face the vibration plate, to thereby change the volume inside the ink flow channel (see JP-A No. 06-71882).

The inkjet ink of the present invention is suitably used in various fields such as inkjet inks, inks for fountain pens, inks for ball-point pens, inks for marker pens, and inks for felt-tip pens, and it is particularly preferably used with an image forming device (e.g. a printer) of an inkjet recording system. For example, the inkjet ink can be used with a printer having a function of accelerating pint fixation by heating a recording paper and the inkjet ink at 50° C. to 200° C. during, or before and after printing, and the inkjet ink is particularly suitably used in the ink cartridge, ink recording method, ink recording device, and inkjet recorded matter of the present invention.

(Ink Media Set)

The ink media set for use in the present invention is a combination of the inkjet ink of the present invention and recording media.

<Recording Media>

The recording media are appropriately selected depending on the intended purpose without any restriction, and for example, plain paper, gloss paper, special paper, cloth, films, OHP sheets, common printing sheets can be suitably used.

Among them, as the recording media, conventional printing sheets having liquid absorption properties within a certain range is preferable because they can record images of excellent image quality (e.g. image density, color saturation, no beading, and no color breading), high glossiness, and excellent fixing ability without smearing. Specifically, the preferable recording media include a recording medium containing a support and a coating layer formed on at least one surface of the support, and having a pure water transfer amount of preferably 1 mL/m$^2$ to 35 mL/m$^2$, more preferably 1 mL/m$^2$ to 10 mL/m$^2$, and even more preferably 2 mL/m$^2$ to 10 mL/m$^2$ with contact duration of 100 ms, as measured by a dynamic scanning absorptometer. Also, a recording medium having a pure water transfer amount of 3 mL/m$^2$ to 40 mL/m$^2$ with contact duration of 400 ms, as measured by a dynamic scanning absorptometer is preferable.

Use of the inkjet ink of the present invention with such the recording media enables to realize recording of images having excellent image quality, high glossiness, and excellent fixing ability without smearing, and hence gives a large effect. In the case where recording media which have small amounts of the pure water transferred are used, beading (a phenomenon that adjacent printed dots are connected, and dots are left in an image) and color breading (breading between different colors) may occur. In the case where recording media which have large amounts of the pure water transferred are used, the recording ink dots may have the smaller diameter than the intended diameter thereof, and as a result, a solid image may not be filled with the ink. Use of the inkjet ink of the present invention with the aforementioned recording media can effectively avoid these problems.

Here, the dynamic scanning absorptometer (Journal from Japan Technical Association of the Pulp and Paper Industry, Vol. 48, May 1994, pp 88-92, Kukan Shigenori) is a device that can accurately measure a liquid absorption amount during a very short period of time. The dynamic scanning absorptometer directly reads the absorption speed based on the shift of the meniscus in a capillary and the measurement is automated as follows: a disc-shaped sample is prepared; the absorption head is scanned over the sample in a spiral manner; the scanning speed is automatically changed according to a predetermined pattern; and one sample is used for measurements of a required number of dots. The head for supplying liquid to the paper sample is connected to the capillary via a Teflon (registered trademark) tube. The position of the meniscus in the capillary is automatically read by an optical sensor. More specifically, a dynamic scanning absorptometer (K 350 series Model D, Kyowa Co., Ltd.) was used to measure the transfer rate of purified water or ink. The transfer amounts with contact durations of 100 ms and 400 ms can be obtained based on the measurements of the transfer amount with contact durations around these contact durations by interpolation.

—Support—

The support is appropriately selected depending on the intended purpose without any restriction, and examples thereof include paper mainly formed of wood fibers, and a sheet material (e.g. nonwoven fabric) mainly formed of wood fibers and synthetic fibers.

The paper is appropriately selected from those known in the art depending on the intended purpose without any restriction, and examples thereof include wood pulp, and recycled pulp. Examples of the wood pulp include hardwood bleached kraft pulp (LBKP), softwood bleached kraft pulp (NBKP), NBSP, LBSP, GP, and TMP.

Examples of materials for the recycled pulp include super white, white with rule marks, cream white, cards, extra super white, medium white, simili paper, color white, Kent paper, white art paper, special high cut, another high cut, news paper, and magazines shown in the used paper standard quality specification table specified by Paper Recycling Promotion Center. Specific examples thereof include used paper of paper and paper boards, which may be chemical pulp paper or high yield pulp-containing paper, such as sheets for printers (e.g. non-coated computer paper, thermosensitive paper, and pressure sensitive paper, which are information-related sheets); used OA sheets (e.g. PPC sheets), coated paper (e.g. art paper, coated paper, light-weight coated paper, and mat paper) and non-coated paper (e.g. high quality paper, color high quality, note, letter paper, wrapping paper, fancy paper, medium quality paper, newspaper, woody paper, gift wrapping paper, simili paper, pure white roll paper, and milk carton). These may be used independently, or in combination.

The used paper pulp is generally produced in the combination of the following four steps.
(1) In disaggregation, used paper is broken into filaments by mechanical force and chemicals in a pulper and print ink is detached from filaments;
(2) In dusting, foreign substances (such as plastics) and dirt in the used paper is removed by screens and cleaners;
(3) In de-inking, print ink detached from the filaments using surfactants is removed out by the flotation or cleaning technique; and
(4) In bleaching, the filaments are whitened by oxidization or reduction.

When the used paper pulp is mixed, the mixing rate of the used paper pulp in the total pulp content is preferably 40% or lower.

As internal fillers used in the support, pigments conventionally known as white pigments are used. Examples of the white pigments include: inorganic white pigments such as light calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatom earth, calcium silicate, magnesium silicate, synthetic silica, aluminum hydroxide, alumina, lithopone, zeolite, magnesium carbonate, and magnesium hydroxide; and organic pigments such as styrene plastic pigment, acrylic plastic pigment, polyethylene, microcapsules, urea resin, and melamine resin. These may be used independently, or in combination.

Examples of the internal sizing agent used for making the support include neutral rosin-based sizing agent used to make neutral sheets, alkenyl succinic anhydride (ASA), alkyl ketene dimer (AKD), and petroleum resin-based sizing agent. Among these, the neutral rosin-based sizing agent and alkenyl succinic anhydride are particularly preferable. The alkyl ketene dimer is a highly effective sizing agent and only a small amount thereof is necessary. However, the recording paper (medium) surface tends to have a lower friction factor and become slippery, which may not be advantageous for paper transfer in inkjet recording.

A thickness of the support is appropriately selected depending on the intended purpose without any restriction, but it is preferably 50 μm to 300 μm. Moreover, a basis weight of the support is preferably 45 g/m² to 290 g/m².
—Coating Layer—
The coating layer contains a pigment and a binder (a binding agent), and may further contain a surfactant and other components.

As for the pigment, an inorganic pigment, or a combination of the inorganic pigment and an organic pigment can be used.

Examples of the inorganic pigment include kaolin, talc, heavy calcium carbonate, light calcium carbonate, calcium sulfite, amorphous silica, titanium white, magnesium carbonate, titanium dioxide, aluminum hydroxide, calcium hydroxide, magnesium hydroxide, zinc hydroxide, and chlorite. Among these, kaolin is particularly preferable because it exhibits excellent gloss and yields texture close to offset printing paper.

Examples of the kaolin include delaminated kaolin, calcined kaolin, and engineered kaolin by surface modification. Considering the gloss, it is preferable that 50% by mass or more kaolin in the total kaolin content consists of kaolin having a particle size distribution in which 80% by mass or more particles have a particle size of 2 μm or smaller.

An amount of the kaolin for use is preferably 50 parts by mass or larger relative to 100 parts by mass of the binder. When the amount thereof is smaller than 50 parts by mass, sufficient gloss may not be obtained. There is no upper limit for the amount of the kaolin added in the coating layer, but it is preferably 90 parts by mass or smaller in view of flowability and thickening of kaolin particularly under high shearing force.

Examples of the organic pigment include aqueous dispersion of styrene-acryl copolymer particles, of styrene-butadiene copolymer particles, if polystyrene particles, and if polyethylene particles. These organic pigments can be used in a mixture of two or more.

An amount of the organic pigment is preferably 2 parts by mass to 20 parts by mass relative to 100 parts by mass of the total pigments contained in the coating layer. The organic pigments exhibit excellent gloss and have lower specific gravities. Therefore, massive, glossy, and high surface coverage coating layers are obtained. When the amount of the organic pigment is smaller than 2 parts by mass, the above effects are not obtained. When the amount thereof is larger than 20 parts by mass, deteriorated flowability of the coating solution leads to lowered coating operation efficiency. It is also economically disadvantageous in terms of cost.

The organic pigments are classified into solid, hollow, and donut-shape, in terms of their shapes. In balancing the gloss, surface coverage, and flowability of the coating solution, the average particle diameter ($D_{50}$) thereof is preferably 0.2 μm to 3.0 μm. More preferably, the hollow pigment having a void ratio of 40% or higher is used.

As the binder, an aqueous resin is preferably used.

As the aqueous resin, at least either of a water-soluble resin or a water-dispersible resin is preferably used. The water-soluble resin is appropriately selected depending on the intended purpose without any restriction. Examples of the aqueous resin include: polyvinyl alcohol; modified polyvinyl alcohol such as anion-modified polyvinyl alcohol, cation-modified polyvinyl alcohol, and acetal-modified polyvinyl; polyurethane; polyvinyl pyrrolidone; modified polyvinyl pyrrolidone such as a copolymer of polyvinyl pyrrolidone and vinyl acetate, a copolymer of vinyl pyrrolidone and dimethylamylethyl acrylic acid, a copolymer of quaternaried vinyl pyrrolidone and dimethylaminoethyl methacrylic acid, and copolymer of vinyl pyrrolidone and methacryl amide propyl trimethyl ammonium chloride; cellulose such as carboxymethyl cellulose, hydroxyethyl cellulose, and hydroxypropyl cellulose; modified cellulose such as cationized hydroxyethyl cellulose; synthetic resins such as polyester, polyacrylic acid (ester), a melamine resin, modified products thereof, and a copolymer of polyester and polyurethane; and others such as poly(meth)acrylic acid, poly(meth)acrylamide, oxidized starch, phosphoric acid esterificated starch, self-modified starch, cationized starch, or various modified starches, polyethylene oxide, sodapolyacrylate, and soda alginate. These may be used independently, or in combination.

Among them, polyvinyl alcohol, cation-modified polyvinyl alcohol, acetal-modified polyvinyl alcohol, polyester, polyurethane, and a copolymer of polyester and polyurethane are particularly preferable form a viewpoint of ink absorption.

The water-dispersible resin is appropriately selected depending on the intended purpose without any restriction, and examples thereof include polyvinyl acetate, ethylene-vinyl acetate copolymer, polystyrene, styrene-(meth)acrylate copolymer, (meth)acrylate-based polymer, vinyl acetate-(meth)acryl acid (ester) copolymer, styrene-butadiene copolymer, ethylene-propylenecopolymer, polyvinyl ether, and silicone-acryl copolymer. Other examples include those containing cross-linking agents such as methylol melamine, methylol urea, methylol hydroxypropylene urea, and isocyanate and self-crosslinkable copolymers containing units such as N-methylolacrylamide.

An amount of the aqueous resin is preferably 2 parts by mass to 100 parts by mass, more preferably 3 parts by mass to 50 parts by mass, relative to 100 parts by mass of the pigment. The amount of the aqueous resin added is determined so that the liquid absorption properties of the resulting recording media are adjusted within the desirable ranges.

When a water-dispersible colorant is used as the colorant, a cationic organic compound is not necessarily added to the coating layer. The cationic organic compound added to the coating layer is appropriately selected depending on the intended purpose without any restriction. Examples thereof include monomers, oligomers, polymers of primary to tertiary amine and quaternary ammonium salt that react with sulfonic, carboxyl, or amino group in the direct dyes or acidic dyes in the aqueous ink to form insoluble salts. Among them, the oligomers or polymer is preferable.

Examples of the cationic organic compound include dimethylamine-epichlorhydrin polycondensates, dimethylamine-ammonia-epichlorhydrin polycondensates, poly(trimethylaminoethyl methacrylate-methyl sulfate), diaryl amine hydrochloride-acrylamide polycondensates, poly(diarylamine hydrochloride-sulfur dioxide), polyarylamine hydrochloride, poly(arylamine hydrochloride-diaryl amine hydrochloride), acrylamide-diarylamine copolymers, polyvinylamine copolymers, dicyandiamide, dicyandiamide-ammonium chloride-ureaformaldehide condensates, polyalkylelepolyamine-dicyandiamideammonium salt condensates, dimethyldiaryl ammonium chloride, polydiaryl methylamine hydrochloride, poly(diaryldimethylammonium chloride), poly(diaryldimethylammonium chloride-sulfur dioxide), poly(diaryldimethylammonium chloride-diarylamine hydrochloride derivatives), acrylamide-diaryldimethylammonium chloride copolymers, acrylate-acrylamide-diarylamine hydrochloride copolymers, ethyleneimine derivatives such as polyethyleneimine and acrylaminepolymers, and modified polyethyleneiminealkylene oxide. These may be used independently, or in combination.

Among them, combinations of low molecular weight cationic organic compounds such as dimethylamine/epichlorhydrin polycondensates and polyarylamine hydrochloride, and other relatively high molecular weight cationic organic compounds such as poly(diaryldimethylammonium chloride) are preferable. Combined use improves image densities and further reduces feathering compared to individual use.

The cationic organic compounds preferably have a cation equivalent of 3 meq/g to 8 meq/g as measured by the colloid titration method (polyvinyl potassium sulfate, toluidine blue). The cation equivalent in this range yields a desirable deposition amount on dry basis. For determining the cation equivalent by the colloid titration method, the cationic organic compound is diluted with water to a solid content of 0.1% by mass and no pH adjustment is conducted.

A deposition amount of the cationic organic compound is preferably 0.3 g/m$^2$ to 2.0 g/m$^2$ on dry basis. When the deposition amount of the cationic organic compound is smaller than 0.3 g/m$^2$ on dry basis, effects such as sufficiently improved image densities and reduced feathering may not be obtained.

The surfactant optionally added to the coating layer is appropriately selected depending on the intended purpose without any restriction, and any of an anionic surfactant, a cationic surfactant, an amphoteric surfactant, or nonionic surfactant can be used as the surfactant. Among them, the nonionic surfactant is particularly preferable. By adding the surfactant, water resistance of the resulting image improves, and the resulting image has higher image density with improved bleeding.

Examples of the nonionic surfactant include higher alcohol ethylene oxide adducts, alykylphenol ethylene oxide adducts, fatty acid ethylene oxide adducts, polyalcohol fatty acid ester ethylene oxide adducts, higher aliphatic amine ethylene oxide adducts, fatty acid amide ethylene oxide adducts, fats and oils ethylene oxide adducts, polypropylene glycol ethylene oxide adducts, glycerol fatty acid ester, pentaerythritol fatty acid ester, sorbitol and sorbitan fatty acid ester, sugar fatty acid ester, polyhydric alcohol alkyl ether, and fatty acid amide such as alkanolamine. These may be used independently, or in combination.

The polyhydric alcohol is appropriately selected depending on the intended purpose without any restriction, and examples thereof include glycerol, trimethylol propane, pentaerythritol, sorbitol, and sugar. As for the ethylene oxide adducts, ethylene oxide partly substituted by alkylene oxide such as propylene oxide or butylene oxide can be effective as long as they remain water-soluble. The substitute rate is preferably 50% or lower. The nonionic surfactants preferably have an HLB (hydrophilic/lipophilic balance) of 4 to 15 and more preferably 7 to 13.

An amount of the surfactant is preferably 0 parts by mass to 10 parts by mass, more preferably 0.1 parts by mass to 1.0 part by mass relative to 100 parts by mass of the cationic organic compound.

Other components may be added to the coating layer, if necessary, provided that they do not adversely affect the object and obtainable effect of the present invention. Examples of other components include additives such as alumina powder, a pH regulator, a preservative, and antioxidant.

A method for forming the coating layer is appropriately selected depending on the intended purpose without any restriction. For example, the coating layer can be formed by a method in which a coating layer solution is impregnated or applied on the support. The method for impregnating or applying the coating layer solution is appropriately selected depending on the intended purpose without any restriction. For example, it can be applied by various coaters such as a conventional size press, gate roll size press, film transfer size press, blade coater, rod coater, air knife coater, and curtain coater. From a viewpoint of cost, a conventional size press, gate roll size press, or film transfer press, which is equipped in the papermaking machine, can be used for impregnation or deposition, which is followed by on-machine finishing.

The deposition amount of the coating layer solution is appropriately selected depending on the intended purpose without any restriction, but it is preferably 0.5 g/m$^2$ to 20 g/m$^2$, more preferably 1 g/m$^2$ to 15 g/m$^2$ on solid basis.

After the impregnation or application of the coating layer solution, the coated solution may be dried, if necessary. In this case, the temperature for drying is appropriately selected depending on the intended purpose without any restriction, but it is preferably about 100° C. to about 250° C.

The recording medium may further contain a back layer on the back surface of the support, or between the support and the coating layer. The recording medium may also contain other layers between the support and the back layer, and may have a protective layer on the coating layer. Each of these layers may be a single layer, or a multi layer.

As for the recording media, other than the inkjet recording media, commercially available common printing sheets, offset printing coat paper, and gravure printing coat paper can be used.

The commercially available printing coat paper is coat paper used for commercial printing, or printing for publishing, such as cast coat paper, i.e. Art paper (Size A0, Size A1), Size A2 coat paper, Size A3 coat paper, Size B2 coat paper, light weight coat paper, fine coating paper, and is used for offset printing, or gravure printing. Specific examples thereof include Aurora Coat (manufactured by Nippon Paper Industries Co., Ltd.), and POD Gloss Coat (manufactured by Oji Paper Co., Ltd.).

<Ink Cartridge>

The ink cartridge for use in the present invention contains a container and the inkjet ink of the present invention housed in the container, and may further contain other members, if necessary.

The container is not particularly restricted, and a shape, structure, size, and material thereof are appropriately selected depending on the intended purpose. For example, the container is preferably selected from those having at least an ink bag formed of an aluminum laminate film, or a resin film.

Figure 2:
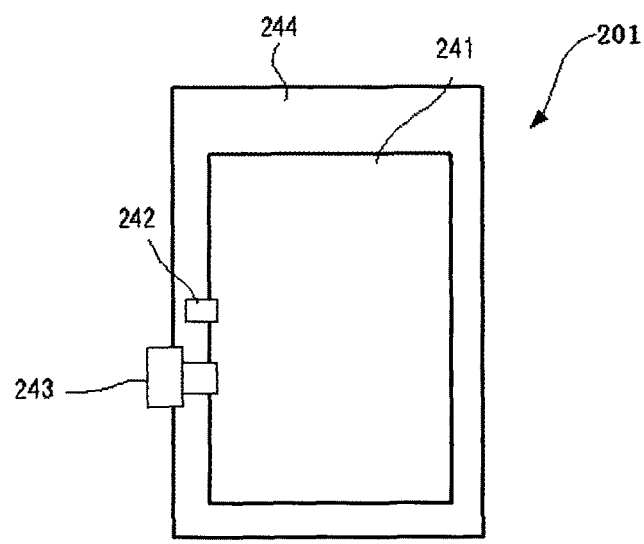
FIG. 2 is a schematic diagram illustrating one example of a modification of the ink cartridge of FIG. 1.

The ink cartridge will be explained with reference to FIGS. 1 and 2, hereinafter. FIG. 1 is a diagram showing one example of the ink cartridge of the present invention, and FIG. 2 is a diagram illustrating a modification example of the ink cartridge of FIG. 1.

Figure 3:
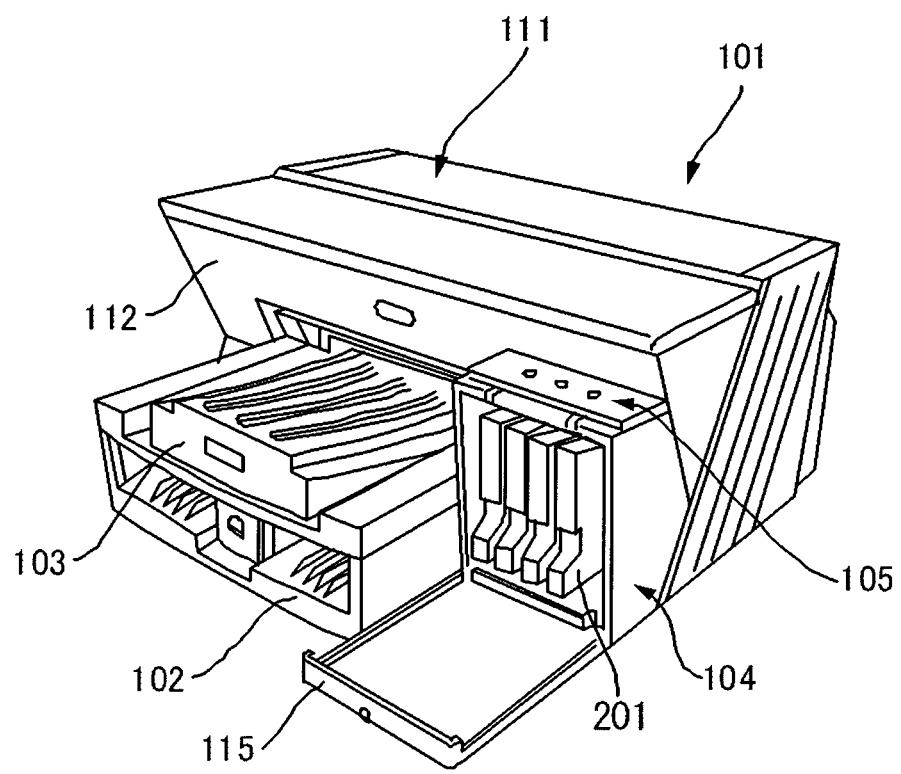
FIG. 3 is a perspective diagram illustrating one example of the state where the cover of the loading section of the ink cartridge is open.

As illustrated in FIG. 1, an ink bag 241 is filled with the inkjet ink of the present invention by injecting the inkjet ink from an ink inlet 242. After removing air present inside the ink bag 241, the ink inlet 242 is sealed by fusing. At the time of use, a needle equipped in an inkjet recording device main body 101, which will be described later with reference to FIG. 3, is inserted into an ink outlet 243 formed of a rubber member to thereby supply the ink to the device main body 101. The ink bag 241 is formed of a wrapping member such as an air non-permeable aluminum laminate film. As illustrated in FIG. 2, the ink bag 241 is typically housed in a plastic cartridge case 244, which is then detachably mounted in various inkjet recording devices. The ink cartridge 201 of the present invention houses therein the inkjet ink (an ink set) of the present invention, and can be detachably mounted in various inkjet recording devices, particularly preferably detachably mounted to the inkjet recording device of the present invention, which will be described below.

(Inkjet Recording Method and Inkjet Recording Device)

The inkjet recording method of the present invention contains at least an ink jetting step, and may further contain other steps, such as a stimuli generating step, and a controlling step, if necessary.

The inkjet recording device of the present invention contains at least an ink jetting unit, and may further contain other units such as a stimuli generating unit, and a controlling unit, if necessary.

The inkjet recording method of the present invention can be suitably carried out by means of the inkjet recording device of the present invention, and the ink jetting step can be suitably carried out by means of the ink jetting unit. Moreover, the aforementioned other steps can be suitably carried out by means of the aforementioned other units.

—Ink Jetting Step and Ink Jetting Unit—

The ink jetting step is applying stimuli (energy) to the inkjet ink of the present invention to make the inkjet ink jet, to thereby form an image on a recording medium.

The ink jetting unit is a unit configured to apply stimuli (energy) to the inkjet ink of the present invention to make the inkjet ink jet, to thereby form an image on a recording medium. The ink jetting unit is not particularly restricted, and examples thereof include various nozzles used for ejecting inks.

In the inkjet head for use in the present invention, it is preferred that at least part of a liquid chamber, fluid resistance, vibration plate, and nozzle member be formed of a material containing at least either of silicon or nickel. Moreover, the nozzle diameter of the inkjet nozzle is preferably 30 µm or smaller, more preferably 1 µm to 20 µm.

The stimuli (energy) can be generated, for example, by the stimuli generating unit. The stimuli is appropriately selected depending on the intended purpose without any restriction, and examples thereof include heat (temperature), pressure, vibrations, and light. These may be used independently, or in combination. Among them, heat and pressure are preferable.

The stimuli generating unit includes, for example, a heating device, a pressure device, a piezoelectric element, a vibration generator, an ultrasonic wave oscillator, and light. Specific examples of the stimuli generating unit include: a piezoelectric actuator such as piezoelectric element; a thermal actuator utilizing a phase change due to film boiling of the liquid caused by using an electric-heat transducer such as a heat element; a shape memory actuator utilizing a metal phase change due to a temperature change; and an electrostatic actuator utilizing electrostatic force.

An embodiment of the jet of the inkjet ink is not particularly restricted, and varies depending on the stimuli applied. In the case where the stimuli is heat, for example, there is a method in which a thermal energy corresponding to a recording signal is applied to the inkjet ink present in a recording head, for example, by a thermal head, to foam the inkjet ink by the applied thermal energy, and droplets of the inkjet ink are ejected from nozzle openings of the recording head by the pressure from the foam. In the case where the stimuli is pressure, moreover, there is a method in which voltage is applied to a piezoelectric element adhered to the location, so-called a pressure chamber, in the ink flow channel within the recording head to bend the piezoelectric element, and the reduction in the volume of the pressure chamber caused by the bended piezoelectric element initiate ejection of droplets of the inkjet ink from nozzle openings of the recording head.

The sizes of the droplets of the inkjet ink to jetted are, for example, preferably $3 \times 10^{-15}$ m$^3$ to $40 \times 10^{-15}$ m$^3$ (3 pL to 40 pL), the speed of the ejection and jetting is preferably 5 m/s to 20 m/s, the driving frequency thereof is preferably 1 kHz or greater, and the resolution thereof is preferably 300 dpi or higher.

The inkjet recording method may have a heating and drying step in which the recording medium on which the inkjet ink is jetted, if necessary. In this case, the recording medium can be dried by an infrared ray drying device, a micro wave drying device, a roll heater, a drum heater, or warm air. Moreover, the inkjet recording method may have a fixing step as a method for leveling a surface of the formed image, or fixing the image, where the fixing step is heating the recording medium at 100° C. to 150° by a heating unit to thermally fix the image. As a result of the fixing step, the glossiness and fixing ability of the recorded image improve. As for the thermal fixing unit, a heated roller or drum heater having a mirror surface is suitably used. The mirror surface (smooth part) of the roller heater or drum heater is brought in contact with a surface of the formed image to proceed to fixing step. As for the heating temperature, the fixing roller heated at 100° C. to 150° C. is preferably used in view of the resulting image quality, safety, and cost.

The controlling unit is appropriately selected depending on the intended purpose without any restriction, provided that it can control the operation of each unit, and examples thereof include a device such as a sequencer and a computer.

One embodiment for carrying out the inkjet recording method of the present invention by a serial type inkjet recording device will be explained hereinafter with reference to drawings. The inkjet recording device illustrated in FIG. 3 contains a device main body 101, a paper feeding tray 102 for feeding recording sheets to the device main body 101, a paper discharging tray 103 for storing the recording sheets which have been fed to the device main body 101 and on which images have been formed (recorded), and an ink cartridge loading section 104. On the upper plane of the ink cartridge loading section 104, a control unit 105 such as operation keys and a display is provided. The ink cartridge loading section 104 has a front cover 115 that can be open for attaching or detaching the ink cartridge 201.

Figure 4:
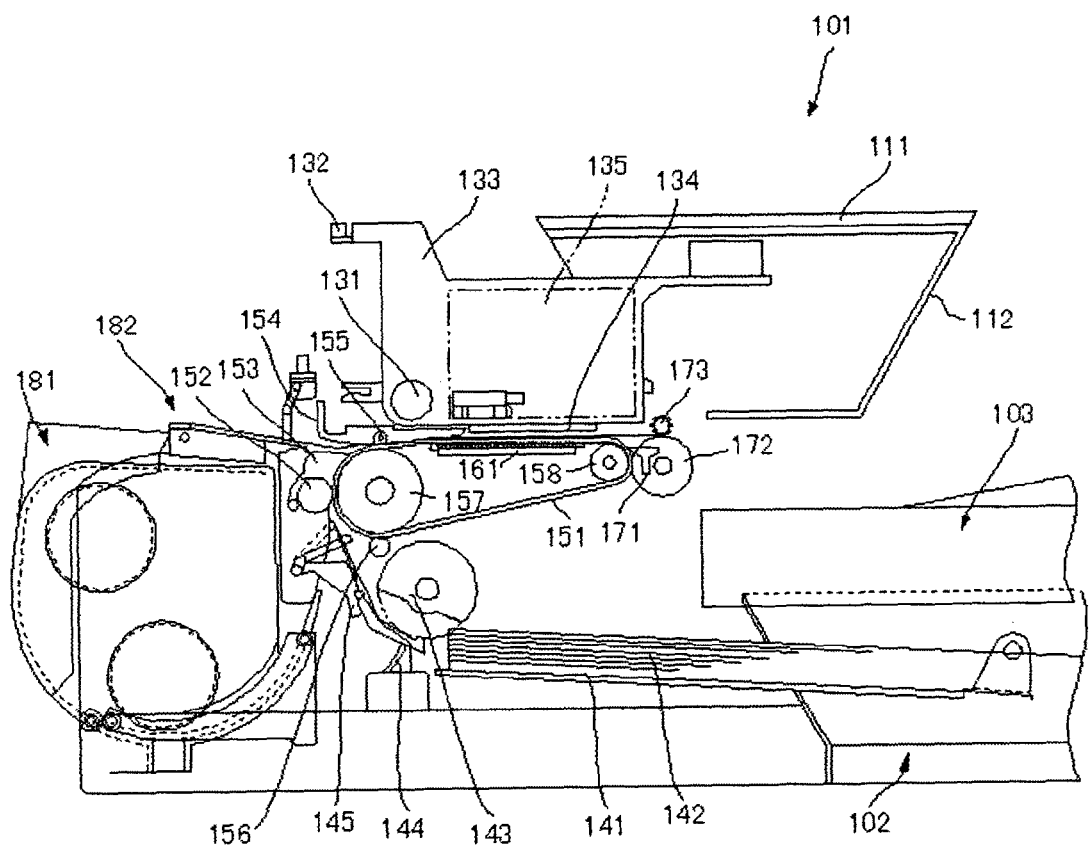
FIG. 4 is a cross-sectional view for explaining one example of the entire body structure of the inkjet recording device of FIG. 3.
Figure 5:
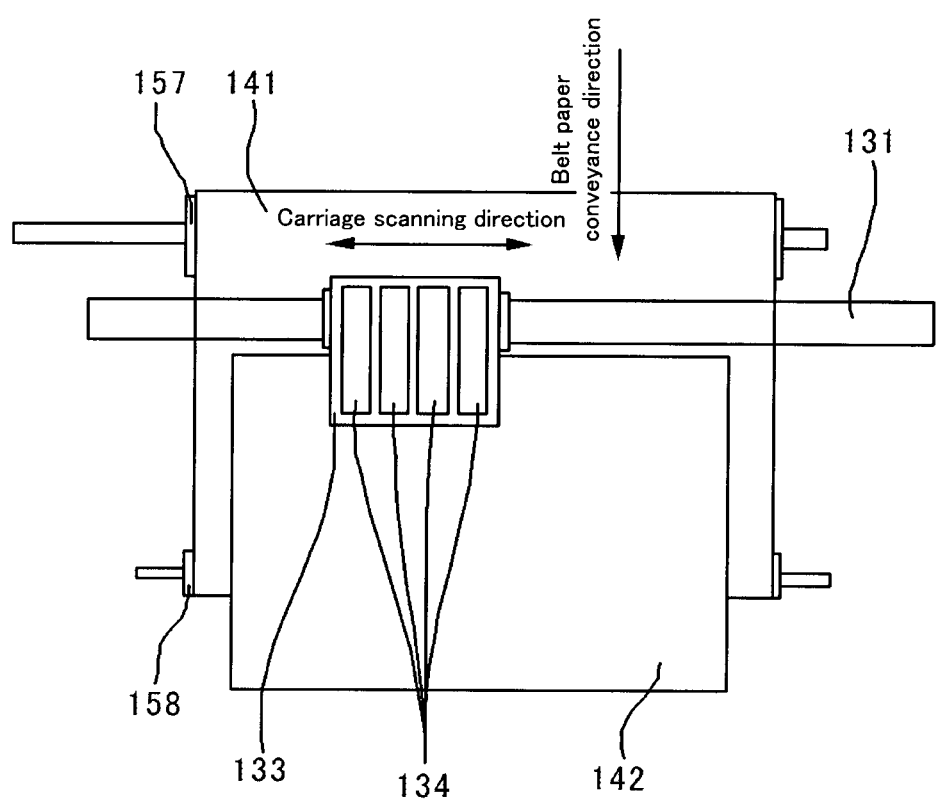
FIG. 5 is a schematic enlarger diagram for illustrating one example of an inkjet head for use in the present invention.

In the device main body 101, as illustrated in FIGS. 4 and 5, a carriage 133 is freely slidably held in the main scanning direction by a guide rod 131, which is a guide member laterally passed between left and right side plates (not depicted), and a stay 132; and the carriage 133 is moved for scanning in the arrow direction in FIG. 5 by a main scanning motor (not depicted).

A recording head 134 composed of four ink-jet recording heads which eject recording ink droplets of yellow (Y), cyan (C), magenta (M) and black (Bk) is installed in the carriage 133 such that a plurality of ink ejection outlets are aligned in the direction intersecting the main scanning direction and that the ink droplet ejection direction faces downward.

For each of the ink-jet recording heads composing the recording head 134, it is possible to use, for example, a head provided with any of the following energy-generating units for ejecting ink: a piezoelectric actuator such as a piezoelectric element, a thermal actuator that uses a thermoelectric transducer such as a heat element and utilizes phase change caused by film boiling of a liquid, a shape-memory-alloy actuator that utilizes a metal phase change caused by a temperature change, and an electrostatic actuator that utilizes electrostatic force.

Also, the carriage 133 incorporates sub-tanks 135 of each color for supplying the inks of each color to the recording head 134. Each sub-tank 135 is supplied and replenished with the recording ink of the present invention from the ink cartridge 201 of the present invention loaded into the ink cartridge loading section 104, via a recording ink supply tube (not depicted).

Meanwhile, as a paper feed unit for feeding sheets of paper 142 loaded on a paper loading section (pressure plate) 141 of the paper feed tray 102, there are provided a half-moon roller (paper feed roller 143) which feeds the sheets of paper 142 one by one from the paper loading section 141, and a separation pad 144 which faces the paper feed roller 143 and is formed of a material with a large friction coefficient. This separation pad 144 is biased toward the paper feed roller 143 side.

As a conveyance unit for conveying the paper 142, which has been fed from this paper feed unit, under the recording head 134, there are provided a conveyance belt 151 for conveying the paper 142 by means of electrostatic adsorption; a counter roller 152 for conveying the paper 142, which is sent from the paper feed unit via a guide 145, such that the paper 142 is sandwiched between the counter roller 152 and the conveyance belt 151; a conveyance guide 153 for making the paper 142, which is sent upward in the substantially vertical direction, change its direction by approximately 90° and thusly correspond with the conveyance belt 151; and an end pressurizing roller 155 biased toward the conveyance belt 151 side by a pressing member 154. Also, there is provided a charging roller 156 as a charging unit for charging the surface of the conveyance belt 151.

The conveyance belt 151 is an endless belt and is capable of moving in circles in the belt conveyance direction, passed between a conveyance roller 157 and a tension roller 158. The conveyance belt 151 has, for example, a surface layer serving as a paper adsorbing surface, that is formed of a resinous material such as an ethylene-tetrafluoroethylene copolymer (ETFE) having a thickness of approximately 40 μm for which resistance control has not been conducted, and a back layer (intermediate resistance layer, ground layer) that is formed of the same material as this surface layer, for which resistance control has been conducted using carbon. On the back of the conveyance belt 151, a guide member 161 is placed correspondingly to a region where printing is carried out by the recording head 134. Additionally, as a paper discharge unit for discharging the paper 142 on which images have been recorded by the recording head 134, there are provided a separation pawl 171 for separating the paper 142 from the conveyance belt 151, a paper discharge roller 172 and a paper discharge small roller 173, with the paper discharge tray 103 being placed below the paper discharge roller 172.

A double-sided paper feed unit 181 is mounted on a rear surface portion of the device main body 101 in a freely detachable manner. The double-sided paper feed unit 181 takes in the paper 142 returned by rotation of the conveyance belt 151 in the opposite direction and reverses it, then refeeds it between the counter roller 152 and the conveyance belt 151. Additionally, a manual paper feed unit 182 is provided on an upper surface of the double-sided paper feed unit 181.

In this ink-jet recording device, the sheets of paper 142 are fed one by one from the paper feed unit, and the paper 142 fed upward in the substantially vertical direction is guided by the guide 145 and conveyed between the conveyance belt 151 and the counter roller 152. Further, the conveyance direction of the paper 142 is changed by approximately 90°, as an end of the paper 142 is guided by the conveyance guide 153 and pressed onto the conveyance belt 151 by the end pressurizing roller 155.

On this occasion, the conveyance belt 151 is charged by the charging roller 156, and the paper 142 is electrostatically adsorbed onto the conveyance belt 151 and thusly conveyed. Here, by driving the recording head 134 according to an image signal while moving the carriage 133, ink droplets are ejected onto the paper 142 having stopped so as to carry out recording for one line, and after the paper 142 is conveyed by a predetermined distance, recording for the next line is carried out. On receipt of a recording completion signal or such a signal as indicates that the rear end of the paper 142 has reached the recording region, recording operation is finished, and the paper 142 is discharged onto the paper discharge tray 103.

Once the amount of recording ink remaining in the sub-tanks 135 has been detected as too small, a required amount of recording ink is supplied from the ink cartridge 201 into the sub-tanks 135.

As to this ink-jet recording device, when recording ink in the ink cartridge 201 of the present invention has been used up, it is possible to replace only the ink bag 241 inside the ink cartridge 201 by dismantling the housing of the ink cartridge 201. Also, even when the ink cartridge 201 is longitudinally placed and employs a front-loading structure, it is possible to supply recording ink stably. Therefore, even when the device main body 101 is installed with little space over it, for example when the device main body 101 is stored in a rack or when an object is placed over the device main body 101, it is possible to replace the ink cartridge 201 with ease.

Note that, the example where a serial (shuttle) type inkjet recording device in which the carriage scans is explained above, but the present invention can be also applied for a line inkjet recording device equipped with a line-type head.

Figure 7:
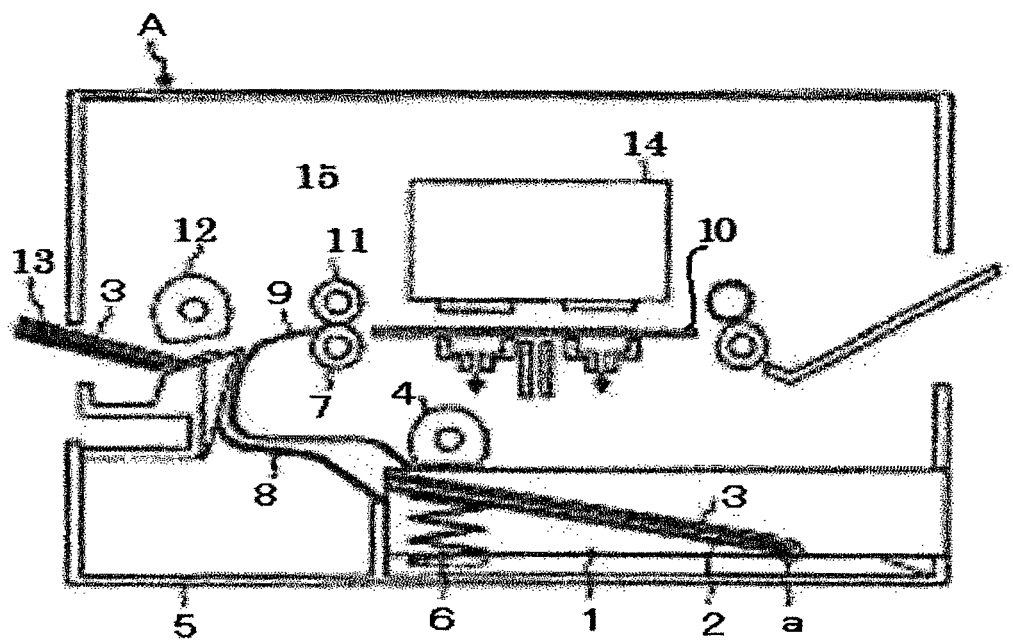
FIG. 7 is a schematic diagram illustrating one example of an internal structure of a prototype line head printing device used in the evaluation for curling.

FIG. 7 illustrates one example of a prototype line-head printing device used for the evaluation of curling in the present invention, and is a schematic diagram illustrating an internal structure of the prototype line-head printing device (image recording device A).

The image recording device A has a paper feeding tray 1 having the structure that a pressure plate 2, and a paper feeding roller 4 for feeding recording paper 3 are mounted on a base 5.

The pressure plate 2 is rotatable around the rotational axis (a) mounted on the base 5, and pressed against the paper feeding roller 4 by a pressure plate spring 6. A separation pad (not shown) formed of a material having a large friction coefficient such as a synthetic leather is provided at the portion of the pressure plate 2 facing the paper feeding roller 4 to prevent feeding of multiple recording paper 3.

Moreover, a release cam (not shown) is provided, and the release cam is configured to release the abutment of the paper feeding roller 4 on the pressure roller 2.

In the structure above, the pressure plate 2 is pressed down by the release cam to come into a certain position in the stand-by state, by which the abutment of the paper feeding roller 4 on the pressure roller 2 is released.

In this state, the release cam is released from the pressure plate 2 and the pressure plate 2 is lifted, as the driving force from the conveyance roller 7 is transmitted to the paper feeding roller 4 and release cam by a gear, to thereby abut the recording paper 3 on the paper feeding roller 4.

The recording paper 3 is picked up along with the rotation of the paper feeding roller 4 to start feeding paper, and is separated one by one with a separation claw.

The paper feeding roller 4 rotates to send the recording paper 3 to a platen 10 through the conveyance guides 8, and 9. The recording paper 3 is passed through between the conveyance guides 8 and 9 to be guided to the conveyance roller 7, and is then conveyed to the platen 10 by the conveyance roller 7 and the pinching roller 11.

Thereafter, the device is again in the stand-by state where the abut of the recording paper 3 on the paper feeding roller 4 is released, and the driving force from the conveyance roller 7 is disconnected.

The paper feeding roller for manual paper feeding 12 is to feed the recording paper 3 on a manual feeding tray 13 according to a recording instruction signal to thereby convey the recording paper 3 to the conveyance roller 7.

The recording paper 3 conveyed to the platen 10 is passed under a line-head 14. Here, the conveyance speed of the recording paper and timing of droplets ejection are adjusted based on a signal controlled by an electric circuit (not shown) to form a predetermined image.

The inkjet recording device and inkjet recording method of the present invention can be applied in various recording by the inkjet recording system, and can be particularly suitably used for or as an inkjet recording printer, a facsimile, a photocopier, a printer-fax-copier compound device.

<Ink Recorded Matter>

The ink recorded matter for use in the present invention is any recorded matter recorded by the inkjet recording device and/or inkjet recording method of the present invention.

The ink recorded matter of the present invention contain a recording medium, and an image formed on the recording medium with the inkjet ink of the present invention.

Moreover, the ink recorded matter contains a recording medium of an ink-media set, and an image formed on the recording medium with the inkjet ink of the ink-media set.

The recording media is appropriately selected depending on the intended purpose without any restriction, and examples thereof include plain paper, gloss paper, special paper, cloth, films, OHP sheets, common printing paper. These may be used independently, or in combination.

The ink recorded matter has a high quality image without any bleeding, and has excellent stability over time, and therefore can be suitably used in various uses such as documents to which various characters and/or images have been recorded.

EXAMPLES

Examples of the present invention will be explained hereinafter, but these examples shall not be construed as limiting the scope of the present invention in any way.

Production Example 1

A 300 mL-separable flask equipped with a stirrer, a thermocouple, and a nitrogen-inlet tube was charged with 19.828 g of N,N-dimethylacryl amide and 14.824 g of 1-butanol, and the resulting mixture was stirred while introducing the nitrogen gas into the flask. Subsequently, 0.338 g of sodium t-butoxide was added to the flask, and the resulting mixture was allowed to react at 35° C. for 4 hours. Upon completion of heating, 150 mg of phosphoric acid was added to the reaction solution, and the solution was then homogenized, followed by leaving to sand for 3 hours. The solution was then filtered to remove precipitates, and unreacted products were removed by an evaporator. The yield was 30.5 g (yield: 88%). The obtained material was subjected to the measurement of the spectrum of $^1$H-NMR, and peaks were observed at 0.95 ppm (3H), 1.3 ppm (4H) to 1.5 ppm (4H), 2.4 ppm (2H), 2.9 ppm (6H), 3.4 ppm (2H) and 3.7 ppm (2H). It was found from these results that the obtained material was the amide compound represented by the following formula (1).

<<>Amide Compound of Formula (1)>

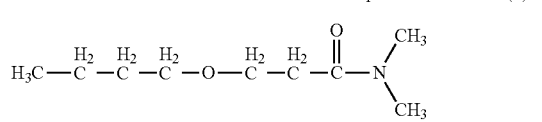

Preparation Example 1

| -Preparation of Water-Soluble Polymer Compound Solution A- | |
|---|---|
| α-olefin-maleic anhydride copolymer (T-YP112, manufactured by SEIKO PMC CORPORATION, olefin chain: C20-C24 (R in the general formula (A) is a C18-22 alkyl group), acid value: 190 mgKOH/g, weight average molecular weight: 10,000) | 10.0 parts by mass |
| 1N LiOH aqueous solution (1.2 times in an amount the acid value of the α-olefin-maleic anhydride copolymer represented by the general formula (A)) | 17.34 parts by mass |
| Ion exchanged water | 72.66 parts by mass |

The materials above were heated and stirred by a stirrer to dissolve the α-olefin-maleic anhydride copolymer represented by the general formula (A), and the resulting solution was passed through a filter having the average pore diameter of 5 μm to remove a trace of insoluble matter, to thereby prepare Water-Soluble Polymer Compound Aqueous Solution A.

Preparation Example 2

Preparation of Surface-Treated Black Pigment Dispersion Liquid

To a 2.5N sodium sulfate solution (3,000 mL), 90 g of carbon black having the CTAB specific surface area of 150 m$^2$/g, and DBP oil absorption of 100 mL/100 g was added, and the resulting mixture was allowed to react for 10 hours with stirring at the temperature of 60° C., at the rate of 300 rpm, to thereby proceed to an oxidation treatment. The resulting reaction solution was subjected to filtration to separate the carbon black, and the separated carbon black was then neutralized with a sodium hydroxide solution, followed by subjected to ultrafiltration.

The obtained carbon black was washed with water, and then dried. Then, the carbon black was dispersed in pure water so that the solid content thereof was to be 30% by mass, and the dispersion was then sufficiently stirred to thereby obtain a black pigment dispersion liquid. The average particle diameter ($D_{50}$) of the pigment dispersion elements in the black pigment dispersion liquid was measured, and the result thereof was 103 nm. Note that, for the measurement of the average particle diameter ($D_{50}$), a particle size distribution measuring device (NANOTRACK UPA-EX150, manufactured by Nikkiso Co., Ltd.) was used.

Preparation Example 3

Preparation of Magenta Pigment-Containing Polymer Particle Dispersion Liquid <Preparation of Polymer Solution A>
A 1 L-flask equipped with a mechanical stirrer, a thermometer, a nitrogen-inlet tube, a reflux tube and a dropping funnel, which had been sufficiently purged with nitrogen gas, was charged with 11.2 g of styrene, 2.8 g of acrylic acid, 12.0 g of lauryl methacrylate, 4.0 g of polyethylene glycol methacrylate, 4.0 g of styrene macromer, and 0.4 g of mercaptoethanol, and the resulting mixture was mixed and heated to 65° C.

Next, a mixed solution of styrene (100.8 g), acrylic acid (25.2 g), lauryl methacrylate (108.0 g), polyethylene glycol methacrylate (36.0 g), hydroxylethyl methacrylate (60.0 g), styrene macromer (36.0 g), mercaptoethanol (3.6 g), azobis methylvaleronitrile (2.4 g), and methyl ethyl ketone (18 g) was added dropwise into the flask over 2.5 hours. Thereafter, a mixed solution of azobis methylvaleronitrile (0.8 g) and methyl ethyl ketone (18 g) was added dropwise into the flask for 0.5 hours. After aging the mixture at 65° C. for 1 hour, 0.8 g of azobis methylvaleronitrile was added thereto, and the resulting mixture was further aged for 1 hour. Upon completion of the reaction, methyl ethyl ketone (364 g) was added to the flask, to thereby obtain 800 g of Polymer Solution A having a concentration of 50% by mass.

<Preparation of Pigment-Containing Polymer Particle Dispersion Liquid>
After sufficiently stirring a mixture of Polymer Solution A (28 g), C.I. Pigment Red 122 (42 g), a 1 mol/L potassium hydroxide aqueous solution (13.6 g), methyl ethyl ketone (20 g), and ion-exchanged water (13.6 g), the resulting mixture was kneaded by a roll mill. To the obtained paste, 200 g of pure water was added, the resulting mixture was sufficiently stirred, and methyl ethyl ketone and water were removed from the resulting dispersion liquid using an evaporator, followed by subjected to pressure filtration with a polyvinylidene fluoride membrane filter having the average pore diameter of 5.0 μm to remove coarse particles from the dispersion liquid, to thereby obtain a magenta pigment-containing polymer particle dispersion liquid containing 15% by mass of the pigment, and having the solid content of 20% by mass. The average particle diameter ($D_{50}$) of the polymer particles in the obtained magenta pigment-containing polymer particle dispersion liquid was measured, and the result was 127 nm. Note that, for the measurement of the average particle diameter ($D_{50}$), a particle size distribution measuring device (NANOTRACK UPA-EX150, manufactured by Nikkiso Co., Ltd.) was used.

Preparation Example 4

Preparation of Cyan Pigment-Containing Polymer Particle Dispersion Liquid

A cyan pigment-containing polymer particle dispersion liquid of Preparation Example 4 was prepared in the same manner as in Preparation Example 3, provided that the pigment was changed from C.I. Pigment Red 122 to a phthalocyanine pigment (C.I. Pigment Blue 15:3).

The average particle diameter ($D_{50}$) of the polymer particles in the obtained cyan pigment-containing polymer particle dispersion liquid was measured by a particle size distribution measuring device (NANOTRACK UPA-EX150, manufactured by Nikkiso Co., Ltd.), and the result was 93 nm.

Preparation Example 5

Preparation of Yellow Pigment-Containing Polymer Particle Dispersion Liquid

A yellow pigment-containing polymer particle dispersion liquid of Preparation Example 5 was prepared in the same manner as in Preparation Example 3, provided that the pigment was changed from C.I. Pigment Red 122 to a monoazo yellow pigment (C.I. Pigment Yellow 74).

The average particle diameter ($D_{50}$) of the polymer particles in the obtained yellow pigment-containing polymer particle dispersion liquid was measured by a particle size distribution measuring device (NANOTRACK UPA-EX150, manufactured by Nikkiso Co., Ltd.), and the result was 76 nm.

Preparation Example 6

Preparation of Carbon Black Pigment-Containing Polymer Particle Dispersion Liquid A carbon black pigment-containing polymer particle dispersion liquid of Preparation Example 6 was prepared in the same manner as in Preparation Example 3, provided that the pigment was changed from C.I. Pigment Red 122 to carbon black (FW100, of Degussa AG).

The average particle diameter ($D_{50}$) of the polymer particles in the obtained carbon black pigment-containing polymer particle dispersion liquid was measured by a particle size distribution measuring device (NANOTRACK UPA-EX150, manufactured by Nikkiso Co., Ltd.), and the result was 104 nm.

Preparation Example 7

| -Preparation of Yellow Pigment Surfactant Dispersion Liquid- | |
|---|---|
| Monoazo yellow pigment (C.I. Pigment Yellow 74, manufactured by Dainichiseika Color & Chemicals Mfg. Co., Ltd.) | 30.0 parts by mass |
| Polyoxyethylene styrene phenyl ether (nonionic surfactant, NOIGEN EA-177 manufactured by Dai-ichi Kogyo Seiyaku Co., Ltd., HLB value: 15.7) | 10.0 parts by mass |
| Ion exchanged water | 60.0 parts by mass |

At first, the aforementioned surfactant was dissolved in ion-exchanged water, and to this the aforementioned pigment was mixed to sufficiently wet the pigment. The resulting mixture was dispersed at 2,000 rpm for 2 hours by a wet disperser (DYNO-MILL KDL A, of Glen Mills) filled with zirconia beads having diameters of 0.5 mm, to thereby obtain a primary pigment dispersion liquid.

To the primary pigment dispersion liquid, 4.26 parts by mass of a water-soluble polyurethane resin (TAKELAC W-5661, manufactured by Mitsui Chemicals, Inc., active ingredient: 35.2% by mass, acid value: 40 mgKOH/g, molecular weight: 18,000) was added as a water-soluble polymer compound aqueous solution, and the resulting mixture was sufficiently stirred to thereby obtain a yellow pigment surfactant dispersion liquid. The average particle diameter ($D_{50}$) of the pigment dispersion elements in the obtained yellow pigment surfactant dispersion liquid was measured and the result was 62 nm. Note that, for the measurement of the average particle diameter ($D_{50}$), a particle size distribution measuring device (NANOTRACK UPA-EX150, manufactured by Nikkiso Co., Ltd.) was used.

Preparation Example 8

| -Preparation of Magenta Pigment Surfactant Dispersion Liquid- | |
|---|---|
| Quinacridon pigment (C.I. Pigment Red 122, manufactured by Dainichiseika Color & Chemicals Mfg. Co., Ltd.) | 30.0 parts by mass |
| Polyoxyethylene-β-naphthyl ether (nonionic surfactant, RT-100 manufactured by Takemoto Oil&Fat Co., Ltd., HLB value: 18.5) | 10.0 parts by mass |
| Ion exchanged water | 60.0 parts by mass |

At first, the aforementioned surfactant was dissolved in ion-exchanged water, and to this the aforementioned pigment was mixed to sufficiently wet the pigment. The resulting mixture was dispersed at 2,000 rpm for 2 hours by a wet disperser (DYNO-MILL KDL A, of Glen Mills) filled with zirconia beads having diameters of 0.5 mm, to thereby obtain a primary pigment dispersion liquid.

To the primary pigment dispersion liquid, 7.14 parts by mass of a water-soluble styrene-(meth)acryl copolymer (JC-05, manufactured by SEIKO PMC CORPORATION, active ingredient: 21% by mass, acid value: 170 mgKOH/g, weight average molecular weight: 16,000) was added, and the resulting mixture was sufficiently stirred to thereby obtain a magenta pigment surfactant dispersion liquid. The average particle diameter ($D_{50}$) of the pigment dispersed elements in the obtained magenta pigment surfactant dispersion liquid was measured, and the result was 83 nm. Note that, for the measurement of the average particle diameter ($D_{50}$), a particle size distribution measuring device (NANOTRACK UPA-EX150, manufactured by Nikkiso Co., Ltd.) was used.

Preparation Example 9

| -Preparation of Cyan Pigment Surfactant Dispersion Liquid A- | |
|---|---|
| phthalocyanine pigment (C.I. Pigment Blue 15:3, manufactured by Dainichiseika Color & Chemicals Mfg. Co., Ltd.) | 30.0 parts by mass |
| Polyoxyethylene styrene phenyl ether (nonionic surfactant, NOIGEN EA-177 manufactured by Dai-ichi Kogyo Seiyaku Co., Ltd., HLB value: 15.7) | 10.0 parts by mass |
| Ion exchanged water | 60.0 parts by mass |

At first, the aforementioned surfactant was dissolved in ion-exchanged water, and to this the aforementioned pigment was mixed to sufficiently wet the pigment. The resulting mixture was dispersed at 2,000 rpm for 2 hours by a wet disperser (DYNO-MILL KDL A, of Glen Mills) filled with zirconia beads having diameters of 0.5 mm, to thereby obtain a primary pigment dispersion liquid.

To the primary pigment dispersion liquid, 7.51 parts by mass of Water-Soluble Polymer Compound Aqueous Solution A prepared in Preparation Example 1 and 2.51 parts by mass of a water-soluble polyester resin (NICHIGO POLYESTER W-0030, manufactured by Nippon Synthetic Chemical Industry Co., Ltd., active ingredient: 29.9% by mass, acid value: 100 mgKOH/g, weight average molecular weight: 7,000) were added, and the resulting mixture was sufficiently stirred to thereby obtain a cyan pigment surfactant dispersion liquid A. The average particle diameter ($D_{50}$) of the pigment dispersed elements in the obtained cyan pigment surfactant dispersion liquid A was measured and the result was 78 nm. Note that, for the measurement of the average particle diameter ($D_{50}$), a particle size distribution measuring device (NANOTRACK UPA-EX150, manufactured by Nikkiso Co., Ltd.) was used.

Example 1

Preparation of Inkjet Ink

An inkjet ink of Example 1 was prepared using respective materials presented in Table 2. Specifically, an organic solvent (wetting agent), i.e. 10.00 parts (parts by mass, "parts" represents the same hereinafter) of glycerin and 10.00 parts of 1.3-butanediol, a penetrating agent, i.e. 2.00 parts of 2-ethyl-1,3-hexanediol, a surfactant, i.e. 2.50 parts of Zonyl FS-300 (see the notes below for details), and an antifungal agent, i.e. 0.005 parts of Proxel GXL (see the notes below for details) were mixed, and the resulting mixture was stirred for 1 hour to homogeneously mix the mixture. To this mixture, a predetermined amount of pure water containing 10.00 parts of the amide compound represented by the formula (1) and 10.00 parts of the compound represented by the following formula (8) was added, and the resulting mixture was stirred for 1 hour. To the resulting mixture, a pigment dispersion liquid (i.e. the black pigment-containing polymer particle dispersion liquid of Preparation Example 6), a defoaming agent (i.e. a silicone defoaming agent), a pH regulator (i.e., 0.3 parts of 2-amino-2-ethyl-1,3-propanediol), and a balance of pure water for the resulting ink to be 100 parts were added, and the mixture was stirred for 1 hour. The resulting dispersion liquid was subjected to pressure filtration with a polyvinylidene fluoride membrane filter having the average pore diameter of 0.8 μm to remove coarse particles or dusts, to thereby prepare an inkjet ink of Example 1.

<<Compound of Formula (8)>>

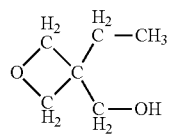

Example 2

An inkjet ink of Example 2 was prepared in the same manner as in Example 1, provided that, as presented in Table 2, in addition to the amide compound represented by the formula (1) (10.00 parts) and the compound represented by the formula (8) (10.00 parts), 5.00 parts of the amide compound represented by the structural formula (V) was further added (note that, the balance of the pure water required for the ink to be 100 parts was different from that in Example 1 by the added amount of the amide compound represented by the structural formula (V), which would be also the same in the following examples).

Structural Formula (V)

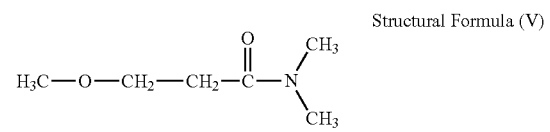

Example 3

An inkjet ink of Example 3 was prepared in the same manner as in Example 1, provided that, as presented in Table 2, 10.00 parts of the amide compound represented by the general formula (1) and 10.00 parts of the compound represented by the structural formula (8) were replaced with 10.00 parts of the amide compound represented by the general formula (1), 10.00 parts of the compound represented by the structural formula (4), and 10.00 parts of the amide compound represented by the structural formula (V); and 10.00 parts of glycerin and 10.00 parts of 1,3-butanediol, and 2.00 parts of 2-ethyl-1,3-hexanediol were replaced with 15.00 parts of glycerin and 2.00 parts of 2-ethyl-1,3-hexanediol.

<<Compound of Formula (4)>>

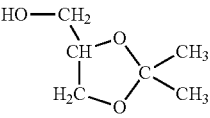

Example 4

An inkjet ink of Example 4 was prepared in the same manner as in Example 1, provided that, as presented in Table 2, 10.00 parts of the amide compound represented by the formula (1) and 10.00 parts of the compound represented by the formula (8) were replaced with 10.00 parts of the amide compound represented by the formula (1), 10.00 parts of the compound represented by the following formula (18), and 10.00 parts of the amide compound represented by the structural formula (V); and 10.00 parts of glycerin and 10.00 parts of 1,3-butanediol, and 2.00 parts of 2-ethyl-1,3-hexanediol were respectively replaced with 15.00 parts of glycerin and 2.00 parts of 2-ethyl-1,3-hexanediol.

<<Compound of Formula (18)>>

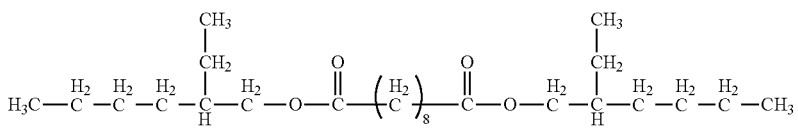

Example 5

An inkjet ink of Example 5 was prepared in the same manner as in Example 1, provided that, as presented in Table 3, 50.00 parts of the black pigment dispersion liquid of Preparation Example 6 was replaced with 33.33 parts of the cyan pigment dispersion liquid of Preparation Example 4; the amount of 1.3-butanediol was changed from 10.00 parts to 15.00 parts; the penetrating agent (2.00 parts of 2-ethyl-1,3-hexanediol) was not added; and the amount of Zonyl FS-300 was changed from 2.50 parts to 1.25 parts.

Example 6

An inkjet ink of Example 6 was prepared in the same manner as in Example 5, provided that, as presented in Table 3, 2.00 parts of 2,2,4-trimethyl-1,3-pentanediol was added as the penetrating agent, instead of adding (using) no 2-ethyl-1,3-hexanediol in Example 5.

Example 7

An inkjet ink of Example 7 was prepared in the same manner as in Example 5, provided that, as presented in Table 3, 10.00 parts of the amide compound represented by the formula (1) and 10.00 parts of the compound represented by the formula (4) were replaced with 10.00 parts of the amide compound represented by the formula (1), 10.00 parts of the compound represented by the formula (8), and 5.00 parts of the amide compound represented by the structural formula (V); and as the penetrating agent 2.00 parts of 2-ethyl-1,3-hexanediol was added whereas no penetrating agent was added in Example 5.

Example 8

An inkjet ink of Example 8 was prepared in the same manner as in Example 7, provided that, as presented in Table 3, 15.00 parts of 1.3-butanediol was replaced with 15.00 parts of 3-methyl-1.3-butanediol.

Example 9

An inkjet ink of Example 9 was prepared in the same manner as in Example 7, provided that, as presented in Table 4, 33.33 parts of the cyan pigment dispersion liquid of Preparation Example 4 was replaced with 33.33 parts of the yellow pigment dispersion liquid of Preparation Example 5; 10.00 parts of the amide compound represented by the formula (1), 10.00 parts of the compound represented by the formula (8), and 5.00 parts of amide compound represented by the structural formula (V) were replaced with 20.00 parts of the amide compound represented by the formula (1), 10.00 parts of the compound represented by the formula (18), and 5.00 parts of the amide compound represented by the structural formula (V); and 10.00 parts of glycerin, 15.00 parts of 1.3-butanediol, and 2.00 parts of 2-ethyl-1,3-hexanediol were replaced with 10.00 parts of glycerin, 15.00 parts of 1.3-butanediol, and 2.00 parts of 2,2,4-trimethyl-1,3-pentanediol.

Example 10

An inkjet ink of Example 10 was prepared in the same manner as in Example 9, provided that, as presented in Table 4, 20.00 parts of the amide compound represented by the formula (1), 10.00 parts of the compound represented by the formula (18), and 5.00 parts of the amide compound represented by the structural formula (V) were replaced with 30.00 parts of the amide compound represented by the formula (1), 5.00 parts of the compound represented by the formula (18), and 5.00 parts of the amide compound represented by the structural formula (V); and 2.00 parts of 2,2,4-trimethyl-1,3-pentanediol was replaced with 1.00 part of 2,2,4-trimethyl-1,3-pentanediol and 1.00 part of 2-ethyl-1,3-hexanediol.

Example 11

An inkjet ink of Example 11 was prepared in the same manner as in Example 9, provided that, as presented in Table 4, 33.33 parts of the yellow pigment-containing polymer particle dispersion liquid of Preparation Example 5 was replaced with 53.33 parts of the magenta pigment-containing polymer particle dispersion liquid of Preparation Example 3; 20.00 parts of the amide compound represented by the formula (1), 10.00 parts of the compound represented by the formula (18), and 5.00 parts of the amide compound represented by the structural formula (V) were replaced with 10.00 parts of the amide compound represented by the formula (1), 7.50 parts of the compound represented by the formula (8), and 6.00 parts of the amide compound represented by the structural formula (V); 10.00 parts of glycerin, 15.00 parts of 1,3-butanediol, and 2.00 parts of 2,2,4-trimethyl-1,3-pentanediol were replaced with 10.00 parts of glycerin and 2.00 parts of 2-ethyl-1,3-hexanediol; and the surfactant was changed from ZONYL FS-300 to 1.00 part of KF-643 (see the notes below for details).

Example 12

An inkjet ink of Example 12 was prepared in the same manner as in Example 11, provided that, as presented in Table 4, 53.33 parts of the magenta pigment-containing polymer particle dispersion liquid of Preparation Example 3 was replaced with 30.00 parts of the black pigment dispersion liquid of Preparation Example 2; 10.00 parts of the amide compound represented by the formula (1), 7.50 parts of the compound represented by the formula (8), and 6.00 parts of the amide compound represented by the structural formula (V) were replaced with 12.50 parts of the amide compound represented by the formula (1), 10.00 parts of the compound represented by the formula (18), and 7.50 parts of the amide compound represented by the structural formula (V); and 10.00 parts of glycerin, 10.00 parts of 2-ethyl-1,3-hexanediol, and the penetrating agent (i.e., 2.00 parts of 2-ethyl-1,3-hexanediol) were replaced with 10.00 parts of glycerin, 15.00 parts of 2-methyl-1,3-butanediol, and as the penetrating agent, 2.00 parts of 2-ethyl-1,3-hexanediol, respectively.

Example 13

An inkjet ink of Example 13 was prepared in the same manner as in Example 9, provided that, as presented in Table 5, 33.33 parts of the yellow pigment-containing polymer particle dispersion liquid of Preparation Example 5 was replaced with 13.90 parts of the yellow pigment surfactant dispersion liquid of Preparation Example 7; 5.38 parts of the acryl-silicone resin emulsion (see the notes below for details) was further added as a water-dispersible resin; 20.00 parts of the amide compound represented by the formula (1), 10.00 parts of the compound represented by the formula (18), and 5.00 parts of the amide compound represented by the structural formula (V) were replaced with 15.00 parts of the amide compound represented by the formula (1), 10.00 parts of the compound represented by the formula (8), and 10.00 parts of the amide compound represented by the structural formula (V); 10.00 parts of glycerin, 15.00 parts of 1,3-butanediol, and 2.00 parts of 2,2,4-trimethyl-1,3-pentanediol were replaced with 10.00 parts of glycerin, 20.00 parts of 3-methyl-1,5-pentanediol, and 2.00 parts of 2-ethyl-1,3-hexanediol; and the surfactant was changed from 1.25 parts of ZONYL FS-300 to 1.00 part of KF-643 (see the notes below for details).

Example 14

An inkjet ink of Example 14 was prepared in the same manner as in Example 13, provided that, as presented in Table 5, 13.90 parts of the yellow pigment surfactant dispersion liquid of Preparation Example 7 was replaced with 28.57 parts of magenta pigment surfactant dispersion liquid of Preparation Example 8; 15.00 parts of the amide compound represented by the formula (1), 10.00 parts of the compound represented by the formula (8), and 10.00 parts of the amide compound represented by the structural formula (V) were replaced with 7.50 parts of the amide compound represented by the formula (1), 10.00 parts of the compound represented by the formula (18), and 5.00 parts of the amide compound represented by the structural formula (V); and 10.00 parts of glycerin, 20.00 parts of 3-methyl-1,5-pentanediol, and 2.00 parts of 2-ethyl-1,3-hexanediol were replaced with 10.00 parts of glycerin, 14.00 parts of 1,3-butanediol, and 2.00 parts of 2-ethyl-1,3-hexanediol.

Example 15

An inkjet ink of Example 15 was prepared in the same manner as in Example 13, provided that, as presented in Table 5, 13.90 parts of the yellow pigment surfactant dispersion liquid of Preparation Example 7 was replaced with 14.67 parts of the cyan pigment surfactant dispersion liquid of Preparation Example 9; 15.00 parts of the amide compound represented by the formula (1), 10.00 parts of the compound represented by the formula (8), and 10.00 parts of the amide compound represented by the structural formula (V) were replaced with 7.50 parts of the amide compound represented by the formula (1), 10.00 parts of the compound represented by the formula (18), and 5.00 parts of the amide compound represented by the structural formula (V); and 10.00 parts of glycerin, 20.00 parts of 3-methyl-1,5-pentanediol, and 2.00 parts of 2-ethyl-1,3-hexanediol were replaced with 10.00 parts of glycerin, 17.00 parts of 1,3-butanediol, and 2.00 parts of 2-ethyl-1,3-hexanediol.

Example 16

An inkjet ink of Example 16 was prepared in the same manner as in Example 13, provided that, as presented in Table 5, 13.90 parts of the yellow pigment surfactant dispersion liquid of Preparation Example 7 was replaced with 50.00 parts of the black pigment-containing polymer particle dispersion liquid of Preparation Example 6; 5.38 parts of the acryl-silicone resin emulsion contained in the ink of Example 13 was not added; 15.00 parts of the amide compound represented by the formula (1), 10.00 parts of the compound represented by the formula (8), and 10.00 parts of the amide compound represented by the structural formula (V) were replaced with 3.00 parts of the amide compound represented by the formula (1), 5.00 parts of the compound represented by the formula (8), and 5.00 parts of the amide compound represented by the structural formula (V); 10.00 parts of glycerin, 20.00 parts of 3-methyl-1,5-pentanediol, and 2.00 parts of 2-ethyl-1,3-hexanediol were replaced with 15.00 parts of glycerin, 10.00 parts of 2-methyl-1,3-butanediol, and 2.00 parts of 2-ethyl-1,3-hexanediol; and 2.50 parts of ZONYL FS-300 (the surfactant) was further added.

Example 17

An inkjet ink of Example 17 was prepared in the same manner as in Example 13, provided that, as presented in Table 6, 13.90 parts of the yellow pigment surfactant dispersion liquid of Preparation Example 7 was replaced with 14.67 parts of the cyan pigment surfactant dispersion solution of Preparation Example 9; 5.38 parts of the acryl-silicone resin emulsion was replaced with 4.44 parts of the polyurethane (see the notes below for the details); 15.00 parts of the amide compound represented by the formula (1), 10.00 parts of the compound represented by the formula (8), and 10.00 parts of the amide compound represented by the structural formula (V) were replaced with 10.00 parts of the amide compound represented by the formula (1), 3.00 parts of the compound represented by the formula (8), and 50.00 parts of the amide compound represented by the structural formula (V); 10.00 parts of glycerin, 20.00 parts of 3-methyl-1,5-pentanediol, and 2.00 parts of 2-ethyl-1,3-hexanediol were replaced with 10.00 parts of glycerin, and 2.00 parts of 2,2,4-trimethyl-1,3-pentanediol; and 0.50 parts of SOFTAL FP-7025 was further added.

Example 18

An inkjet ink of Example 18 was prepared in the same manner as in Example 12, provided that, as presented in Table 6, 25.00 parts of the surface-treated black pigment dispersion liquid of Preparation Example 2, 5.38 parts of the acryl-silicone resin emulsion, 11.50 parts of the amide compound represented by the formula (1), 10.00 parts of the compound represented by the formula (8), 8.50 parts of the amide compound represented by the structural formula (V), 8.00 parts of glycerin, 2.00 parts of 2-ethyl-1,3-hexanediol, 1.25 parts of ZONYL FS-300, 0.05 parts of Proxel GXL, 0.10 parts of the silicone defoaming agent KM-72F, and 0.9 parts of 2-amino-2-ethyl-1,3-propanediol (the pH regulator) were used.

Example 19

An inkjet ink of Example 19 was prepared in the same manner as in Example 18, provided that, as presented in Table 6, 11.50 parts of the amide compound represented by the formula (1), 10.00 parts of the compound represented by the formula (8), 8.50 parts of the amide compound represented by the structural formula (V), 8.00 parts of glycerin, and 2.00 parts of 2-ethyl-1,3-hexanediol were replaced with 10.00 parts of the amide compound represented by the formula (1), 10.00 parts of the compound represented by the formula (8), 11.50 parts of the amide compound represented by the structural formula (V), 12.00 parts of glycerin, and 1.00 parts of 2-ethyl-1,3-hexanediol, respectively.

Example 20

An inkjet ink of Example 20 was prepared in the same manner as in Example 18, provided that, as presented in Table 6, 25.00 parts of the surface-treated black pigment dispersion solution of Preparation Example 2 was replaced with 18.67 parts of the surface-treated black pigment dispersion liquid of Preparation Example 2 and 16.00 parts of the black pigment-containing polymer particle dispersion liquid of Preparation Example 6; and instead of the respective materials used in Example 18, 2.69 parts of the acryl-silicone resin emulsion, 8.50 parts of the amide compound represented by the formula (1), 10.00 parts of the compound represented by the formula (8), 11.50 parts of the amide compound represented by the structural formula (V), 10.00 parts of glycerin, and 2.00 parts of 2-ethyl-1,3-hexanediol were used.

Example 21

An inkjet ink of Example 21 was prepared in the same manner as in Example 5, provided that, as presented in Table 7, 33.33 parts of the cyan pigment-containing polymer particle dispersion liquid of Preparation Example 4 was replaced with 3.00 parts of the cyan pigment-containing polymer particle dispersion liquid of Preparation Example 4 and 14.89 parts of the cyan pigment surfactant dispersion liquid of Preparation Example 9; and instead of the respective materials used in Example 5, 11.50 parts of the amide compound represented by the formula (1), 12.50 parts of the compound represented by the formula (8), 10.00 parts of the amide compound represented by the structural formula (V), 10.00 parts of glycerin, 1.00 parts of 2-ethyl-1,3-hexanediol, 1.25 parts of ZONYL FS-300, 0.05 parts of Proxel GXL, 0.10 parts of the silicone defoaming agent KM-72F, and 0.3 parts of 2-amino-2-ethyl-1,3-propanediol (the pH regulator) were used.

Example 22

An inkjet ink of Example 22 was prepared in the same manner as in Example 11, provided that, as presented in Table 7, 53.33 parts of the magenta pigment-containing polymer particle dispersion liquid of Preparation Example 3 was replaced with 5.00 parts of the magenta pigment-containing polymer particle dispersion liquid of Preparation Example 3 and 24.11 parts of the magenta surfactant dispersion liquid of Preparation Example 8; and instead of the respective materials used in Example 11, 8.50 parts of the amide compound represented by the formula (1), 10.00 parts of the compound represented by the formula (8), 10.00 parts of the amide compound represented by the structural formula (V), 10.00 parts of glycerin, 1.00 parts of 2-ethyl-1,3-hexanediol, 1.25 parts of ZONYL FS-300, 0.05 parts of Proxel GXL, 0.10 parts of the silicone defoaming agent KM-72F, and 0.3 parts of 2-amino-2-ethyl-1,3-propanediol (the pH regulator).

Comparative Example 1

An inkjet ink of Comparative Example 1 was prepared in the same manner as in Example 1, provided that, as presented in Table 7, 10.00 parts of the amide compound represented by the formula (1) and 10.00 parts of the compound represented by the formula (8) were not used (not added); and 10.00 parts of glycerin, 10.00 parts of 1,3-butanediol, and 2.00 parts of 2-ethyl-1,3-hexanediol were replaced with 17.50 parts of glycerin, 17.50 parts of 1,3-butanediol, and 2.00 parts of 2-ethyl-1,3-hexanediol.

Comparative Example 2

An inkjet ink of Comparative Example 2 was prepared in the same manner as in Example 12, provided that, as presented in Table 7, 30.00 parts of the surface-treated black pigment dispersion liquid of Preparation Example 2 was replaced with 26.67 parts of the surface-treated black pigment dispersion liquid of Preparation Example 2; 12.25 parts of the amide compound represented by the formula (1), 10.00 parts of the compound represented by the formula (18), and 7.50 parts of the amide compound represented by the structural formula (V) were replaced with 10.00 parts of the amide compound represented by the structural formula (V); and 10.00 parts of glycerin and 2.00 parts of 2-ethyl-1,3-hexanediol were replaced with 20.00 parts of glycerin, 7.50 parts of 2-methyl-1,3-butanediol, 7.50 parts of 1,3-butanediol, and 2.00 parts of 2-ethyl-1,3-hexanediol.

Comparative Example 3

An inkjet ink of Comparative Example 3 was prepared in the same manner as in Example 12, provided that, as presented in Table 8, 12.25 parts of the amide compound represented by the formula (1), 10.00 parts of the compound represented by the formula (18), and 7.50 parts of the amide compound represented by the structural formula (V) were not used; and 10.00 parts of glycerin and 2.00 parts of 2-ethyl-1,3-hexanediol were replaced with 30.00 parts of glycerin, 7.50 parts of 2-methyl-1,3-butanediol, 15.50 parts of 1,3-butanediol, and 1.00 part of 2-ethyl-1,3-hexanediol.

Comparative Example 4

An inkjet ink of Comparative Example 4 was prepared in the same manner as in Example 1, provided that, as presented in Table 8, 50.00 parts of the black pigment-containing polymer particle dispersion liquid of Preparation Example 6 was replaced with 55.33 parts of the black pigment-containing polymer particle dispersion liquid of Preparation Example 6; 10.00 parts of the amide compound represented by the formula (1) and 10.00 parts of the compound represented by the formula (8) were not used (not added); 10.00 parts of glycerin, 10.00 parts of 1,3-butanediol, and 2.00 parts of 2-ethyl-1,3-hexanediol were replaced with 27.50 parts of 2-methyl-1,3-butanediol and 5.00 parts of propylene glycol; 2.50 parts of ZONYL FS-300 was replaced with 1.00 part of KF-643.

Comparative Example 5

An inkjet ink of Comparative Example 5 was prepared in the same manner as in Comparative Example 1, provided that, as presented in Table 8, 10.00 parts of the amide compound represented by the formula (1), which was not added in Comparative Example 1, was further added; and 17.50 parts of glycerin, 17.50 parts of 1,3-butanediol, and 2.00 parts of 2-ethyl-1,3-hexanediol were replaced with 20.00 parts of glycerin, 17.50 parts of 1,3-butanediol, and 2.00 parts of 2-ethyl-1,3-hexanediol.

Comparative Example 6

An inkjet ink of Comparative Example 6 was prepared in the same manner as in Comparative Example 1, provided that, as presented in Table 8, 10.00 parts of the compound represented by the formula (4), which was not added in Comparative Example 1, was further added; and 17.50 parts of glycerin, 17.50 parts of 1,3-butanediol, and 2.00 parts of 2-ethyl-1,3-hexanediol were replaced with 20.00 parts of glycerin, 17.50 parts of 1,3-butanediol, and 2.00 parts of 2-ethyl-1,3-hexanediol.

Comparative Example 7

An inkjet ink of Comparative Example 7 was prepared in the same manner as in Comparative Example 1, provided that, as presented in Table 9, 10.00 parts of the amide compound represented by the formula (8), which was not added in Comparative Example 1, was further added; and 17.50 parts of glycerin, 17.50 parts of 1,3-butanediol, and 2.00 parts of 2-ethyl-1,3-hexanediol were replaced with 20.00 parts of glycerin, and 17.50 parts of 1,3-butanediol.

Comparative Example 8

An inkjet ink of Comparative Example 8 was prepared in the same manner as in Comparative Example 1, provided that, as presented in Table 9, 10.00 parts of the compound represented by the formula (18), which was not added in Comparative Example 1, was further added; and 17.50 parts of glycerin, 17.50 parts of 1,3-butanediol, and 2.00 parts of 2-ethyl-1,3-hexanediol were replaced with 20.00 parts of glycerin, 17.50 parts of 1,3-butanediol, and 2.00 parts of 2-ethyl-1,3-hexanediol.

Comparative Example 9

An inkjet ink of Comparative Example 9 was prepared in the same manner as in Comparative Example 1, provided that, as presented in Table 9, 17.50 parts of glycerin, 17.50 parts of 1,3-butanediol, and 2.00 parts of 2-ethyl-1,3-hexanediol were replaced with 20.00 parts of glycerin, 22.00 parts of 3-methyl-1,3-butanediol, and 2.00 parts of 2-ethyl-1,3-hexanediol.

TABLE 2

| | Material (% by mass) | Ex. 1 | Ex. 2 | Ex. 3 | Ex. 4 |
|---|---|---|---|---|---|
| Pigment dispersion | Surface treated black pigment dispersion (Prep. Ex. 2) | — | — | — | — |
| | Magenta pigment-containing polymer particle dispersion (Prep. Ex. 3) | | | | |
| | Cyan pigment-containing polymer particle dispersion (Prep. Ex. 4) | | | | |
| | Yellow pigment-containing polymer particle dispersion (Prep. Ex. 5) | | | | |
| | Black pigment-containing polymer particle dispersion (Prep. Ex. 6) | 50.00 | 50.00 | 50.00 | 50.00 |
| | Yellow pigment surfactant dispersion (Prep. Ex. 7) | — | — | — | — |
| | Magenta pigment surfactant dispersion (Prep. Ex. 8) | — | — | — | — |
| | Cyan pigment surfactant dispersion (Prep. Ex. 9) | — | — | — | — |
| Water-dispersible resin | Acryl-silicone resin emulsion | — | — | — | — |
| | Polyurethane emulsion | — | — | — | — |
| Water-soluble organic solvent | Amide compound (1) | 10.00 | 10.00 | 10.00 | 10.00 |
| | Compound (4) | — | — | 10.00 | — |
| | Compound (8) | 10.00 | 10.00 | — | — |
| | Compound (18) | — | — | — | 10.00 |
| | Amide compound (V) | — | 5.00 | 10.00 | 10.00 |
| | 2-ethyl-1,3-hexanediol | — | — | — | — |
| | 2-methyl-1,3-butanediol | — | — | — | — |
| | 3-methyl-1,3-butanediol | — | — | — | — |
| | 3-methyl-1,5-pentanediol | — | — | — | — |
| | Propylene glycol | — | — | — | — |
| | Glycerin | 10.00 | 10.00 | 15.00 | 15.00 |
| | 1,3-butanediol | 10.00 | 10.00 | — | — |
| Penetrant | 2-ethyl-1,3-hexanediol | 2.00 | 2.00 | 2.00 | 2.00 |
| | 2,2,4-trimethyl-1,3-pentanediol | — | — | — | — |
| Surfactant | KF-643 | — | — | — | — |
| | Zonyl FS-300 | 2.50 | 2.50 | 2.50 | 2.50 |
| | Softanol EP-7025 | — | — | — | — |
| Antifungal | Proxel GXL | 0.05 | 0.05 | 0.05 | 0.05 |
| Defoaming | Silicone defoaming agent KM-72F | 0.10 | 0.10 | 0.10 | 0.10 |
| pH regulator | 2-amino-2-ethyl-1,3-propanediol | 0.3 | 0.3 | 0.3 | 0.3 |
| Pure water | | Bal. | Bal. | Bal. | Bal. |
| Total (% by mass) | | 100 | 100 | 100 | 100 |

TABLE 3

| | Material (% by mass) | Ex. 5 | Ex. 6 | Ex. 7 | Ex. 8 |
|---|---|---|---|---|---|
| Pigment dispersion | Surface treated black pigment dispersion (Prep. Ex. 2) | — | — | — | — |
| | Magenta pigment-containing polymer particle dispersion (Prep. Ex. 3) | | | | |
| | Cyan pigment-containing polymer particle dispersion (Prep. Ex. 4) | 33.33 | 33.33 | 33.33 | 33.33 |
| | Yellow pigment-containing polymer particle dispersion (Prep. Ex. 5) | — | — | — | — |
| | Black pigment-containing polymer particle dispersion (Prep. Ex. 6) | | | | |
| | Yellow pigment surfactant dispersion (Prep. Ex. 7) | | | | |
| | Magenta pigment surfactant dispersion (Prep. Ex. 8) | | | | |
| | Cyan pigment surfactant dispersion (Prep. Ex. 9) | | | | |
| Water-dispersible resin | Acryl-silicone resin emulsion | — | — | — | — |
| | Polyurethane emulsion | — | — | — | — |
| Water-soluble organic solvent | Amide compound (1) | 10.00 | 10.00 | 10.00 | 10.00 |
| | Compound (4) | — | — | — | — |
| | Compound (8) | 10.00 | 10.00 | 10.00 | 10.00 |
| | Compound (18) | — | — | — | — |
| | Amide compound (V) | — | — | 5.00 | 5.00 |
| | 2-ethyl-1,3-hexanediol | — | — | — | — |
| | 2-methyl-1,3-butanediol | — | — | — | — |
| | 3-methyl-1,3-butanediol | — | — | — | 15.00 |
| | 3-methyl-1,5-pentanediol | — | — | — | — |
| | Propylene glycol | — | — | — | — |
| | Glycerin | 10.00 | 10.00 | 10.00 | 10.00 |
| | 1,3-butanediol | 15.00 | 15.00 | 15.00 | — |
| Penetrant | 2-ethyl-1,3-hexanediol | — | — | 2.00 | 2.00 |
| | 2,2,4-trimethyl-1,3-pentanediol | — | 2.00 | — | — |
| Surfactant | KF-643 | — | — | — | — |
| | Zonyl FS-300 | 1.25 | 1.25 | 1.25 | 1.25 |
| | Softanol EP-7025 | — | — | — | — |
| Antifungal | Proxel GXL | 0.05 | 0.05 | 0.05 | 0.05 |
| Defoaming | Silicone defoaming agent KM-72F | 0.10 | 0.10 | 0.10 | 0.10 |
| pH regulator | 2-amino-2-ethyl-1,3-propanediol | 0.3 | 0.3 | 0.3 | 0.3 |
| Pure water | | Bal. | Bal. | Bal. | Bal. |
| Total (% by mass) | | 100 | 100 | 100 | 100 |

TABLE 4

| Material (% by mass) | | Ex. 9 | Ex. 10 | Ex. 11 | Ex. 12 |
|---|---|---|---|---|---|
| Pigment dispersion | Surface treated black pigment dispersion (Prep. Ex. 2) | — | — | — | 30.00 |
| | Magenta pigment-containing polymer particle dispersion (Prep. Ex. 3) | — | — | 53.33 | — |
| | Cyan pigment-containing polymer particle dispersion (Prep. Ex. 4) | — | — | — | — |
| | Yellow pigment-containing polymer particle dispersion (Prep. Ex. 5) | 33.33 | 33.33 | — | — |
| | Black pigment-containing polymer particle dispersion (Prep. Ex. 6) | — | — | — | — |
| | Yellow pigment surfactant dispersion (Prep. Ex. 7) | — | — | — | — |
| | Magenta pigment surfactant dispersion (Prep. Ex. 8) | — | — | — | — |
| | Cyan pigment surfactant dispersion (Prep. Ex. 9) | — | — | — | — |
| Water-dispersible resin | Acryl-silicone resin emulsion | — | — | — | — |
| | Polyurethane emulsion | — | — | — | — |
| Water-soluble organic solvent | Amide compound (1) | 20.00 | 30.00 | 10.00 | 12.50 |
| | Compound (4) | — | — | — | — |
| | Compound (8) | — | — | 7.50 | — |
| | Compound (18) | 10.00 | 5.00 | — | 10.00 |
| | Amide compound (V) | 5.00 | 5.00 | 6.00 | 7.50 |
| | 2-ethyl-1,3-hexanediol | — | — | 10.00 | — |
| | 2-methyl-1,3-butanediol | — | — | — | 15.00 |
| | 3-methyl-1,3-butanediol | — | — | — | — |
| | 3-methyl-1,5-pentanediol | — | — | — | — |
| | Propylene glycol | — | — | — | — |
| | Glycerin | 10.00 | 10.00 | 10.00 | 10.00 |
| | 1,3-butanediol | 15.00 | — | — | — |
| Penetrant | 2-ethyl-1,3-hexanediol | — | 1.00 | 2.00 | 2.00 |
| | 2,2,4-trimethyl-1,3-pentanediol | 2.00 | 1.00 | — | — |
| Surfactant | KF-643 | — | — | 1.00 | 1.00 |
| | Zonyl FS-300 | 1.25 | 1.25 | — | — |
| | Softanol EP-7025 | — | — | — | — |
| Antifungal | Proxel GXL | 0.05 | 0.05 | 0.05 | 0.05 |
| Defoaming | Silicone defoaming agent KM-72F | 0.10 | 0.10 | 0.10 | 0.10 |
| pH regulator | 2-amino-2-ethyl-1,3-propanediol | 0.3 | 0.3 | 0.3 | 0.3 |
| Pure water | | Bal. | Bal. | Bal. | Bal. |
| Total (% by mass) | | 100 | 100 | 100 | 100 |

TABLE 5

| Material (% by mass) | | Ex. 13 | Ex. 14 | Ex. 15 | Ex. 16 |
|---|---|---|---|---|---|
| Pigment dispersion | Surface treated black pigment dispersion (Prep. Ex. 2) | — | — | — | — |
| | Magenta pigment-containing polymer particle dispersion (Prep. Ex. 3) | — | — | — | — |
| | Cyan pigment-containing polymer particle dispersion (Prep. Ex. 4) | — | — | — | — |
| | Yellow pigment-containing polymer particle dispersion (Prep. Ex. 5) | — | — | — | — |
| | Black pigment-containing polymer particle dispersion (Prep. Ex. 6) | — | — | — | 50.00 |
| | Yellow pigment surfactant dispersion (Prep. Ex. 7) | 13.90 | — | — | — |
| | Magenta pigment surfactant dispersion (Prep. Ex. 8) | — | 28.57 | — | — |
| | Cyan pigment surfactant dispersion (Prep. Ex. 9) | — | — | 14.67 | — |
| Water-dispersible resin | Acryl-silicone resin emulsion | 5.38 | 5.38 | 5.38 | — |
| | Polyurethane emulsion | — | — | — | — |
| Water-soluble organic solvent | Amide compound (1) | 15.00 | 7.50 | 7.50 | 3.00 |
| | Compound (4) | — | — | — | — |
| | Compound (8) | 10.00 | — | — | 5.00 |
| | Compound (18) | — | 10.00 | 10.00 | — |
| | Amide compound (V) | 10.00 | 5.00 | 5.00 | 5.00 |
| | 2-ethyl-1,3-hexanediol | — | — | — | — |
| | 2-methyl-1,3-butanediol | — | — | — | 10.00 |
| | 3-methyl-1,3-butanediol | — | — | — | — |
| | 3-methyl-1,5-pentanediol | 20.00 | — | — | — |
| | Propylene glycol | — | — | — | — |
| | Glycerin | 10.00 | 10.00 | 10.00 | 15.00 |
| | 1,3-butanediol | — | 14.00 | 17.00 | — |
| Penetrant | 2-ethyl-1,3-hexanediol | 2.00 | 2.00 | 2.00 | 2.00 |
| | 2,2,4-trimethyl-1,3-pentanediol | — | — | — | — |
| Surfactant | KF-643 | 1.00 | 1.00 | 1.00 | — |
| | Zonyl FS-300 | — | — | — | 2.50 |
| | Softanol EP-7025 | — | — | — | — |
| Antifungal | Proxel GXL | 0.05 | 0.05 | 0.05 | 0.05 |
| Defoaming | Silicone defoaming agent KM-72F | 0.10 | 0.10 | 0.10 | 0.10 |
| pH regulator | 2-amino-2-ethyl-1,3-propanediol | 0.3 | 0.3 | 0.3 | 0.3 |
| Pure water | | Bal. | Bal. | Bal. | Bal. |
| Total (% by mass) | | 100 | 100 | 100 | 100 |

TABLE 6

| Material (% by mass) | | Ex. 17 | Ex. 18 | Ex. 19 | Ex. 20 |
|---|---|---|---|---|---|
| Pigment dispersion | Surface treated black pigment dispersion (Prep. Ex. 2) | — | 25.00 | 25.00 | 18.67 |
| | Magenta pigment-containing polymer particle dispersion (Prep. Ex. 3) | — | — | — | — |
| | Cyan pigment-containing polymer particle dispersion (Prep. Ex. 4) | — | — | — | — |
| | Yellow pigment-containing polymer particle dispersion (Prep. Ex. 5) | — | — | — | — |
| | Black pigment-containing polymer particle dispersion (Prep. Ex. 6) | — | — | — | 16.00 |
| | Yellow pigment surfactant dispersion (Prep. Ex. 7) | — | — | — | — |
| | Magenta pigment surfactant dispersion (Prep. Ex. 8) | — | — | — | — |
| | Cyan pigment surfactant dispersion (Prep. Ex. 9) | 14.67 | — | — | — |
| Water-dispersible resin | Acryl-silicone resin emulsion | — | 5.38 | 5.38 | 2.69 |
| | Polyurethane emulsion | 4.44 | — | — | — |
| Water-soluble organic solvent | Amide compound (1) | 10.00 | 11.50 | 10.00 | 8.50 |
| | Compound (4) | — | — | — | — |
| | Compound (8) | 3.00 | 10.00 | 10.00 | 10.00 |
| | Compound (18) | — | — | — | — |
| | Amide compound (V) | 50.00 | 8.50 | 11.50 | 11.50 |
| | 2-ethyl-1,3-hexanediol | — | — | — | — |
| | 2-methyl-1,3-butanediol | — | — | — | — |
| | 3-methyl-1,3-butanediol | — | — | — | — |
| | 3-methyl-1,5-pentanediol | — | — | — | — |
| | Propylene glycol | — | — | — | — |
| | Glycerin | 10.00 | 8.00 | 12.00 | 10.00 |
| | 1,3-butanediol | — | — | — | — |
| Penetrant | 2-ethyl-1,3-hexanediol | — | 2.00 | 1.00 | 2.00 |
| | 2,2,4-trimethyl-1,3-pentanediol | 2.00 | — | — | — |
| Surfactant | KF-643 | — | — | — | — |
| | Zonyl FS-300 | — | 1.25 | 1.25 | 1.25 |
| | Softanol EP-7025 | 0.50 | — | — | — |
| Antifungal | Proxel GXL | 0.05 | 0.05 | 0.05 | 0.05 |
| Defoaming | Silicone defoaming agent KM-72F | 0.10 | 0.10 | 0.10 | 0.10 |
| pH regulator | 2-amino-2-ethyl-1,3-propanediol | 0.3 | 0.9 | 0.9 | 0.9 |
| Pure water | | Bal. | Bal. | Bal. | Bal. |
| Total (% by mass) | | 100 | 100 | 100 | 100 |

TABLE 7

| Material (% by mass) | | Ex. 21 | Ex. 22 | Comp. Ex. 1 | Comp. Ex. 2 |
|---|---|---|---|---|---|
| Pigment dispersion | Surface treated black pigment dispersion (Prep. Ex. 2) | — | — | — | 26.67 |
| | Magenta pigment-containing polymer particle dispersion (Prep. Ex. 3) | — | 5.00 | — | — |
| | Cyan pigment-containing polymer particle dispersion (Prep. Ex. 4) | 3.00 | — | — | — |
| | Yellow pigment-containing polymer particle dispersion (Prep. Ex. 5) | — | — | — | — |
| | Black pigment-containing polymer particle dispersion (Prep. Ex. 6) | — | — | 50.00 | — |
| | Yellow pigment surfactant dispersion (Prep. Ex. 7) | — | — | — | — |
| | Magenta pigment surfactant dispersion (Prep. Ex. 8) | — | 24.11 | — | — |
| | Cyan pigment surfactant dispersion (Prep. Ex. 9) | 14.89 | — | — | — |
| Water-dispersible resin | Acryl-silicone resin emulsion | — | — | — | — |
| | Polyurethane emulsion | — | — | — | — |
| Water-soluble organic solvent | Amide compound (1) | 11.50 | 8.50 | — | — |
| | Compound (4) | — | — | — | — |
| | Compound (8) | 12.50 | 10.00 | — | — |
| | Compound (18) | — | — | — | — |
| | Amide compound (V) | 10.00 | 10.00 | — | 10.00 |
| | 2-ethyl-1,3-hexanediol | — | — | — | — |
| | 2-methyl-1,3-butanediol | — | — | — | 7.50 |
| | 3-methyl-1,3-butanediol | — | — | — | — |
| | 3-methyl-1,5-pentanediol | — | — | — | — |
| | Propylene glycol | — | — | — | — |
| | Glycerin | 10.00 | 10.00 | 17.50 | 20.00 |
| | 1,3-butanediol | — | — | 17.50 | 7.50 |
| Penetrant | 2-ethyl-1,3-hexanediol | 1.00 | 1.00 | 2.00 | 2.00 |
| | 2,2,4-trimethyl-1,3-pentanediol | — | — | — | — |
| Surfactant | KF-643 | — | — | — | — |
| | Zonyl FS-300 | 1.25 | 1.25 | 2.50 | 2.50 |
| | Softanol EP-7025 | — | — | — | — |
| Antifungal | Proxel GXL | 0.05 | 0.05 | 0.05 | 0.05 |
| Defoaming | Silicone defoaming agent KM-72F | 0.10 | 0.10 | 0.10 | 0.10 |
| pH regulator | 2-amino-2-ethyl-1,3-propanediol | 0.3 | 0.3 | 0.3 | 0.3 |
| Pure water | | Bal. | Bal. | Bal. | Bal. |
| Total (% by mass) | | 100 | 100 | 100 | 100 |

TABLE 8

| Material (% by mass) | | Comp. Ex. 3 | Comp. Ex. 4 | Comp. Ex. 5 | Comp. Ex. 6 |
|---|---|---|---|---|---|
| Pigment dispersion | Surface treated black pigment dispersion (Prep. Ex. 2) | 30.00 | — | — | — |
| | Magenta pigment-containing polymer particle dispersion (Prep. Ex. 3) | — | — | — | — |
| | Cyan pigment-containing polymer particle dispersion (Prep. Ex. 4) | — | — | — | — |
| | Yellow pigment-containing polymer particle dispersion (Prep. Ex. 5) | — | — | — | — |
| | Black pigment-containing polymer particle dispersion (Prep. Ex. 6) | — | 55.33 | 50.00 | 50.00 |
| | Yellow pigment surfactant dispersion (Prep. Ex. 7) | — | — | — | — |
| | Magenta pigment surfactant dispersion (Prep. Ex. 8) | — | — | — | — |
| | Cyan pigment surfactant dispersion (Prep. Ex. 9) | — | — | — | — |
| Water-dispersible resin | Acryl-silicone resin emulsion | — | — | — | — |
| | Polyurethane emulsion | — | — | — | — |
| Water-soluble organic solvent | Amide compound (1) | — | — | 10.00 | — |
| | Compound (4) | — | — | — | 10.00 |
| | Compound (8) | — | — | — | — |
| | Compound (18) | — | — | — | — |
| | Amide compound (V) | — | — | — | — |
| | 2-ethyl-1,3-hexanediol | — | — | — | — |
| | 2-methyl-1,3-butanediol | 7.50 | 27.50 | — | — |
| | 3-methyl-1,3-butanediol | — | — | — | — |
| | 3-methyl-1,5-pentanediol | — | — | — | — |
| | Propylene glycol | — | 5.00 | — | — |
| | Glycerin | 30.00 | — | 20.00 | 20.00 |
| | 1,3-butanediol | 15.00 | 10.00 | 17.50 | 17.50 |
| Penetrant | 2-ethyl-1,3-hexanediol | 1.00 | — | 2.00 | 2.00 |
| | 2,2,4-trimethyl-1,3-pentanediol | — | — | — | — |
| Surfactant | KF-643 | — | 1.00 | — | — |
| | Zonyl FS-300 | 1.25 | — | 2.50 | 2.50 |
| | Softanol EP-7025 | — | — | — | — |
| Antifungal | Proxel GXL | 0.05 | 0.05 | 0.05 | 0.05 |
| Defoaming | Silicone defoaming agent KM-72F | 0.10 | 0.10 | 0.10 | 0.10 |
| pH regulator | 2-amino-2-ethyl-1,3-propanediol | 0.3 | 0.3 | 0.3 | 0.3 |
| Pure water | | Bal. | Bal. | Bal. | Bal. |
| Total (% by mass) | | 100 | 100 | 100 | 100 |

TABLE 9

| Material (% by mass) | | Comp. Ex. 7 | Comp. Ex. 8 | Comp. Ex. 9 |
|---|---|---|---|---|
| Pigment dispersion | Surface treated black pigment dispersion (Prep. Ex. 2) | — | — | — |
| | Magenta pigment-containing polymer particle dispersion (Prep. Ex. 3) | — | — | — |
| | Cyan pigment-containing polymer particle dispersion (Prep. Ex. 4) | — | — | — |
| | Yellow pigment-containing polymer particle dispersion (Prep. Ex. 5) | — | — | — |
| | Black pigment-containing polymer particle dispersion (Prep. Ex. 6) | 55.33 | 50.00 | 50.00 |
| | Yellow pigment surfactant dispersion (Prep. Ex. 7) | — | — | — |
| | Magenta pigment surfactant dispersion (Prep. Ex. 8) | — | — | — |
| | Cyan pigment surfactant dispersion (Prep. Ex. 9) | — | — | — |
| Water-dispersible resin | Acryl-silicone resin emulsion | — | — | — |
| | Polyurethane emulsion | — | — | — |
| Water-soluble organic solvent | Amide compound (1) | — | — | — |
| | Compound (4) | — | — | — |
| | Compound (8) | 10.00 | — | — |
| | Compound (18) | — | 10.00 | — |
| | Amide compound (V) | — | — | — |
| | 2-ethyl-1,3-hexanediol | — | — | — |
| | 2-methyl-1,3-butanediol | 27.50 | — | — |
| | 3-methyl-1,3-butanediol | — | — | 22.00 |
| | 3-methyl-1,5-pentanediol | — | — | — |
| | Propylene glycol | — | — | — |
| | Glycerin | 20.00 | 20.00 | 20.00 |
| | 1,3-butanediol | 17.50 | 17.50 | — |
| Penetrant | 2-ethyl-1,3-hexanediol | — | 2.00 | 2.00 |
| | 2,2,4-trimethyl-1,3-pentanediol | — | — | — |
| Surfactant | KF-643 | — | — | — |
| | Zonyl FS-300 | 2.50 | 2.50 | 2.50 |
| | Softanol EP-7025 | — | — | — |
| Antifungal | Proxel GXL | 0.05 | 0.05 | 0.05 |
| Defoaming | Silicone defoaming agent KM-72F | 0.10 | 0.10 | 0.10 |
| pH regulator | 2-amino-2-ethyl-1,3-propanediol | 0.3 | 0.3 | 0.3 |
| Pure water | | Balance | Balance | Balance |
| Total (% by mass) | | 100 | 100 | 100 |

The abbreviations in Tables 2 to 9 above represent the following materials.

Note 1: "Acryl-silicone resin emulsion" is POLYSOL ROY6312 manufactured by Showa Highpolymer Co., Ltd., which has a solid content of 37.2% by mass, the average particle diameter of 171 nm, and the minimum film forming temperature (MFT) of 20° C.

Note 2: "Polyurethane emulsion" is HYDRAN APX-101H manufactured by DIC Corporation having a solid content of 45% by mass, the average particle diameter of 160 nm, and the minimum film forming temperature (MFT) of 20° C.

Note 3: "KF-643" is a polyether-modified silicone compound manufactured by Shin-Etsu Chemical Co., Ltd., having an active ingredient of 100% by mass.

Note 4: "ZONYL FS-300" is polyoxyethylene perfluoroalkyl ether manufactured by E. I. du Pont de Nemours and Company, having an active ingredient of 40% by mass.

Note 5: "SOFTANOL EP-7025" is polyoxyalkylene alkyl ether manufactured by Nippon Shokubai Co., Ltd., having an active ingredient of 100% by mass.

Note 6: "Proxel GXL" is an antifungal agent containing 1,2-benzisothiazolin-3-one as a main component, manufactured by Avecia Biologics Limited, having an active ingredient of 20% by mass, and containing dipropylene glycol.

Note 7: "KM-72F" is a self-emulsifying silicone defoaming agent manufactured by Shin-Etsu Chemical Co., Ltd., having an active ingredient of 100% by mass.

Note: "Amide compound (1)" is the amide compound represented by the following formula (1).

$$H_3C-CH_2-CH_2-CH_2-O-CH_2-CH_2-\overset{O}{\underset{\|}{C}}-N\overset{CH_3}{\underset{CH_3}{}}$$ Formula (1)

Note: "Compound (4)" is the compound represented by the following formula (4).

$$\begin{array}{c} HO-CH_2 \\ \phantom{HO-}CH-O\phantom{-} \\ \phantom{HO-}\vert\phantom{-}\phantom{O}\diagdown C \diagup CH_3 \\ H_2C-O\phantom{-}\diagup\phantom{-}\diagdown CH_3 \end{array}$$ Formula (4)

Note: "Compound (8)" is the compound represented by the following formula (8).

Formula (8)

Note: "Compound (18)" is the compound represented by the following formula (18).

$$H_3C-\underset{H_2}{C}-\underset{H_2}{C}-\underset{H_2}{C}-\underset{H}{\overset{CH_2}{\underset{|}{C}}}-\underset{H_2}{C}-O-\overset{O}{\underset{\|}{C}}-(\underset{H_2}{C})_8-\overset{O}{\underset{\|}{C}}-O-\underset{H_2}{C}-\underset{H}{\overset{CH_2}{\underset{|}{C}}}-\underset{H_2}{C}-\underset{H_2}{C}-\underset{H_2}{C}-CH_3$$ Formula (18)

Note: "Amide compound (V)" is the amide compound represented by the following structural formula (V).

$$H_3C-O-CH_2-CH_2-\overset{O}{\underset{\|}{C}}-N\overset{CH_3}{\underset{CH_3}{}}$$ Structural Formula (V)

Further, in Table 1, "Bal." is used as an abbreviation for "Balance" and "Penetrant" is the same as the penetrating agent described in the present specification.

The equilibrium moisture contents of the organic solvents for use in Examples and Comparative Examples were determined in the following manner. The temperature and humidity inside a desiccator was controlled at the temperature of 23° C.±1° C. and the relative humidity of 80%±3% using a potassium chloride/sodium chloride saturated aqueous solution. In this desiccator, a dish on which each organic solvent was weight and placed by 1 g was stored, and the equilibrium moisture content was measured by the following equation.

Equilibrium moisture content (%)=Amount of water absorbed into organic solvent/(Amount of organic solvent+Amount of water absorbed into organic solvent)×100

In the manner as described above, the equilibrium moisture content of the polyhydric alcohol, i.e. glycerin (bp: 290° C., EMC: 49% by mass), and 1,3-butanediol (bp: 203° C.-204° C., EMC: 35% by mass), was 30% by mass or higher at the temperature of 23° C., and humidity of 80% RH.

Using the following recording sheets (1) to (5) and the inkjet ink of Example 8, the image quality evaluation was performed in the following manner.

—Recording Sheet (1)—
Commercially available sheet (product name: Aurora Coat, manufactured by Nippon Paper Industries Co., Ltd., basis weight: 104.7 g/m²)

—Recording Sheet (2)—
POD Gloss Coat (manufactured by Oji Paper Co., Ltd., basis weight: 100 g/m²)

—Recording Sheet (3)—
Space DX (gravure paper) (manufactured by Nippon Paper Industries Co., Ltd., basis weight: 56.5 g/m²)

—Recording Sheet (4)—
Commercially available inkjet matt coat paper (product name: Super Fine Paper, manufactured by SEIKO EPSON CORPORATION)

—Recording Sheet (5)—
Clear polyester film (product name: Lumirror U10, manufactured by TORAY Industries Inc., thickness: 100 μm)

An amount of pure water transferred to each of the recording sheets (1) to (5) was measured in the following manner. The results are depicted in Table 10.

<Measurement of the Transfer Amount of Pure Water by Dynamic Scanning Absorptometer>

An absorption curve of pure water was measured using a dynamic scanning absorptometer (KS350D, manufactured by Kyowaseiko Corporation) with respect to each of the recording sheets (1) to (5). The absorption curve was obtained by plotting a sloped-straight line from the transfer amount (mL/m$^2$) and the square root of the contacting duration. The transfer amount after a certain period was determined by interpolation.

TABLE 10

|  | Pure water | |
| --- | --- | --- |
|  | Contact duration 100 ms | Contact duration 400 ms |
| Recording sheet (1) | 2.8 | 3.4 |
| Recording sheet (2) | 3.1 | 3.5 |
| Recording sheet (3) | 9.9 | 21.5 |
| Recording sheet (4) | 41.0 | 44.8 |
| Recording sheet (5) | 0.1 | 0.1 |

<Image Quality Evaluation>

A image quality test was performed by an inkjet recording device (IPSiO GXe-5500, manufactured by Ricoh Company Limited) using the inkjet ink of Example 3 on the recording sheets (1) to (5). The results are presented in Table 11.

<Beading>

The degree of the beading (unevenness in the image density) in the solid imaging portion of the obtained image was visually observed and evaluated. For evaluation criteria, stepped samples (grading from poor/1.0 to good/5.0) was used.

<Spur Marks>

The offset smear caused from the obtained black solid imaging portion to the back ground portions by a spur was visually observed and evaluated. The evaluation criteria and ranks are as follows:

Rank 1: Clearly recognized
Rank 2: Faintly recognized
Rank 3: Unrecognized

<Glossiness>

The 60 degree-glossiness of the obtained black solid imaging portion was measured by a glossmeter (4501, manufactured by BYK Gardener).

<Drying Properties>

A chart was printed in the same manner as in the evaluation test for image density, which would be explained later, and a filter paper was pressed against the "■" portion on the black solid image printed surface. The results were evaluated whether or not any ink was transferred to the filter paper.

[Evaluation Criteria]
A: No smear from ink transfer was observed.
B: A slight smear from ink transfer was observed.
C: Smears from ink transfer were observed.

TABLE 11

|  | Beading | Deposition by spur | Glossiness | Drying properties |
| --- | --- | --- | --- | --- |
| Recording sheet (1) | 5.0 | 3 | 35.2 | B |
| Recording sheet (2) | 4.0 | 3 | 27.3 | A |
| Recording sheet (3) | 5.0 | 3 | 22.6 | A |
| Recording sheet (4) | 5.0 | 3 | 1.6 | A |
| Recording sheet (5) | 1.0 | 1 | N/A | C |

Note that, the data for the glossiness of the recording medium (5) was not available because the glossiness thereof could not be measured as the ink was not dried.

The inkjet inks of Examples 1 to 17 and Comparative Examples 1 to 9 were each evaluated in the following manners. The results are presented in Tables 12 and 13.

<Measurement of Viscosity of Ink>

The viscosity of the ink was measured by means of a viscometer (RE-550L, manufactured by Toki Sangyo Co., Ltd.) at 25° C.

<Measurement of pH of Ink>

The pH of the ink was measured by means of a pH meter (HM-30R, manufactured by TOA-DKK CORPORATION) at 25° C.

<Measurement of Surface Tension of Ink>

The surface tension of the ink was measured by an automatic surface tensiometer (CBVP-Z, manufactured by Kyowa Interface Science Co., Ltd.) at the ink temperature of 25° C.

—Preparation of Printing Evaluation—

In the controlled environment where the temperature was adjusted to 23° C.±0.5° C., and the humidity was adjusted to 50% RH±5% RH, an inkjet printer (IPSiO GXe-5500, manufactured by Ricoh Company Limited) for use in printing was set by varying the driving voltage of a piezoelectric element to unify an amount of an ink to be ejected, so that the same amount of the ink would be deposited on each recording medium.

<Image Density>

A chart including a 64-point symbol "■" produced using Microsoft Word 2000 was printed on MyPaper (manufactured by Ricoh Company Limited), the color in the "■" portions on a printed surface was measured by X-Rite939, and the result was evaluated based on the following evaluation criteria. As for the printing mode, the "Plain Paper—Standard High Speed" mode was changed to the "No Color Correction" mode in user settings for plain paper by using a driver that accompanied a printer.

[Evaluation Criteria]
I: Black: 1.20 or higher
Yellow: 0.80 or higher
Magenta: 1.00 or higher
Cyan: 1.00 or higher
II: Black: 1.10 or higher but lower than 1.20
Yellow: 0.70 or higher but lower than 0.80
Magenta: 0.90 or higher but lower than 1.00
Cyan: 0.90 or higher but lower than 1.00
III: Black: lower than 1.10
Yellow: lower than 0.70
Magenta: lower than 0.90
Cyan: lower than 0.90

<Color Saturation>

A chart was printed on MyPaper (manufactured by Ricoh Company Limited) in the same manner as in the evaluation test for image density, the "■" portions on a printed surface was measured by X-Rite939, and the result was evaluated based on the following evaluation criteria. As for the printing mode, the "Plain Paper—Standard High Speed" mode was changed to the "No Color Correction" mode in user settings for plain paper by using a driver that accompanied a printer. The ratio of the measured color saturation values and the color saturation values (yellow: 91.34, magenta: 74.55, cyan: 62.82) of the standard colors (Japan color ver. 2) was calculated, and the coloring ability was evaluated from the calculated ratio based on the following criteria.

[Evaluation Criteria]
1) Yellow
   I: 0.9 or higher
   II: 0.8 or higher but lower than 0.9
   III: lower than 0.8
2) Magenta
   I: 0.8 or higher
   II: 0.75 or higher but lower than 0.8
   III: lower than 0.75

3) Cyan
   I: 0.85 or higher
   II: 0.8 or higher but lower than 0.85
   III: lower than 0.8

<Evaluation of Curled Amount>

A solid image was printed by means of the prototype line-head printer as illustrated in FIG. 7 under the following printing conditions, and the height of back curling (curl of the paper when the paper was placed on a flat desk with the printed surface facing down) of the printed paper just after printed (within 10 seconds after discharged from the printer) and the height of the curling of the paper after leaving the printed paper for 1 day on a flat desk with the printed surface facing down were evaluated.

(1) Evaluation Printer: Prototype line-head printer (see FIG. 7)
(2) Evaluation Media: MyPaper (PPC) manufactured by Ricoh Company Limited
(3) Printing condition: recording density of 118 dpc×236 dpc (300 dpi×600 dpi), printing area of 526.3 cm²/A4, and ink ejection and deposition amount of 5.6 g/m²
(4) Evaluation Environment: 23° C.±0.5° C., 50% RH±5% RH
(5) Measurement of curl: Just after printing (within 10 seconds after discharged from the printer) or after being left for 1 day, the A4 size recording medium was quietly placed on a flat desk with the curled face facing up, and the height of curl was measured by measuring the heights of the four corners of the recording medium with a JIS_1 scale, and obtaining the average value from the measured values from the four corners. When the recording medium significantly curled to form into a cylindrical shape, a diameter of the cylinder was measured.

[Evaluation Criteria]

The evaluation results were rated as the following four ranks.
   A: less than 10 mm
   B: 10 mm or more but less than 40 mm
   C: 40 mm or more
   D: Curled into a cylindrical shape <Ejection Stability>

A chart having solid images of a color each occupying 5% in the area of an A4 size paper, which had been formed by Microsoft Word 2000, was continuously printed on 200 sheets of MyPaper (manufactured by Ricoh Company Limited). Thereafter, irregular ejections from each nozzle were evaluated. As for the printing mode, the "Plain Paper—Standard High Speed" mode was changed to the "No Color Correction" mode in user settings for plain paper by using a driver that accompanied a printer.

[Evaluation Criteria]
   I: No irregular ejection was observed.
   II: Irregular ejections of the ink were slightly observed.
   III: Irregular ejections of the ink were observed, or no ink was ejected from some parts of the nozzles.

<Storage Stability of Ink>

The viscosity of the ink before storage, and the viscosity of the ink after being stored for 7 days at 70° C. in a sealed container were measured by a viscometer, and the degree of the storage stability was determined from the measured viscosities by the following equation. The results were evaluated based on the following evaluation criteria.

Ink storage stability (%)=[(viscosity after storage)/(viscosity before storage)]×100

[Evaluation Criteria]
   I: 100%±10% or less
   II: 100%±more than 10% but less than 20%
   III: 100%±20% or more

TABLE 12

| | Initial physical properties | | |
|---|---|---|---|
| | Viscosity (mPa·s) | pH | Surface tension (mN/m) |
| Ex. 1 | 16.5 | 9.5 | 24.6 |
| Ex. 2 | 13.6 | 9.3 | 24.2 |
| Ex. 3 | 13.8 | 9.6 | 24.1 |
| Ex. 4 | 17.5 | 9.7 | 26.5 |
| Ex. 5 | 17.2 | 9.4 | 25.7 |
| Ex. 6 | 17.8 | 9.4 | 25.2 |
| Ex. 7 | 15.6 | 9.7 | 24.7 |
| Ex. 8 | 17.2 | 9.6 | 24.8 |
| Ex. 9 | 18.7 | 9.8 | 27.6 |
| Ex. 10 | 15.9 | 9.7 | 26.4 |
| Ex. 11 | 18.3 | 9.5 | 22.8 |
| Ex. 12 | 19.0 | 9.4 | 22.4 |
| Ex. 13 | 19.5 | 9.7 | 23.1 |
| Ex. 14 | 15.9 | 9.7 | 23.7 |
| Ex. 15 | 16.2 | 9.7 | 23.8 |
| Ex. 16 | 8.8 | 9.4 | 23.6 |
| Ex. 17 | 18.1 | 9.7 | 32.2 |
| Ex. 18 | 7.7 | 9.7 | 24.7 |
| Ex. 19 | 8.2 | 9.6 | 24.9 |
| Ex. 20 | 8.1 | 9.5 | 25.4 |
| Ex. 21 | 9.5 | 9.4 | 24.5 |
| Ex. 22 | 7.5 | 9.4 | 24.6 |
| Comp. Ex. 1 | 8.4 | 9.1 | 25.4 |
| Comp. Ex. 2 | 10.9 | 9.3 | 25.7 |
| Comp. Ex. 3 | 20.5 | 9.2 | 26.8 |
| Comp. Ex. 4 | 26.7 | 9.3 | 22.9 |
| Comp. Ex. 5 | 13.5 | 9.5 | 25.2 |
| Comp. Ex. 6 | 15.9 | 9.6 | 25.3 |
| Comp. Ex. 7 | 16.2 | 9.4 | 25.2 |
| Comp. Ex. 8 | 17.0 | 9.3 | 25.5 |
| Comp. Ex. 9 | 15.1 | 9.8 | 25.4 |

TABLE 13

| | Curl evaluation | | | | | |
|---|---|---|---|---|---|---|
| | Image density | Saturation | Just after printing | One day after printing | Ejection stability | Storage stability |
| Ex. 1 | I | — | B | A | II | II |
| Ex. 2 | I | — | B | A | I | I |
| Ex. 3 | I | — | B | A | I | II |
| Ex. 4 | I | — | B | A | I | I |
| Ex. 5 | I | II | B | A | II | I |
| Ex. 6 | I | I | B | A | II | I |
| Ex. 7 | I | I | B | A | I | I |
| Ex. 8 | I | I | A | A | I | I |
| Ex. 9 | I | I | B | A | I | I |
| Ex. 10 | I | I | A | A | I | I |
| Ex. 11 | I | I | A | A | I | I |
| Ex. 12 | II | — | A | A | I | I |
| Ex. 13 | II | I | A | A | I | I |
| Ex. 14 | I | I | B | A | II | I |
| Ex. 15 | I | I | B | A | II | I |
| Ex. 16 | I | — | C | B | I | I |
| Ex. 17 | I | I | C | A | I | I |
| Ex. 18 | I | — | B | A | I | I |
| Ex. 19 | I | — | B | A | I | I |
| Ex. 20 | I | — | B | A | I | I |
| Ex. 21 | I | I | B | A | I | I |
| Ex. 22 | I | I | B | A | I | I |
| Comp. Ex. 1 | II | — | D | B | I | I |
| Comp. Ex. 2 | II | — | D | B | I | I |

TABLE 13-continued

| | | | Curl evaluation | | | |
| | | | Just after | One day after | Ejection | Storage |
| | Image density | Saturation | printing | printing | stability | stability |
|---|---|---|---|---|---|---|
| Comp. Ex. 3 | I | — | D | B | II | II |
| Comp. Ex. 4 | N/A | N/A | N/A | N/A | III | III |
| Comp. Ex. 5 | II | — | D | B | I | I |
| Comp. Ex. 6 | II | — | D | B | I | I |
| Comp. Ex. 7 | II | — | D | B | I | I |
| Comp. Ex. 8 | II | — | D | B | III | II |
| Comp. Ex. 9 | II | — | D | B | I | I |

Some data was not available in Comparative Example 4, because the ink of Comparative Example 4 had high viscosity so that a clean image, as obtained with other inks, could not be obtained. Therefore, the similar evaluation could not be performed.

Preparation Example 1A

Preparation of Surface-Modified Black Pigment Dispersion Liquid 1

In the environment of room temperature, 100 g of Black Pearls® 1000 (carbon black having the BET surface area of 343 m²/g and DBPA of 105 mL/100 g) available from Cabot Corporation, 100 mmol of the compound represented by the following formula (VI), and 1 L of ion-exchanged highly pure water were mixed by means of Silverson Mixer (6,000 rpm). In the case where the pH of the obtained slurry was higher than 4, 100 mmol of nitric acid was added. Thirty minutes later, sodium nitrite (100 mmol) dissolved in a small amount of ion-exchanged highly pure water was gradually added to the slurry. The resultant was heated to 60° C. with stirring, to thereby react for 1 hour. As a result, a modified pigment in which the compound of the formula (VI) had been added to the carbon black was generated. Subsequently, pH of the resultant was adjusted to 10 with a NaOH aqueous solution, to thereby obtain a modified dispersion liquid in 30 minutes time. The dispersion liquid containing the pigment bonded to at least one geminal bisphosphonic acid group or geminal bisphosphonate group and ion-exchanged highly pure water were used and subjected to ultrafiltration with a permeable membrane, and the resultant was further subjected to ultrasonic dispersion to thereby obtain a modified pigment dispersion liquid the pigment solid content of which had been concentrated to 20% by mass. The degree of the surface treatment was 0.75 mmol/g, and the volume average particle diameter ($D_{50}$) as measured by the particle size distribution measuring device (NANOTRACK UPA-EX150, manufactured by Nikkiso Co., Ltd.) was 120 nm. Further, the sodium ion content was measured by means of TOA-DKK ion meter IM-32P, and the result was 27,868 ppm, and the phosphorous (P) content as measured by the elementary analysis was 2.31% by mass.

<Compound of Formula (VI)>

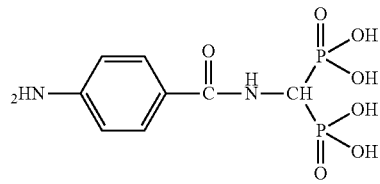

Preparation Example 2A

Preparation of Surface-Modified Black Pigment Dispersion Liquid 2

ProcessAll 4HV Mixer (4 L) was charged with 500 g of Black Pearls® 880 (carbon black having BET surface area of 220 m²/g, and DBPA of 105 mL/100 g) available from Cabot Corporation, 1 L of ion-exchanged highly pure water, and 1 mol of the compound of the formula (VI). Subsequently, the resulting mixture was mixed strongly at 300 rpm for 10 minutes, with heating to 60° C. To this, 20% by mass of a sodium nitrite aqueous solution [1 mole equivalent to the compound of the formula (VI)] was added over 15 minutes. The resulting mixture was mixed and stirred for 3 hours with heating to 60° C. The reactant was taken out while diluting with 750 mL of ion-exchanged highly pure water. The obtained modified pigment dispersion liquid and ion-exchanged highly pure water were used, and subjected to ultrafiltration with a permeable membrane, and the resultant was further subjected to ultrasonic dispersion to thereby obtain a modified pigment dispersion liquid the pigment solid content of which had been concentrated to 20% by mass. The degree of the surface treatment was 0.5 mmol/g, and the volume average particle diameter ($D_{50}$) as measured by the particle size distribution measuring device (NANOTRACK UPA-EX150, manufactured by Nikkiso Co., Ltd.) was 104 nm. Further, the sodium ion content was measured by means of TOA-DKK ion meter IM-32P, and the result was 19,940 ppm, and the phosphorous (P) content as measured by the elementary analysis was 2.20% by mass.

Preparation Example 3A

Preparation of Surface-Modified Black Pigment Dispersion Liquid 3

ProcessAll 4HV Mixer (4 L) was charged with 500 g of Black Pearls® 880 (carbon black having BET surface area of 220 m²/g, and DBPA of 105 mL/100 g) available from Cabot Corporation, 1 L of ion-exchanged highly pure water, and 175 mmol of the compound of the formula (VII). Subsequently, the resulting mixture was mixed strongly at 300 rpm for 10 minutes, with heating to 60° C. To this, 20% by mass of a sodium nitrite aqueous solution [175 mmole equivalent to the compound of the formula (VII)] was added over 15 minutes. The resulting mixture was mixed and stirred for 3 hours with heating to 60° C. The reactant was taken out while diluting with 750 mL of ion-exchanged highly pure water. The obtained modified pigment dispersion liquid and ion-exchanged highly pure water were used, and subjected to ultrafiltration with a permeable membrane, and the resultant was further subjected to ultrasonic dispersion to thereby obtain a modified pigment dispersion liquid the pigment solid content of which had been concentrated to 20% by mass. The degree of the surface treatment was 0.35 mmol/g, and the volume average particle diameter ($D_{50}$) as measured by the particle size distribution measuring device (NANOTRACK UPA-EX150, manufactured by Nikkiso Co., Ltd.) was 114 nm. Further, the sodium ion content was measured by means of TOA-DKK ion meter IM-32P, and the result was 12,792 ppm, and the phosphorous (P) content as measured by the elementary analysis was 1.08% by mass.

<Compound of Formula (VII)>

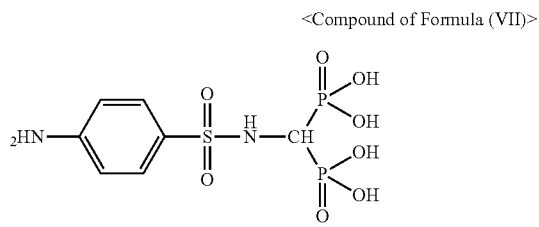

Preparation Example 4A

Preparation of Surface-Modified Magenta Pigment Dispersion Liquid 1

In the environment of room temperature, 100 g of C.I. Pigment Red 122 with small particle diameters, available from Sun Chemical, 50 mmol of the compound of the formula (VII), 1 L of ion-exchanged highly pure water were mixed by means of Silverson Mixer (6,000 rpm). Thirty minutes later, to the resulted slurry, sodium nitrite (100 mmol) dissolved in a small amount of ion-exchanged highly pure water was gradually added. The resultant was heated to 60° C. with stirring, to thereby react for 1 hour. As a result, a modified pigment in which the compound of the formula (VII) had been added to C.I. Pigment Red 122 was generated. Subsequently, pH of the resultant was adjusted to 10 with a NaOH aqueous solution, to thereby obtain a modified dispersion liquid in 30 minutes time. The dispersion liquid containing the pigment bonded to at least one geminal bisphosphonic acid group or geminal bisphosphonate group and ion-exchanged highly pure water were used and subjected to ultrafiltration with a permeable membrane, and the resultant was further subjected to ultrasonic dispersion to thereby obtain a modified pigment dispersion liquid the pigment solid content of which had been concentrated to 20% by mass. The degree of the surface treatment was 0.50 mmol/g, and the volume average particle diameter ($D_{50}$) as measured by the particle size distribution measuring device (NANOTRACK UPA-EX150, manufactured by Nikkiso Co., Ltd.) was 111 nm. Further, the phosphorous (P) content as measured by the elementary analysis was 0.26% by mass.

Preparation Example 5A

Preparation of Surface-Modified Magenta Pigment Dispersion Liquid 2

In the environment of room temperature, 690 g of SMART Magenta 3122BA (surface-treated C.I. Pigment Red 122 dispersion liquid, the pigment content of 14.5% by mass) available from Sensient Technologies Corporation, 50 mmol of the compound of the formula (VII), and 500 mL of ion-exchanged highly pure water were mixed by means of Silverson Mixer (6,000 rpm). Thirty minutes later, to the resulting slurry, sodium nitrite (100 mmol) dissolved in a small amount of ion-exchanged highly pure water was gradually added. The resultant was heated to 60° C. with stirring, to thereby react for 1 hour. As a result, a modified pigment in which the compound of the formula (VII) had been added to C.I. Pigment Red 122 was generated. Subsequently, pH of the resultant was adjusted to with tetramethyl ammonium hydroxide, to thereby obtain a modified dispersion liquid in 30 minutes time. The dispersion liquid containing the pigment bonded to at least one geminal bisphosphonic acid group or geminal bisphosphonic acid tetramethyl ammonium salt group and ion-exchanged highly pure water were used and subjected to ultrafiltration with a permeable membrane, and the resultant was further subjected to ultrasonic dispersion to thereby obtain a modified pigment dispersion liquid the pigment solid content of which had been concentrated to 20% by mass. The degree of the surface treatment was 0.50 mmol/g, and the volume average particle diameter ($D_{50}$) as measured by the particle size distribution measuring device (NANOTRACK UPA-EX150, manufactured by Nikkiso Co., Ltd.) was 106 nm. Further, the phosphorous (P) content as measured by the elementary analysis was 0.25% by mass.

Preparation Example 6A

Preparation of Surface-Treated Cyan Pigment Dispersion 1

In the environment of room temperature, 690 g of SMART Cyan 3154BA (surface-treated C.I. Pigment Blue 15:4 dispersion liquid, the pigment content of 14.5% by mass) available from Sensient Technologies Corporation, 50 mmol of the compound of the formula (VI), and 500 mL of ion-exchanged highly pure water were mixed by means of Silverson Mixer (6,000 rpm). Thirty minutes later, to the resulting slurry, sodium nitrite (100 mmol) dissolved in a small amount of ion-exchanged highly pure water was gradually added. The resultant was heated to 60° C. with stirring, to thereby react for 1 hour. As a result, a modified pigment in which the compound of the formula (VI) had been added to C.I. Pigment Blue 15:4 was generated. Subsequently, pH of the resultant was adjusted to 10 with tetramethyl ammonium hydroxide, to thereby obtain a modified dispersion liquid in 30 minutes time. The dispersion liquid containing the pigment bonded to at least one geminal bisphosphonic acid group or geminal bisphosphonic acid tetramethyl ammonium salt group and ion-exchanged highly pure water were used and subjected to ultrafiltration with a permeable membrane, and the resultant was further subjected to ultrasonic dispersion to thereby obtain a modified pigment dispersion liquid the pigment solid content of which had been concentrated to 20% by mass. The degree of the surface treatment was 0.50 mmol/g, and the volume average particle diameter ($D_{50}$) as measured by the particle size distribution measuring device (NANOTRACK UPA-EX150, manufactured by Nikkiso Co., Ltd.) was 113 nm. Further, the phosphorous (P) content as measured by the elementary analysis was 0.27% by mass.

Preparation Example 7A

Preparation of Surface-Modified Yellow Pigment Dispersion Liquid 1

In the environment of room temperature, 690 g of SMART Yellow 3074BA (surface-treated C.I. Pigment Yellow 74 dispersion liquid, the pigment content of 14.5% by mass) available from Sensient Technologies Corporation, 50 mmol of the compound of the formula (VII), and 500 mL of ion-exchanged highly pure water were mixed by means of Silverson Mixer (6,000 rpm). Thirty minutes later, to the resulting slurry, sodium nitrite (100 mmol) dissolved in a small amount of ion-exchanged highly pure water was gradually added. The resultant was heated to 60° C. with stirring, to thereby react for 1 hour. As a result, a modified pigment in which the compound of the formula (VII) had been added to C.I. Pigment Yellow 74 was generated. Subsequently, pH of the resultant was adjusted to with tetrabutyl ammonium hydroxide, to thereby obtain a modified dispersion liquid in 30 minutes time. The dispersion liquid containing the pigment bonded to at least one geminal bisphosphonic acid group or geminal bisphosphonic acid tetrabutyl ammonium salt group and ion-exchanged highly pure water were used and subjected to ultrafiltration with a permeable membrane, and the resultant was further subjected to ultrasonic dispersion to thereby obtain a modified pigment dispersion liquid the pigment solid content of which had been concentrated to 20% by mass. The degree of the surface treatment was 0.50 mmol/g, and the volume average particle diameter ($D_{50}$) as measured by the particle size distribution measuring device (NANOTRACK UPA-EX150, manufactured by Nikkiso Co., Ltd.) was 142 nm. Further, the phosphorous (P) content as measured by the elementary analysis was 0.26% by mass.

Preparation Example 8A

Preparation of Surface-Modified Black Pigment Dispersion Liquid 4

To a 2.5N sodium sulfate solution (3,000 mL), 90 g of carbon black having the CTAB specific surface area of 150 $m^2/g$, and DBP oil absorption of 100 mL/100 g was added, and the resulting mixture was allowed to react for 10 hours with stirring at the temperature of 60° C., at the rate of 300 rpm, to thereby proceed to an oxidation treatment. The resulting reaction solution was subjected to filtration to separate the carbon black, and the separated carbon black was then neutralized with a sodium hydroxide solution, followed by subjected to ultrafiltration.

The obtained carbon black was washed with water, and then dried. Then, the carbon black was dispersed in pure water so that the pigment solid content thereof was to be 20% by mass, and the dispersion was then sufficiently stirred to thereby obtain a black pigment dispersion liquid. The average particle diameter ($D_{50}$) of the pigment dispersion elements in the black pigment dispersion liquid was measured by a particle size distribution measuring device (NANOTRACK UPA-EX150, manufactured by Nikkiso Co., Ltd.), and the result thereof was 103 nm.

Preparation Example 9A

Preparation of Magenta Pigment-Containing Polymer Particle Dispersion Liquid

—Preparation of Polymer Solution A—

A 1 L-flask equipped with a mechanical stirrer, a thermometer, a nitrogen-inlet tube, a reflux tube and a dropping funnel, which had been sufficiently purged with nitrogen gas, was charged with 11.2 g of styrene, 2.8 g of acrylic acid, 12.0 g of lauryl methacrylate, 4.0 g of polyethylene glycol methacrylate, 4.0 g of styrene macromer, and 0.4 g of mercaptoethanol, and the resulting mixture was mixed and heated to 65° C. Next, a mixed solution of styrene (100.8 g), acrylic acid (25.2 g), lauryl methacrylate (108.0 g), polyethylene glycol methacrylate (36.0 g), hydroxylethyl methacrylate (60.0 g), styrene macromer (36.0 g), mercaptoethanol (3.6 g), azobis methylvaleronitrile (2.4 g), and methyl ethyl ketone (18 g) was added dropwise into the flask over 2.5 hours. Thereafter, a mixed solution of azobis methylvaleronitrile (0.8 g) and methyl ethyl ketone (18 g) was added dropwise into the flask for 0.5 hours. After aging the mixture at 65° C. for 1 hour, 0.8 g of azobis methylvaleronitrile was added thereto, and the resulting mixture was further aged for 1 hour. Upon completion of the reaction, methyl ethyl ketone (364 g) was added to the flask, to thereby obtain 800 g of Polymer Solution A having a concentration of 50% by mass.

—Preparation of Pigment-Containing Polymer Particle Dispersion Liquid—

After sufficiently stirring a mixture of Polymer Solution A (28 g), C.I. Pigment Red 122 (42 g), a 1 mol/L potassium hydroxide aqueous solution (13.6 g), methyl ethyl ketone (20 g), and ion-exchanged water (13.6 g), the resulting mixture was kneaded by a roll mill. To the obtained paste, 200 g of pure water was added, the resulting mixture was sufficiently stirred, and methyl ethyl ketone and water were removed from the resulting dispersion liquid using an evaporator, followed by subjected to pressure filtration with a polyvinylidene fluoride membrane filter having the average pore diameter of 5.0 µM to remove coarse particles from the dispersion liquid, to thereby obtain a magenta pigment-containing polymer particle dispersion liquid having the pigment solid content of 15% by mass, and having the solids content of 20% by mass. The average particle diameter ($D_{50}$) of the polymer particles in the obtained magenta pigment-containing polymer particle dispersion liquid was measured by a particle size distribution measuring device (NANOTRACK UPA-EX150, manufactured by Nikkiso Co., Ltd.), and the result was 127 nm.

Preparation Example 10A

Preparation of Cyan Pigment-Containing Polymer Particle Dispersion Liquid

A cyan pigment-containing polymer particle dispersion liquid was prepared in the same manner as in Preparation Example 9A, provided that the pigment was changed from C.I. Pigment Red 122 to a phthalocyanine pigment (C.I. Pigment Blue 15:3). The average particle diameter ($D_{50}$) of the polymer particles in the obtained cyan pigment-containing polymer particle dispersion liquid was measured by a particle size distribution measuring device (NANOTRACK UPA-EX150, manufactured by Nikkiso Co., Ltd.), and the result was 93 nm.

Preparation Example 11A

Preparation of Yellow Pigment-Containing Polymer Particle Dispersion Liquid

A yellow pigment-containing polymer particle dispersion liquid was prepared in the same manner as in Preparation Example 9A, provided that the pigment was changed from C.I. Pigment Red 122 to a monoazo yellow pigment (C.I. Pigment Yellow 74). The average particle diameter ($D_{50}$) of the polymer particles in the obtained yellow pigment-containing polymer particle dispersion liquid was measured by a particle size distribution measuring device (NANOTRACK UPA-EX150, manufactured by Nikkiso Co., Ltd.), and the result was 76 nm.

Preparation Example 12A

Preparation of Carbon Black Pigment-Containing Polymer Particle Dispersion Liquid A carbon black pigment-containing polymer particle dispersion liquid was prepared in the same manner as in Preparation Example 9A, provided that the pigment was changed from C.I. Pigment Red 122 to carbon black (FW100, of Degussa AG). The average particle diameter ($D_{50}$) of the polymer particles in the obtained yellow pigment-containing polymer particle dispersion liquid was measured by a particle size distribution measuring device (NANOTRACK UPA-EX150, manufactured by Nikkiso Co., Ltd.), and the result was 104 nm.

Examples 1A to 14A

Preparation of Inkjet Ink

First, as presented in Tables 1A to 4A, organic solvents (wetting agent), penetrating agents, a surfactant, an antifungal agent, and water were mixed and the resulting mixture was stirred for 1 hour to homogeneously mix the mixture. Depending on the mixture, a water-dispersible resin was further added, and stirred for 1 hour. Then, a water-dispersible colorant (a pigment dispersion liquid), a defoaming agent, and a pH regulator were added and the mixture was stirred for 1 hour. The resulting dispersion liquid was subjected to pressure filtration with a polyvinylidene fluoride membrane filter having the average pore diameter of 1.2 μm to remove coarse particles or dusts, to thereby prepare each inkjet ink of Examples 1A to 14A.

TABLE 1A

| | Material (% by mass) | Ex. 1A | Ex. 2A | Ex. 3A | Ex. 4A |
|---|---|---|---|---|---|
| Water-dispersible colorant (Pigment dispersion liquid) | Surface-modified black pigment dispersion 1 (Preparation Ex. 1A) | 37.50 | — | — | — |
| | Surface-modified black pigment dispersion 2 (Preparation Ex. 2A) | — | 37.50 | — | — |
| | Surface-modified black pigment dispersion 3 (Preparation Ex. 3A) | — | — | 37.50 | — |
| | Surface-modified magenta pigment dispersion 1 (Preparation Ex. 4A) | — | — | — | 37.50 |
| | Surface-modified magenta pigment dispersion 2 (Preparation Ex. 5A) | — | — | — | — |
| | Surface-modified cyan pigment dispersion 1 (Preparation Ex. 6A) | — | — | — | — |
| | Surface-modified yellow pigment dispersion 1 (Preparation Ex. 7A) | — | — | — | — |
| | Surface-modified black pigment dispersion 4 (Preparation Ex. 8A) | — | — | — | — |
| | Magenta pigment-containing polymer particle dispersion (Preparation Ex. 9A) | — | — | — | — |
| | Cyan pigment-containing polymer particle dispersion (Preparation Ex. 10A) | — | — | — | — |
| | Yellow pigment-containing polymer particle dispersion (Preparation Ex. 11A) | — | — | — | — |
| | Carbon black pigment-containing polymer particle dispersion (Preparation Ex. 12A) | — | — | — | — |
| | SENSIJET SMART Magenta 3122BA | — | — | — | — |
| | SENSIJET SMART Cyan 3154BA | — | — | — | — |
| | SENSIJET SMART Yellow 3074BA | — | — | — | — |
| | SENSIJET Black SDP2000 | — | — | — | — |
| Water-dispersible resin | Acryl-silicone resin emulsion | 5.00 | 5.00 | 5.00 | 2.50 |
| | Fluororesin emulsion | — | — | — | — |
| | Polyurethane emulsion | — | — | — | — |
| Water-soluble organic solvent | Amide compound of formula (1) | 10.00 | — | — | 10.00 |
| | Amide compound of formula (2) | — | 10.00 | — | — |
| | Amide compound of formula (3) | — | — | 10.00 | — |
| | Compound of formula (4) | — | — | — | — |
| | Compound of formula (8) | 10.00 | 10.00 | 10.00 | — |
| | Compound of formula (10) | — | — | — | — |
| | Compound of formula (18) | — | — | — | 10.00 |
| | Amide compound of structural formula (V) | 10.00 | 5.00 | — | 10.00 |
| Alkyl alkane diol | 2-ethyl-1,3-hexanediol | — | 5.00 | — | — |
| | 2-methyl-1,3-propanediol | — | — | 5.00 | — |
| | 3-methyl-1,3-butanediol | — | — | — | — |
| | 3-methyl-1,5-pentanediol | — | — | — | — |
| Organic solvent | Propylene glycol | — | — | — | — |
| | Glycerin | 10.00 | 10.00 | 10.00 | 15.00 |
| | 1,3-butanediol | — | — | 5.00 | — |
| Penetrant | 2-ethyl-1,3-hexanediol | 2.00 | 2.00 | 2.00 | 2.00 |
| | 2,2,4-trimethyl-1,3-pentanediol | — | — | — | — |
| Surfactant | KF-643 | — | — | — | — |
| | Zonyl FS-300 | — | — | — | 2.50 |
| | Compound of formula (VIIa)-(α) | 0.10 | 0.10 | 0.10 | — |
| | Surfynol 104E | — | — | — | — |
| | Softanol EP-7025 | — | — | — | — |
| Antifungal | Proxel GXL | 0.05 | 0.05 | 0.05 | 0.05 |
| Defoaming | 2,4,7,9-tetramethyldecane-4,7-diol | 0.40 | — | — | — |
| | 2,5,8,11-tetramethyldodecane-5,8-diol | — | 0.40 | 0.40 | 0.40 |
| pH regulator | 2-amino-2-ethyl-1,3-propanediol | 0.20 | 0.20 | 0.20 | 0.10 |
| | Pure water | Bal. | Bal. | Bal. | Bal. |
| | Total (% by mass) | 100 | 100 | 100 | 100 |

TABLE 2A

| | Material (% by mass) | Ex. 5A | Ex. 6A | Ex. 7A | Ex. 8A |
|---|---|---|---|---|---|
| Water-dispersible colorant (Pigment dispersion liquid) | Surface-modified black pigment dispersion 1 (Preparation Ex. 1A) | — | — | — | 37.50 |
| | Surface-modified black pigment dispersion 2 (Preparation Ex. 2A) | — | — | — | — |
| | Surface-modified black pigment dispersion 3 (Preparation Ex. 3A) | — | — | — | — |
| | Surface-modified magenta pigment dispersion 1 (Preparation Ex. 4A) | — | — | — | — |
| | Surface-modified magenta pigment dispersion 2 (Preparation Ex. 5A) | 37.50 | — | — | — |
| | Surface-modified cyan pigment dispersion 1 (Preparation Ex. 6A) | — | 22.50 | — | — |
| | Surface-modified yellow pigment dispersion 1 (Preparation Ex. 7A) | — | — | 22.50 | — |
| | Surface-modified black pigment dispersion 4 (Preparation Ex. 8A) | — | — | — | — |
| | Magenta pigment-containing polymer particle dispersion (Preparation Ex. 9A) | — | — | — | — |
| | Cyan pigment-containing polymer particle dispersion (Preparation Ex. 10A) | — | — | — | — |
| | Yellow pigment-containing polymer particle dispersion (Preparation Ex. 11A) | — | — | — | — |
| | Carbon black pigment-containing polymer particle dispersion (Preparation Ex. 12A) | — | — | — | — |
| | SENSIJET SMART Magenta 3122BA | — | — | — | — |
| | SENSIJET SMART Cyan 3154BA | — | — | — | — |
| | SENSIJET SMART Yellow 3074BA | — | — | — | — |
| | SENSIJET Black SDP2000 | — | — | — | — |
| Water-dispersible resin | Acryl-silicone resin emulsion | — | 2.50 | 2.50 | — |
| | Fluororesin emulsion | 2.00 | — | — | 4.00 |
| | Polyurethane emulsion | — | — | — | — |
| Water-soluble organic solvent | Amide compound of formula (1) | 10.00 | 10.00 | 10.00 | 10.00 |
| | Amide compound of formula (2) | — | — | — | — |
| | Amide compound of formula (3) | — | — | — | — |
| | Compound of formula (4) | — | — | — | — |
| | Compound of formula (8) | 10.00 | 20.00 | 20.00 | 10.00 |
| | Compound of formula (10) | — | — | — | — |
| | Compound of formula (18) | — | — | — | — |
| | Amide compound of structural formula (V) | 10.00 | 10.00 | 10.00 | 10.00 |
| Alkyl alkane diol | 2-ethyl-1,3-hexanediol | — | — | — | — |
| | 2-methyl-1,3-propanediol | — | — | — | — |
| | 3-methyl-1,3-butanediol | — | — | — | — |
| | 3-methyl-1,5-pentanediol | — | — | — | — |
| Organic solvent | Propylene glycol | — | — | — | — |
| | Glycerin | 10.00 | 10.00 | 10.00 | 10.00 |
| | 1,3-butanediol | — | — | — | — |
| Penetrant | 2-ethyl-1,3-hexanediol | — | — | 2.00 | 2.00 |
| | 2,2,4-trimethyl-1,3-pentanediol | 2.00 | 2.00 | — | — |
| Surfactant | KF-643 | — | — | — | 1.00 |
| | Zonyl FS-300 | — | — | — | — |
| | Compound of formula (VIIa)-(α) | 0.10 | 0.10 | 0.10 | — |
| | Surfynol 104E | — | — | — | — |
| | Softanol EP-7025 | — | — | — | — |
| Antifungal | Proxel GXL | 0.05 | 0.05 | 0.05 | 0.05 |
| Defoaming | 2,4,7,9-tetramethyldecane-4,7-diol | 0.40 | 0.40 | — | 0.40 |
| | 2,5,8,11-tetramethyldodecane-5,8-diol | — | — | 0.40 | — |
| pH regulator | 2-amino-2-ethyl-1,3-propanediol | 0.10 | 0.10 | 0.10 | 0.20 |
| Pure water | | Bal. | Bal. | Bal. | Bal. |
| Total (% by mass) | | 100 | 100 | 100 | 100 |

TABLE 3A

| | Material (% by mass) | Ex. 9A | Ex. 10A | Ex. 11A | Ex. 12A |
|---|---|---|---|---|---|
| Water-dispersible colorant (Pigment dispersion liquid) | Surface-modified black pigment dispersion 1 (Preparation Ex. 1A) | 37.50 | 37.50 | 37.50 | — |
| | Surface-modified black pigment dispersion 2 (Preparation Ex. 2A) | — | — | — | 37.50 |
| | Surface-modified black pigment dispersion 3 (Preparation Ex. 3A) | — | — | — | — |
| | Surface-modified magenta pigment dispersion 1 (Preparation Ex. 4A) | — | — | — | — |

TABLE 3A-continued

| | Material (% by mass) | Ex. 9A | Ex. 10A | Ex. 11A | Ex. 12A |
|---|---|---|---|---|---|
| | Surface-modified magenta pigment dispersion 2 (Preparation Ex. 5A) | — | — | — | — |
| | Surface-modified cyan pigment dispersion 1 (Preparation Ex. 6A) | — | — | — | — |
| | Surface-modified yellow pigment dispersion 1 (Preparation Ex. 7A) | — | — | — | — |
| | Surface-modified black pigment dispersion 4 (Preparation Ex. 8A) | — | — | — | — |
| | Magenta pigment-containing polymer particle dispersion (Preparation Ex. 9A) | — | — | — | — |
| | Cyan pigment-containing polymer particle dispersion (Preparation Ex. 10A) | — | — | — | — |
| | Yellow pigment-containing polymer particle dispersion (Preparation Ex. 11A) | — | — | — | — |
| | Carbon black pigment-containing polymer particle dispersion (Preparation Ex. 12A) | — | — | — | — |
| | SENSIJET SMART Magenta 3122BA | — | — | — | — |
| | SENSIJET SMART Cyan 3154BA | — | — | — | — |
| | SENSIJET SMART Yellow 3074BA | — | — | — | — |
| | SENSIJET Black SDP2000 | — | — | — | — |
| Water-dispersible resin | Acryl-silicone resin emulsion | 5.00 | 5.00 | 5.00 | — |
| | Fluororesin emulsion | — | — | — | — |
| | Polyurethane emulsion | — | — | — | — |
| Water-soluble organic solvent | Amide compound of formula (1) | 10.00 | 10.00 | 10.00 | 10.00 |
| | Amide compound of formula (2) | — | — | — | — |
| | Amide compound of formula (3) | — | — | — | — |
| | Compound of formula (4) | — | — | 10.00 | — |
| | Compound of formula (8) | 10.00 | 10.00 | — | 10.00 |
| | Compound of formula (10) | — | — | — | 5.00 |
| | Compound of formula (18) | — | — | — | — |
| | Amide compound of structural formula (V) | 10.00 | 10.00 | 10.00 | 10.00 |
| Alkylalkane diol | 2-ethyl-1,3-hexanediol | — | — | — | — |
| | 2-methyl-1,3-propanediol | — | — | — | — |
| | 3-methyl-1,3-butanediol | — | — | — | 2.00 |
| | 3-methyl-1,5-pentanediol | — | — | — | 2.00 |
| Organic solvent | Propylene glycol | — | — | — | — |
| | Gycerin | 10.00 | 10.00 | 10.00 | 10.00 |
| | 1,3-butanediol | — | — | — | — |
| Penetrant | 2-ethyl-1,3-hexanediol | 2.00 | 2.00 | 2.00 | 2.00 |
| | 2,2,4-trimethyl-1,3-pentanediol | — | — | — | — |
| Surfactant | KF-643 | — | — | — | 1.00 |
| | Zonyl FS-300 | — | — | — | — |
| | Compound of formula (VIIa)-(α) | — | — | 0.10 | — |
| | Surfynol 104E | 3.00 | — | — | — |
| | Softanol EP-7025 | — | 2.00 | — | — |
| Antifungal | Proxel GXL | 0.05 | 0.05 | 0.05 | 0.05 |
| Defoaming | 2,4,7,9-tetramethyldecane-4,7-diol | 0.40 | 0.40 | 0.40 | — |
| | 2,5,8,11-tetramethyldodecane-5,8-diol | — | — | — | 0.4 |
| pH regulator | 2-amino-2-ethyl-1,3-propanediol | 0.20 | 0.20 | 0.20 | 0.20 |
| Pure water | | Bal. | Bal. | Bal. | Bal. |
| Total (% by mass) | | 100 | 100 | 100 | 100 |

TABLE 4A

| | Material (% by mass) | Ex. 13A | Ex. 14A |
|---|---|---|---|
| Water-dispersible colorant (Pigment dispersion liquid) | Surface-modified black pigment dispersion 1 (Preparation Ex. 1A) | — | 37.50 |
| | Surface-modified black pigment dispersion 2 (Preparation Ex. 2A) | — | — |
| | Surface-modified black pigment dispersion 3 (Preparation Ex. 3A) | — | — |
| | Surface-modified magenta pigment dispersion 1 (Preparation Ex. 4A) | — | — |
| | Surface-modified magenta pigment dispersion 2 (Preparation Ex. 5A) | — | — |
| | Surface-modified cyan pigment dispersion 1 (Preparation Ex. 6A) | 22.50 | — |
| | Surface-modified yellow pigment dispersion 1 (Preparation Ex. 7A) | — | — |
| | Surface-modified black pigment dispersion 4 (Preparation Ex. 8A) | — | — |
| | Magenta pigment-containing polymer particle dispersion (Preparation Ex. 9A) | — | — |
| | Cyan pigment-containing polymer particle dispersion (Preparation Ex. 10A) | — | — |
| | Yellow pigment-containing polymer particle dispersion (Preparation Ex. 11A) | — | — |
| | Carbon black pigment-containing polymer particle dispersion (Preparation Ex. 12A) | — | — |
| | SENSIJET SMART Magenta 3122BA | — | — |
| | SENSIJET SMART Cyan 3154BA | — | — |
| | SENSIJET SMART Yellow 3074BA | — | — |
| | SENSIJET Black SDP2000 | — | — |

TABLE 4A-continued

| Material (% by mass) | | Ex. 13A | Ex. 14A |
|---|---|---|---|
| Water-dispersible resin | Acryl-silicone resin emulsion | — | 5.00 |
| | Fluororesin emulsion | — | — |
| | Polyurethane emulsion | 2.50 | — |
| Water-soluble organic solvent | Amide compound of formula (1) | 10.00 | 10.00 |
| | Amide compound of formula (2) | — | — |
| | Amide compound of formula (3) | — | — |
| | Compound of formula (4) | — | — |
| | Compound of formula (8) | 12.50 | 10.00 |
| | Compound of formula (10) | — | — |
| | Compound of formula (18) | — | — |
| | Amide compound of structural formula (V) | 10.00 | 10.00 |
| Alkyl alkane diol | 2-ethyl-1,3-hexanediol | — | — |
| | 2-methyl-1,3-propanediol | — | — |
| | 3-methyl-1,3-butanediol | — | — |
| | 3-methyl-1,5-pentanediol | — | — |
| Organic solvent | Propylene glycol | — | — |
| | Glycerin | 10.00 | 10.00 |
| | 1,3-butanediol | — | — |
| Penetrant | 2-ethyl-1,3-hexanediol | — | 2.00 |
| | 2,2,4-trimethyl-1,3-pentanediol | 2.00 | — |
| Surfactant | KF-643 | — | — |
| | Zonyl FS-300 | — | — |
| | Compound of formula (VIIa)-(α) | 0.10 | 0.20 |
| | Surfynol 104E | — | — |
| | Softanol EP-7025 | — | — |
| Antifungal | Proxel GXL | 0.05 | 0.05 |
| Defoaming | 2,4,7,9-tetramethyldecane-4,7-diol | 0.40 | 0.80 |
| | 2,5,8,11-tetramethyldodecane-5,8-diol | — | — |
| pH regulator | 2-amino-2-ethyl-1,3-propanediol | 0.10 | 0.20 |
| Pure water | | Bal. | Bal. |
| Total (% by mass) | | 100 | 100 |

The abbreviations in Tables 1A to 4A represents as follows.

SENSIJET SMART Magenta 3122BA: manufactured by Sensient Technologies Corporation (surface-treated pigment dispersion liquid)

SENSIJET SMART Cyan 3154BA: manufactured by Sensient Technologies Corporation (surface-treated pigment dispersion)

SENSIJET SMART Yellow 3074BA: manufactured by Sensient Technologies Corporation (surface-treated pigment dispersion)

SENSIJET Black SDP2000: manufactured by Sensient Technologies Corporation (surface-treated pigment dispersion)

Acryl-silicone resin emulsion: POLYSOL ROY6312, manufactured by Showa Highpolymer Co., Ltd., which has a solid content of 39.9% by mass, the average particle diameter of 171 nm, and the minimum film forming temperature (MFT) of 20° C.

Fluororesin emulsion A: LUMIFLON FE4300, manufactured by Asahi Glass Co., Ltd., having a solid content of 50% by mass, the average particle diameter of 150 nm, and MFT of 30° C. or lower Polyurethane emulsion: HYDRAN APX-101H, manufactured by DIC Corporation, having a solid content of 45% by mass, the average particle diameter of 160 nm, and the minimum film forming temperature (MFT) of 20° C.

KF-643: polyether-modified silicone compound (manufactured by Shin-Etsu Chemical Co., Ltd., having the active ingredient of 100% by mass)

Zonyl FS-300: polyoxyethylene perfluoroalkyl ether (manufactured by E.I. du Pont de Nemours and Company, having the active ingredient of 40% by mass)

Surfynol 104E: acetylene glycol compound (manufactured by Nissin Chemical Industry Co., Ltd., having the active ingredient of 50% by mass, containing ethylene glycol)

Softanol EP-7025: polyoxyalkylene alkyl ether (manufactured by Nippon Shokubai Co., Ltd., active ingredient: 100% by mass)

Proxel GXL: an antifungal agent having 1,2-benzisothiazolin-3-one as a main component (manufactured by Avecia Biologics Limited, having the active ingredient of 20% by mass, containing dipropylene glycol)

Amide compound of formula (1): amide compound represented by the following formula (1)

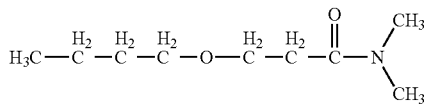

Formula (1)

Amide compound of formula (2): amide compound represented by the following formula (2)

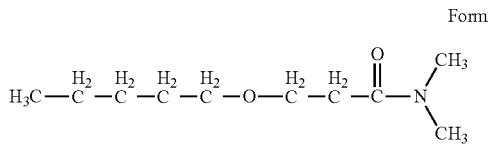

Formula (2)

Amide compound of formula (3): amide compound represented by the following formula (3)

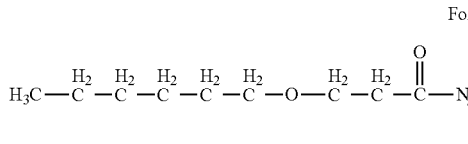

Formula (3)

Compound of formula (4): compound represented by the following formula (4)

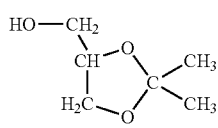

Formula (4)

Compound of formula (8): compound represented by the following formula (8)

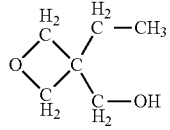

Formula (8)

Compound of formula (10): compound represented by the following formula (10)

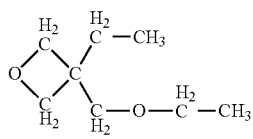
Formula (10)

Compound of formula (18): compound represented by the following formula (18)

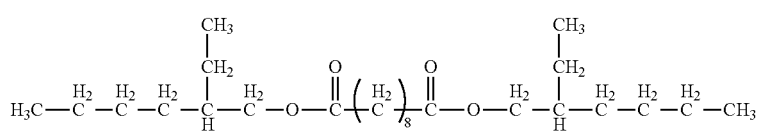
Formula (18)

Amide compound of formula (V): amide compound represented by the following structural formula (V)

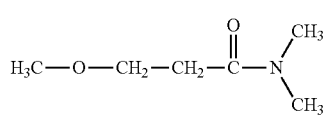
Structural Formula (V)

Compound of formula (VIIa)-(q): compound represented by the following general formula (VIIa)-(q)

General Formula (VIIa)-(q)

The physical properties of each inkjet inks of Examples 1A to 4A were measured by the following evaluation methods. The results are presented in Table 5A.

Note that, the viscosity and pH of the ink were measured in the same manner as in Examples 1 to 22 and Comparative Examples 1 to 9.

Moreover, the dynamic surface tension of the inkjet ink, and the viscosity of the inkjet ink after moisture evaporation were measured in the following manner.

<Measurement of Dynamic Surface Tension of Ink>

The dynamic surface tension of each of the prepared inks was measured by means of SITA_DynoTester (available from SITA) at 25° C. with the surface bubble lifetime of 15 ms as in the maximum bubble pressure method.

<Measurement of Viscosity after Moisture Evporation>

The inks of Examples and Comparative Examples were each placed in a glass dish having an opening diameter of 33 mm, weight and collected by 2.5 g by means of a precise top dish electric balance capable of measuring up to 4 digits from the decimal point. Next, the ink was stored in a thermohydrostat (ModelPL-3 KP, manufactured by ESPEC) set at the temperature of 23° C.±0.5° C., and the humidity of 15%±5% RH under normal pressure, and each sample was taken out every 30 minutes to measure the mass and viscosity of the remaining ink. This procedure was continued for 5 hours. Next, the moisture evaporation rate and the viscosity of the remaining ink when the moisture was evaporated were plotted on a graph, and the viscosity of the ink when the moisture evaporation rate was 30% was read. The judgement standards for the viscosity of the ink after the moisture evaporation are described below.

[Viscosity when the moisture evaporation rate was 30%]
A: lower than 100 mPa·s
B: 100 mPa·s to 500 mPa·s
C: higher than 500 mPa·s The viscosity of the remaining ink was measured by means of a viscometer (RE-550L, manufactured by Toki Sangyo Co., Ltd.) at 25° C.

Moisture evaporation rate (% by mass)=(1−mass of the remaining ink/mass of the ink before moisture evaporation)×100

Note that, the evaporated component from the ink was assumed to be all water.

TABLE 5A

| | Physical properties of Ink | | | |
| --- | --- | --- | --- | --- |
| | Viscosity (mPa·s) | pH | 15 ms Dynamic surface tension (mN/m) | Viscosity after moisture evaporation "30% of moisture evaporated" (mPa·s) |
| Ex. 1A | 7.8 | 9.4 | 33.2 | A |
| Ex. 2A | 8.6 | 9.6 | 33.7 | A |
| Ex. 3A | 9.7 | 9.3 | 34.1 | A |
| Ex. 4A | 7.6 | 9.3 | 32.7 | A |
| Ex. 5A | 7.9 | 9.4 | 32.9 | A |
| Ex. 6A | 7.9 | 9.4 | 34.6 | A |
| Ex. 7A | 8.5 | 9.7 | 34.7 | B |
| Ex. 8A | 7.9 | 9.5 | 32.6 | A |
| Ex. 9A | 7.7 | 9.2 | 29.9 | A |
| Ex. 10A | 8.2 | 9.1 | 37.9 | A |
| Ex. 11A | 8.1 | 9.6 | 33.4 | A |
| Ex. 12A | 10.6 | 9.7 | 33.5 | A |
| Ex. 13A | 9.9 | 9.5 | 34.8 | B |
| Ex. 14A | 8.4 | 9.3 | 30.1 | A |

—Ink Jetting Step (Image Forming Step)—

In the environment adjusted to 23° C.±0.5° C., and 50%±5% RH, an inkjet recording device (IPSiO GXe-5500, manufactured by Ricoh Company Limited) was set to give the same deposition amount on recording media (MyPaper, manufactured by Ricoh Company Limited) by varying the driving voltage of a piezoelectric element to give the same ejection amount of the ink. Next, the printing mode of the inkjet recording device was set to "Plain Paper-High Speed" and then images were formed.

The inkjet inks of Examples 1A to 14A were evaluated by the following methods. The results are presented in Table 6A.

The image density, smearing and fixing ability, and ink depositions on a maintenance device were evaluated in the manners described below.

Note that, the evaluations on the curled amount, ejection stability, and ink storage stability were carried out in the same manner as in Examples 1 to 22 and Comparative Examples 1 to 9.

<Image Density>

A chart including a 64-point symbol "■" produced using Microsoft Word 2000 was printed on MyPaper (manufactured by Ricoh Company Limited), the color in the "■"

portions on a printed surface was measured by X-Rite939, and the result was evaluated based on the following evaluation criteria. As for the printing mode, the "Plain Paper—Standard High Speed" mode was changed to the "No Color Correction" mode in user settings for plain paper by using a driver that accompanied a printer.

[Evaluation Criteria]

A: Black, 1.25 or higher

Yellow, 0.80 or higher

Magenta, 1.00 or higher

Cyan, 1.05 or higher

B: Black, 1.20 or higher but lower than 1.25

Yellow, 0.75 or higher but lower than 0.80

Magenta, 0.95 or higher but lower than 1.00

Cyan, 1.00 or higher but lower than 1.05

C: Black, 1.15 or higher but lower than 1.20

Yellow, 0.70 or higher but lower than 0.75

Magenta, 0.90 or higher but lower than 0.95

Cyan, 0.95 or higher but lower than 1.00

D: Black, lower than 1.15

Yellow, lower than 0.70

Magenta, lower than 0.90

Cyan, lower than 0.95

<Smearing and Fixing Ability>

A chart including a 64-point symbol "■" produced using Microsoft Word 2000 was printed on MyPaper (manufactured by Ricoh Company Limited) in the same manner as in the evaluation for image density. Next, the resulting print was dried for 24 hours in the environment having the temperature of 23° C.±2° C., relative humidity of 50%±15%. The "■" portion on the printed surface was rubbed, by 10 returns, with JIS L0803 Cotton No. 3 adhered to a CM-1 clock meter with a double-sided tape. Thereafter, the ink deposition on the cotton cloth was measured by X-Rite939 (manufactured by X-Rite), the density of the ink deposited part from which the ground color of the cotton cloth had been deducted was judged based on the following evaluation criteria.

[Evaluation Criteria 1] "Plain Paper-High Speed Mode"

A: lower than 0.01

B: 0.01 or higher but lower than 0.025

C: 0.025 or higher but lower than 0.05 (threshold for practical application)

D: 0.05 or higher

<Ink Deposition in Maintainance Device>

—Ink Jetting Step (Image Forming Step)—

In the environment adjusted to 28° C.±0.5° C., and 15%±5% RH, an inkjet recording device (IPSiO GXe-5500, manufactured by Ricoh Company Limited) was used, and a driving voltage of a piezoelectric element was varied to give the same ejection amount of the ink, followed by performing a head cleaning operation continuously 10 times every 1 hour. After performing this operation for 10 hours, i.e. performing head cleaning 100 times in total, the device was left to stand for 12 hours, and then the existence of any ink deposition on a wiper portion of the maintenance device and on wire cleaner portion thereof was visually observed.

[Evaluation Criteria]

I: no deposition of the ink was observed

II: a slight amount of deposition of the ink was observed

III: depositions of the ink were observed

TABLE 6A

| | Image density | Curl evaporation | | Ejection stability | Storage stability | Smear, Fixing ability | Ink deposition in maintaining device |
|---|---|---|---|---|---|---|---|
| | | Just after printing | One day after printing | | | | |
| Ex. 1A | B | B | A | I | I | A | I |
| Ex. 2A | B | B | A | I | I | A | I |
| Ex. 3A | B | B | A | II | I | A | I |
| Ex. 4A | B | B | A | I | I | A | I |
| Ex. 5A | B | B | A | I | I | A | I |
| Ex. 6A | B | A | A | I | I | A | I |
| Ex. 7A | B | A | A | I | I | A | II |
| Ex. 8A | B | B | A | I | I | A | I |
| Ex. 9A | A | B | A | I | I | A | I |
| Ex. 10A | C | B | B | I | I | B | I |
| Ex. 11A | B | B | A | I | I | C | I |
| Ex. 12A | B | B | A | II | I | A | I |
| Ex. 13A | B | B | A | I | I | A | I |
| Ex. 14A | A | B | A | I | I | A | I |

Next, the prepared inkjet ink of Example 1A was used on the recording sheets (1) to (5) which were the same as those in Examples 1 to 22 and Comparative Examples 1 to 9, and the evaluation on the image quality was carried out in the following manners.

<Image Quality Evaluation>

Using the inkjet ink of Example 1A, images were printed on the recording sheets (1) to (5) by means of an inkjet printer (IPSiO GXe-5500, manufactured by Ricoh Company Limited) with setting the "Gloss Paper—High Quality Print" mode with "No Color Correction," and the resulted image was evaluated in terms of the image quality. The results are presented in Table 7A.

The image density, cockling, and smearing and fixing ability were evaluated in the following manner.

Note that, the beading and spur marks were evaluated in the same manner as in Examples 1 to 22 and Comparative Examples 1 to 9.

<Image Density>

A chart including a 64-point symbol "■" produced using Microsoft Word 2000 was printed on each recording sheet.

The color in the "■" portions on a printed surface was measured by X-Rite939, and the result was evaluated based on the following evaluation criteria. As for the printing mode, the "Gloss Paper—High Quality Print" mode was changed to have "No Color Correction" in user settings for plain paper by using a driver that accompanied a printer.

[Evaluation Criteria 1]—"Gloss Paper-High Quality Print Mode"

A: Black, 2.0 or higher

B: Black, 1.9 or higher but lower than 2.0

C: Black, 1.8 or higher but lower than 1.9

D: Black, lower than 1.8

<Cockling>

A chart including a monocolor solid image "■■■" in the size of 3 cm×15 cm produced using Microsoft Word 2000 was printed on each recording sheet. Just after the image formation with the inkjet ink, an occurrence of cockling was visually evaluated, and whether the transport failure would occur in the following step was judged based on the following evaluation criteria.

As for the printing mode, the "Gloss Paper—High Quality Print" mode was changed to have "No Color Correction" in user settings for plain paper by using a driver that accompanied a printer.

[Evaluation Criteria]

A: No cockling occurred (no problem in transporting).
B: Cockling slightly occurred (no problem in transporting).
C: Cockling occurred (no significant problem in transporting).
D: Cockling occurred significantly (a problem in transporting).

<Smearing, Fixing Ability>

In the same manner as in the evaluation of the image density, a chart including a 64-point symbol "■" produced using Microsoft Word 2000 was printed on each recording sheet.

Next, the resulted print was dried for 24 hours at the temperature of 23° C.±2° C., and the humidity of 50%±15% RH. The "■" portion on the printed surface was rubbed, by 10 returns, with JIS L0803 Cotton No. 3 adhered to a CM-1 clock meter with a double-sided tape. Thereafter, the ink deposition on the cotton cloth was measured by X-Rite939 (manufactured by X-Rite), the density of the ink deposited part from which the ground color of the cotton cloth had been deducted was judged based on the following evaluation criteria.

[Evaluation Criteria 1]—"Gloss Paper-High Quality Print Mode"

A: lower than 0.05
B: 0.05 or higher but lower than 0.1
C: 0.1 or higher but lower than 0.15 (threshold for practical use)
D: 0.15 or higher

TABLE 6A

| | Image density | Beading | Cockling | Spur marks | Smearing, fixing ability |
|---|---|---|---|---|---|
| Recording sheet (1) | A | 5 | A | 3 | B |
| Recording sheet (2) | A | 5 | A | 3 | B |
| Recording sheet (3) | B | 5 | B | 3 | B |
| Recording sheet (4) | D | 5 | B | 3 | A |
| Recording sheet (5) | N/A | 1 | A | 1 | D |

Note that, the data for the image density of the recording sheet (5) was not available because the recording sheet (5) could not be dried.

Preparation Example 1B

Preparation of Surface-Modified Black Pigment Dispersion Liquid 1

In the environment of room temperature, 100 g of Black Pearls® 1000 (carbon black having the BET surface area of 343 m²/g and DBPA of 105 mL/100 g) available from Cabot Corporation, 100 mmol of sulfanilic acid, and 1 L of ion-exchanged highly pure water were mixed by means of Silverson Mixer (6,000 rpm). In the case where the pH of the obtained slurry was higher than 4, 100 mmol of nitric acid was added. Thirty minutes later, to the resulting slurry, sodium nitrite (100 mmol) dissolved in a small amount of ion-exchanged highly pure water was gradually added. The resultant was heated to 60° C. with stirring, to thereby react for 1 hour. As a result, a modified pigment in which sulfanilic acid had been added to the carbon black was generated. Subsequently, pH of the resultant was adjusted to 9 with 10% by mass tetrabutyl ammonium hydroxide solution (methanol solution), to thereby obtain a modified dispersion liquid in 30 minutes time. The dispersion liquid containing the pigment bonded to at least one sulfanilic acid group or sulfanilic acid tetrabutyl ammonium salt group and ion-exchanged highly pure water were used and subjected to ultrafiltration with a permeable membrane, and the resultant was further subjected to ultrasonic dispersion to thereby obtain a modified pigment dispersion liquid the pigment solid content of which had been concentrated to 20% by mass. The degree of the surface treatment was 0.75 mmol/g, and the volume average particle diameter ($D_{50}$) as measured by the particle size distribution measuring device (NANOTRACK UPA-EX150, manufactured by Nikkiso Co., Ltd.) was 120 nm.

Preparation Example 2B

Preparation of Surface-Modified Black Pigment Dispersion Liquid 2

ProcessAll 4HV Mixer (4 L) was charged with 500 g of Black Pearls® 880 (carbon black having BET surface area of 220 m²/g, and DBPA of 105 mL/100 g) available from Cabot Corporation, 1 L of ion-exchanged highly pure water, and 1 mol of 4-amino benzoic acid. Subsequently, the resulting mixture was mixed strongly at 300 rpm for 10 minutes, with heating to 60° C. To this, 20% by mass of a sodium nitrite aqueous solution [1 mole equivalent to 4-amino benzoic acid] was added over 15 minutes. The resulting mixture was mixed and stirred for 3 hours with heating to 60° C. The reactant was taken out while diluting with 750 mL of ion-exchanged highly pure water. Subsequently, pH of the resultant was adjusted to 9 with 10% by mass tetrabutyl ammonium hydroxide solution (methanol solution), to thereby obtain a modified dispersion liquid in 30 minutes time. The dispersion liquid containing the pigment bonded to at least one amino benzoic acid group or amino benzoic acid tetrabutyl ammonium salt group and ion-exchanged highly pure water were, used and subjected to ultrafiltration with a permeable membrane, and the resultant was further subjected to ultrasonic dispersion to thereby obtain a modified pigment dispersion liquid the pigment solid content of which had been concentrated to 20% by mass. The degree of the surface treatment was 0.5 mmol/g, and the volume average particle diameter ($D_{50}$) as measured by the particle size distribution measuring device (NANOTRACK UPA-EX150, manufactured by Nikkiso Co., Ltd.) was 104 nm.

Preparation Example 3B

Preparation of Surface-Modified Black Pigment Dispersion Liquid 3

ProcessAll 4HV Mixer (4 L) was charged with 500 g of Black Pearls® 880 (carbon black having BET surface area of 220 m²/g, and DBPA of 105 mL/100 g) available from Cabot Corporation, 1 L of ion-exchanged highly pure water, and 175 mmol of 4-amino benzoic acid. Subsequently, the resulting mixture was mixed strongly at 300 rpm for 10 minutes, with heating to 60° C. To this, 20% by mass of a sodium nitrite aqueous solution [175 mmole equivalent to 4-amino benzoic acid] was added over 15 minutes. The resulting mixture was mixed and stirred for 3 hours with heating to 60° C. The reactant was taken out while diluting with 750 mL of ion-exchanged highly pure water. Subsequently, pH of the resultant was adjusted to 9 with 10% by mass tetraethyl ammonium hydroxide aqueous solution, to thereby obtain a modified dispersion liquid in 30 minutes time. The dispersion liquid containing the pigment bonded to at least one amino benzoic acid group or amino benzoic acid tetraethyl ammonium salt group and ion-exchanged highly pure water were used and subjected to ultrafiltration with a permeable membrane, and the resultant was further subjected to ultrasonic dispersion to thereby obtain a modified pigment dispersion liquid the pigment solid content of which had been concentrated to 20% by mass. The degree of the surface treatment was 0.35 mmol/g, and the volume average particle diameter ($D_{50}$) as measured by the particle size distribution measuring device (NANOTRACK UPA-EX150, manufactured by Nikkiso Co., Ltd.) was 114 nm.

Preparation Example 4B

Preparation of Surface-Modified Black Pigment Dispersion Liquid 4

Self-dispersible carbon black Aqua-Black 162 (manufactured by Tokai Carbon Co., Ltd., the pigment solid content: 19.2% by mass) pigment dispersion liquid (1 kg) was subjected to purification by deposition of acid with a 0.1N HCl aqueous solution. Subsequently, pH of the resultant was adjusted to 9 with a 40% by mass benzyltrimethyl ammonium hydroxide solution (methanol solution), to thereby obtain a modified dispersion liquid in 30 minutes time. The dispersion liquid containing the pigment bonded to at least one carboxylic acid group or caroboxylic acid benzyltrimethyl ammonium salt group and ion-exchanged highly pure water were used and subjected to ultrafiltration with a permeable membrane, and the resultant was further subjected to ultrasonic dispersion to thereby obtain a modified pigment dispersion liquid the pigment solid content of which had been concentrated to 20% by mass. The volume average particle diameter ($D_{50}$) as measured by the particle size distribution measuring device (NANOTRACK UPA-EX150, manufactured by Nikkiso Co., Ltd.) was 100 nm.

Preparation Example 5B

Preparation of Surface-Modified Black Pigment Dispersion Liquid 5

SENSIJET Black SDP2000 (the pigment solid content: 14.5% by mass) pigment dispersion liquid (1 kg) available from Sensient Technologies Corporation was subjected to purification by deposition of acid with a 0.1N HCl aqueous solution. Subsequently, pH of the resultant was adjusted to 9 with a 10% by mass tetrabutyl ammonium hydroxide solution (methanol solution), to thereby obtain a modified dispersion liquid in 30 minutes time. The dispersion liquid containing the pigment bonded to at least one carboxylic acid group, sulfonic acid group, carboxylic acid tetrabutyl ammonium salt group, or sulfonic acid tetrabutyl ammonium salt group and ion-exchanged highly pure water were used and subjected to ultrafiltration with a permeable membrane, and the resultant was further subjected to ultrasonic dispersion to thereby obtain a modified pigment dispersion liquid the pigment solid content of which had been concentrated to 20% by mass. The volume average particle diameter ($D_{50}$) as measured by the particle size distribution measuring device (NANOTRACK UPA-EX150, manufactured by Nikkiso Co., Ltd.) was 120 nm.

Preparation Example 6B

Preparation of Surface-Modified Magenta Pigment Dispersion Liquid 1

SMART Magenta 3122BA (surface-treated C.I. Pigment Red 122 dispersion liquid, the pigment solid content: 14.5% by mass) pigment dispersion liquid (1 kg) available from Sensient Technologies Corporation was subjected to purification by deposition of acid with a 0.1N HCl aqueous solution. Subsequently, pH of the resultant was adjusted to 9 with a 10% by mass tetraethyl ammonium hydroxide aqueous solution, to thereby obtain a modified dispersion liquid in 30 minutes time. The dispersion liquid containing the pigment bonded to at least one amino benzoic acid group or amino benzoic acid tetraethyl ammonium salt group and ion-exchanged highly pure water were used and subjected to ultrafiltration with a permeable membrane, and the resultant was further subjected to ultrasonic dispersion to thereby obtain a modified pigment dispersion liquid the pigment solid content of which had been concentrated to 20% by mass. The volume average particle diameter ($D_{50}$) as measured by the particle size distribution measuring device (NANOTRACK UPA-EX150, manufactured by Nikkiso Co., Ltd.) was 104 nm.

Preparation Example 7B

Preparation of Surface-Treated Cyan Pigment Dispersion Liquid 1

SMART Cyan 3154BA (surface-treated C.I. Pigment Blue 15:4 dispersion liquid, the pigment solid content: 14.5% by mass) pigment dispersion liquid (1 kg) available from Sensient Technologies Corporation was subjected to purification by deposition of acid with a 0.1N HCl aqueous solution. Subsequently, pH of the resultant was adjusted to 9 with a 40% by mass benzyltrimethyl ammonium hydroxide solution (methanol solution), to thereby obtain a modified dispersion liquid in 30 minutes time. The dispersion liquid containing the pigment bonded to at least one amino benzoic acid group or amino benzoic acid benzyltrimethyl ammonium salt group and ion-exchanged highly pure water were used and subjected to ultrafiltration with a permeable membrane, and the resultant was further subjected to ultrasonic dispersion to thereby obtain a modified pigment dispersion liquid the pigment solid content of which had been concentrated to 20% by mass. The volume average particle diameter ($D_{50}$) as measured by the particle size distribution measuring device (NANOTRACK UPA-EX150, manufactured by Nikkiso Co., Ltd.) was 116 nm.

Preparation Example 8B

Preparation of Surface-Modified Yellow Pigment Dispersion Liquid 1

SMART Yellow 3074BA (surface-treated C.I. Pigment Yellow 74 dispersion liquid, the pigment solid content: 14.5% by mass) pigment dispersion liquid (1 kg) available from Sensient Technologies Corporation was subjected to purification by deposition of acid with a 0.1N HCl aqueous solution. Subsequently, pH of the resultant was adjusted to 9 with 10% by mass tetrabutyl ammonium hydroxide solution (methanol solution), to thereby obtain a modified dispersion liquid in 30 minutes time. The dispersion liquid containing the pigment bonded to at least one amino benzoic acid group or amino benzoic acid tetrabutyl ammonium salt group and ion-exchanged highly pure water were used and subjected to ultrafiltration with a permeable membrane, and the resultant was further subjected to ultrasonic dispersion to thereby obtain a modified pigment dispersion liquid the pigment solid content of which had been concentrated to 20% by mass. The volume average particle diameter ($D_{50}$) as measured by the particle size distribution measuring device (NANOTRACK UPA-EX150, manufactured by Nikkiso Co., Ltd.) was 145 nm.

Examples 1B to 13B

Preparation of Inkjet Ink

First, as presented in Tables 1B to 3B, organic solvents (wetting agent), penetrating agents, a surfactant, an antifungal agent, and water were mixed and the resulting mixture was stirred for 1 hour to homogeneously mix the mixture. Depending on the mixture, a water-dispersible resin was further added, and stirred for 1 hour. Then, a water-dispersible colorant (a pigment dispersion liquid), a defoaming agent, and a pH regulator were added and the mixture was stirred for 1 hour. The resulting dispersion liquid was subjected to pressure filtration with a polyvinylidene fluoride membrane filter having the average pore diameter of 1.2 μm to remove coarse particles or dusts, to thereby prepare each inkjet ink of Examples 1B to 13B.

TABLE 1B

| | Material (% by mass) | Ex. 1B | Ex. 2B | Ex. 3B | Ex. 4B | Ex. 5B |
|---|---|---|---|---|---|---|
| Water-dispersible pigment (pigment dispersion liquid) | Surface-modified black pigment dispersion liquid 1 (Preparation Ex. 1B) | 37.50 | — | — | — | — |
| | Surface-modified black pigment dispersion liquid 2 (Preparation Ex. 2B) | — | 37.50 | — | — | — |
| | Surface-modified black pigment dispersion liquid 3 (Preparation Ex. 3B) | — | — | 37.50 | — | — |
| | Surface-modified black pigment dispersion liquid 4 (Preparation Ex. 4B) | — | — | — | 37.50 | — |
| | Surface-modified black pigment dispersion liquid 5 (Preparation Ex. 5B) | — | — | — | — | 37.50 |
| | Surface-modified magenta pigment dispersion liquid 1 (Preparation Ex. 6B) | — | — | — | — | — |
| | Surface-modified cyan pigment dispersion liquid 1 (Preparation Ex. 7B) | — | — | — | — | — |
| | Surface-modified yellow pigment dispersion liquid 1 (Preparation Ex. 8B) | — | — | — | — | — |
| | SENSIJET SMART Magenta 3122BA (amino benzoic acid Na salt) | — | — | — | — | — |
| | SENSIJET SMART Cyan 3154BA (amino benzoic acid Na salt) | — | — | — | — | — |
| | SENSIJET SMART Yellow 3074BA (amino benzoic acid Na salt) | — | — | — | — | — |
| | SENSIJET Black SDP2000 (carboxylic acid Na salt, sulfonic acid Na salt) | — | — | — | — | — |
| | Carbon black pigment-containing polymer particle dispersion liquid (Preparation Ex. 9B) | — | — | — | — | — |
| Water-dispersible resin | Acryl-silicone resin emulsion | 5.00 | 5.00 | 5.00 | 2.50 | — |
| | Fluororesin emulsion | — | — | — | — | 2.00 |
| Water-soluble organic solvent | Amide compound of formula (1) | 10.00 | — | — | 10.00 | 10.00 |
| | Amide compound of formula (2) | — | 10.00 | — | — | — |
| | Amide compound of formula (3) | — | — | 10.00 | — | — |
| | Compound of formula (8) | 10.00 | — | 10.00 | 10.00 | — |
| | Compound of formula (10) | — | 10.00 | — | — | 10.00 |
| | Amide compound of formula (V) | 10.00 | 7.50 | — | 10.00 | 10.00 |
| Wetting agent | Glycerin | 10.00 | 10.00 | 10.00 | 10.00 | 10.00 |
| | 1,3-butanediol | — | — | 7.50 | — | — |
| Penetrant | 2-ethyl-1,3-hexanediol | 2.00 | 2.00 | 2.00 | 2.00 | — |
| | 2,2,4-trimethyl-1,3-pentanediol | — | — | — | — | 2.00 |
| Surfactant | KF-643 | — | — | — | — | — |
| | Zonyl FS-300 | — | — | — | 2.50 | — |
| | Compound of formula (VIIa)-(q) | 0.50 | 0.20 | 0.10 | — | 0.30 |
| | Surfynol 104E | — | — | — | — | — |
| | Softanol EP-7025 | — | — | — | — | — |
| Antifungal | Proxel GXL | 0.05 | 0.05 | 0.05 | 0.05 | 0.05 |
| Defoamer | 2,4,7,9-tetramethyldecane-4,7-diol | 0.50 | — | — | — | 0.40 |
| | 2,5,8,11-tetramethyldodecane-5,8-diol | — | 0.40 | 0.40 | 0.40 | — |

TABLE 1B-continued

| | Material (% by mass) | Ex. 1B | Ex. 2B | Ex. 3B | Ex. 4B | Ex. 5B |
|---|---|---|---|---|---|---|
| pH regulator | 2-amino-2-ethyl-1,3-propanediol | 0.20 | 0.20 | 0.20 | 0.10 | 0.10 |
| | Pure water | Bal. | Bal. | Bal. | Bal. | Bal. |
| | Total (% by mass) | 100 | 100 | 100 | 100 | 100 |

TABLE 2B

| | Material (% by mass) | Ex. 6B | Ex. 7B | Ex. 8B | Ex. 9B | Ex. 10B |
|---|---|---|---|---|---|---|
| Water-dispersible pigment (pigment dispersion liquid) | Surface-modified black pigment dispersion liquid 1 (Preparation Ex. 1B) | 37.50 | 37.50 | 37.50 | — | — |
| | Surface-modified black pigment dispersion liquid 2 (Preparation Ex. 2B) | — | — | — | — | — |
| | Surface-modified black pigment dispersion liquid 3 (Preparation Ex. 3B) | — | — | — | — | — |
| | Surface-modified black pigment dispersion liquid 4 (Preparation Ex. 4B) | — | — | — | — | — |
| | Surface-modified black pigment dispersion liquid 5 (Preparation Ex. 5B) | — | — | — | — | — |
| | Surface-modified magenta pigment dispersion liquid 1 (Preparation Ex. 6B) | — | — | — | 37.50 | — |
| | Surface-modified cyan pigment dispersion liquid 1 (Preparation Ex. 7B) | — | — | — | — | 22.50 |
| | Surface-modified yellow pigment dispersion liquid 1 (Preparation Ex. 8B) | — | — | — | — | — |
| | SENSIJET SMART Magenta 3122BA (amino benzoic acid Na salt) | — | — | — | — | — |
| | SENSIJET SMART Cyan 3154BA (amino benzoic acid Na salt) | — | — | — | — | — |
| | SENSIJET SMART Yellow 3074BA (amino benzoic acid Na salt) | — | — | — | — | — |
| | SENSIJET Black SDP2000 (carboxylic acid Na salt, sulfonic acid Na salt) | — | — | — | — | — |
| | Carbon black pigment-containing polymer particle dispersion liquid (Preparation Ex. 9B) | — | — | — | — | — |
| Water-dispersible resin | Acryl-silicone resin emulsion | 5.00 | 5.00 | 5.00 | 5.00 | 5.00 |
| | Fluororesin emulsion | — | — | — | — | — |
| Water-soluble organic solvent | Amide compound of formula (1) | 10.00 | 10.00 | 10.00 | 10.00 | 10.00 |
| | Amide compound of formula (2) | — | — | — | — | — |
| | Amide compound of formula (3) | — | — | — | — | — |
| | Compound of formula (8) | 10.00 | 10.00 | 10.00 | — | 20.00 |
| | Compound of formula (10) | — | — | — | 10.00 | — |
| | Amide compound of formula (V) | 10.00 | 10.00 | 10.00 | 10.00 | 10.00 |
| Wetting agent | Glycerin | 10.00 | 10.00 | 10.00 | 10.00 | 10.00 |
| | 1,3-butanediol | — | — | — | — | — |
| Penetrant | 2-ethyl-1,3-hexanediol | 2.00 | 2.00 | 2.00 | 2.00 | 2.00 |
| | 2,2,4-trimethyl-1,3-pentanediol | — | — | — | — | — |
| Surfactant | KF-643 | 1.00 | — | — | — | — |
| | Zonyl FS-300 | — | — | — | — | 2.50 |
| | Compound of formula (VIIa)-(q) | — | — | — | — | — |
| | Surfynol 104E | — | 1.00 | — | 2.00 | — |
| | Softanol EP-7025 | — | — | 2.00 | — | — |
| Antifungal | Proxel GXL | 0.05 | 0.05 | 0.05 | 0.05 | 0.05 |
| Defoamer | 2,4,7,9-tetramethyldecane-4,7-diol | 0.40 | 0.40 | 0.40 | 0.40 | 0.40 |
| | 2,5,8,11-tetramethyldodecane-5,8-diol | — | — | — | — | — |
| pH regulator | 2-amino-2-ethyl-1,3-propanediol | 0.20 | 0.20 | 0.20 | 0.20 | 0.20 |
| | Pure water | Bal. | Bal. | Bal. | Bal. | Bal. |
| | Total (% by mass) | 100 | 100 | 100 | 100 | 100 |

TABLE 3B

| | Material (% by mass) | Ex. 11B | Ex. 12B | Ex. 13B |
|---|---|---|---|---|
| Water-dispersible pigment (pigment dispersion liquid) | Surface-modified black pigment dispersion liquid 1 (Preparation Ex. 1B) | — | 37.50 | 37.50 |
| | Surface-modified black pigment dispersion liquid 2 (Preparation Ex. 2B) | — | — | — |
| | Surface-modified black pigment dispersion liquid 3 (Preparation Ex. 3B) | — | — | — |
| | Surface-modified black pigment dispersion liquid 4 (Preparation Ex. 4B) | — | — | — |
| | Surface-modified black pigment dispersion liquid 5 (Preparation Ex. 5B) | — | — | — |
| | Surface-modified magenta pigment dispersion liquid 1 (Preparation Ex. 6B) | — | — | — |
| | Surface-modified cyan pigment dispersion liquid 1 (Preparation Ex. 7B) | — | — | — |
| | Surface-modified yellow pigment dispersion liquid 1 (Preparation Ex. 8B) | 22.50 | — | — |
| | SENSIJET SMART Magenta 3122BA (amino benzoic acid Na salt) | — | — | — |
| | SENSIJET SMART Cyan 3154BA (amino benzoic acid Na salt) | — | — | — |
| | SENSIJET SMART Yellow 3074BA (amino benzoic acid Na salt) | — | — | — |
| | SENSIJET Black SDP2000 (carboxylic acid Na salt, sulfonic acid Na salt) | — | — | — |
| | Carbon black pigment-containing polymer particle dispersion liquid (Preparation Ex. 9B) | — | — | — |
| Water-dispersible resin | Acryl-silicone resin emulsion | 5.00 | — | 5.00 |
| | Fluororesin emulsion | — | — | — |
| Water-soluble organic solvent | Amide compound of formula (1) | 10.00 | 10.00 | 10.00 |
| | Amide compound of formula (2) | — | — | — |
| | Amide compound of formula (3) | — | — | — |
| | Compound of formula (8) | 22.50 | 10.00 | 10.00 |
| | Compound of formula (10) | — | — | — |
| | Amide compound of formula (V) | 7.50 | 10.00 | 10.00 |
| Wetting agent | Glycerin | 12.00 | 10.00 | 10.00 |
| | 1,3-butanediol | — | — | — |
| Penetrant | 2-ethyl-1,3-hexanediol | 2.00 | 2.00 | — |
| | 2,2,4-trimethyl-1,3-pentanediol | — | — | — |
| Surfactant | KF-643 | — | 1.00 | 1.00 |
| | Zonyl FS-300 | — | — | — |
| | Compound of formula (VIIa)-(q) | 0.20 | — | — |
| | Surfynol 104E | — | — | — |
| | Softanol EP-7025 | — | — | — |
| Antifungal | Proxel GXL | 0.05 | 0.05 | 0.05 |
| Defoamer | 2,4,7,9-tetramethyldecane-4,7-diol | 0.40 | 0.40 | 0.60 |
| | 2,5,8,11-tetramethyldodecane-5,8-diol | — | — | — |
| pH regulator | 2-amino-2-ethyl-1,3-propanediol | 0.20 | 0.20 | 0.20 |
| | Pure water | Bal. | Bal. | Bal. |
| | Total (% by mass) | 100 | 100 | 100 |

The abbreviations in Tables 1B to 3B represents as follows.

SENSIJET SMART Magenta 3122BA: manufactured by Sensient Technologies Corporation (surface-treated pigment dispersion liquid)

SENSIJET SMART Cyan 3154BA: manufactured by Sensient Technologies Corporation (surface-treated pigment dispersion)

SENSIJET SMART Yellow 3074BA: manufactured by Sensient Technologies Corporation (surface-treated pigment dispersion)

SENSIJET Black SDP2000: manufactured by Sensient Technologies Corporation (surface-treated pigment dispersion)

Acryl-silicone resin emulsion: POLYSOL ROY6312, manufactured by Showa Highpolymer Co., Ltd., which has a solid content of 39.9% by mass, the average particle diameter of 171 nm, and the minimum film forming temperature (MFT) of 20° C.

Fluororesin emulsion A: LUMIFLON FE4300, manufactured by Asahi Glass Co., Ltd., having a solid content of 50% by mass, the average particle diameter of 150 nm, and MFT of 30° C. or lower KF-643: polyether-modified silicone compound (manufactured by Shin-Etsu Chemical Co., Ltd., having the active ingredient of 100% by mass)

Zonyl FS-300: polyoxyethylene perfluoroalkyl ether (manufactured by E.I. du Pont de Nemours and Company, having the active ingredient of 40% by mass)

Surfynol 104E: acetylene glycol compound (manufactured by Nissin Chemical Industry Co., Ltd., having the active ingredient of 50% by mass, containing ethylene glycol)

Softanol EP-7025: polyoxyalkylene alkyl ether (manufactured by Nippon Shokubai Co., Ltd., active ingredient: 100% by mass)

Proxel GXL: an antifungal agent having 1,2-benzisothiazolin-3-one as a main component (manufactured by Avecia Biologics Limited, having the active ingredient of 20% by mass, containing dipropylene glycol)

Amide compound of formula (1): amide compound represented by the following formula (1)

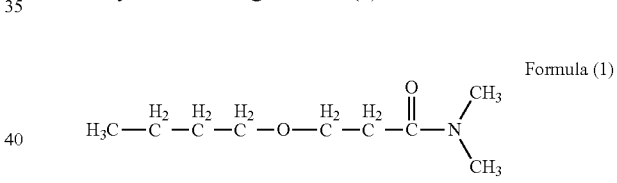

Amide compound of formula (2): amide compound represented by the following formula (2)

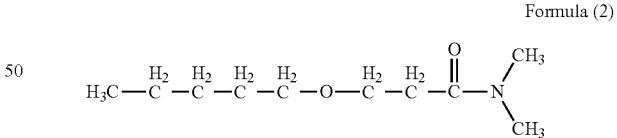

Amide compound of formula (3): amide compound represented by the following formula (3)

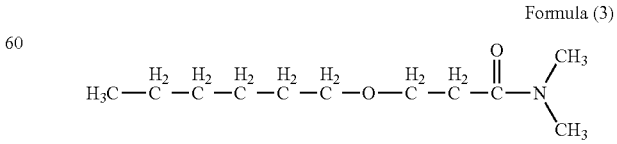

Compound of formula (8): compound represented by the following formula (8)

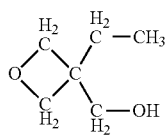

Formula (8)

Compound of formula (10): compound represented by the following formula (10)

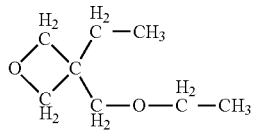

Formula (10)

Amide compound of formula (V): amide compound represented by the following structural formula (V)

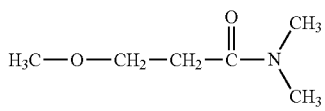

Structural Formula (V)

Compound of formula (VIIa)-(q): compound represented by the following general formula (VIIa)-(q)

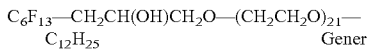

General Formula (VIIa)-(q)

The physical properties of each of the inkjet inks of Examples 1B to 13B were measured and evaluated in the following evaluation methods. The results are presented in Table 4B.

Note that, the measurements of the viscosity, pH, surface tension, and viscosity after moisture evaporation were carried out in the same manner as in Example 1A to 14A.

TABLE 4B

| | Physical properties of Ink | | | |
|---|---|---|---|---|
| | Viscosity (mPa·s) | pH | 15 ms Dynamic surface tension (mN/m) | Viscosity after moisture evaporation (30% moisture evaporation) (mPa·s) |
| Ex. 1B | 8.0 | 9.4 | 29.9 | A |
| Ex. 2B | 8.3 | 9.6 | 32.7 | A |
| Ex. 3B | 9.5 | 9.3 | 34.6 | A |
| Ex. 4B | 8.1 | 9.3 | 32.9 | A |
| Ex. 5B | 7.9 | 9.4 | 32.2 | A |
| Ex. 6B | 7.9 | 9.4 | 32.8 | A |
| Ex. 7B | 8.2 | 9.7 | 33.4 | A |
| Ex. 8B | 8.3 | 9.5 | 37.0 | A |
| Ex. 9B | 8.1 | 9.3 | 31.5 | A |
| Ex. 10B | 8.2 | 9.2 | 33.6 | A |
| Ex. 11B | 8.2 | 9.6 | 33.5 | A |
| Ex. 12B | 7.5 | 9.5 | 33.1 | A |
| Ex. 13B | 8.4 | 9.6 | 32.9 | A |

—Ink Jetting Step (Image Forming Step)—

In the environment adjusted to 23° C.±0.5° C., and 50%±5% RH, an inkjet recording device (IPSiO GXe-5500, manufactured by Ricoh Company Limited) was set to give the same deposition amount on recording media (MyPaper, manufactured by Ricoh Company Limited) by varying the driving voltage of a piezoelectric element to give the same ejection amount of the ink. Next, the printing mode of the inkjet recording device was set to "Plain Paper—High Speed" and then images were formed.

Next, Examples 1B to 14B were evaluated by the following evaluation methods. The results are presented in Table 5B.

Note that, the image density, curled amount, ejection stability, storage stability, smearing fixing ability, and ink deposition in the maintaining device were evaluated in the same manner as in Examples 1A to 14A.

TABLE 5B

| | | Curl evaluation | | | | | |
|---|---|---|---|---|---|---|---|
| | Image density | Just after printing | One day after printing | Ejection stability | Storage stability | Smearing, Fixing ability | Ink deposition on maintenance device |
| Ex. 1B | A | B | A | I | I | A | I |
| Ex. 2B | B | B | A | I | I | A | I |
| Ex. 3B | B | B | A | I | I | A | I |
| Ex. 4B | B | B | A | I | I | A | I |
| Ex. 5B | B | B | A | I | I | A | I |
| Ex. 6B | B | B | A | I | I | A | I |
| Ex. 7B | B | B | A | I | I | A | I |
| Ex. 8B | C | B | A | I | I | B | I |
| Ex. 9B | A | B | A | I | I | A | I |
| Ex. 10B | B | A | A | I | I | A | I |
| Ex. 11B | B | A | A | I | I | A | I |
| Ex. 12B | B | B | A | I | I | C | I |
| Ex. 13B | B | B | A | I | I | A | I |

The embodiments of the present invention are as follows:

<1> An inkjet ink, containing:
  water;
  an organic solvent;
  a surfactant; and
  a colorant,
wherein the organic solvent contains
  at least one polyhydric alcohol having an equilibrium moisture content of 30% by mass or higher at a temperature of 23° C. and humidity of 80% RH,
  at least an amide compound represented by the general formula (I), and
  at least one selected from the group consisting of compounds represented by the following general formulae (II) to (IV):

General Formula (I)

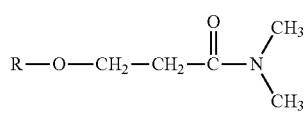

where R is a C4-C6 alkyl group,

General Formula (II)

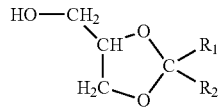

where $R_1$ is a hydrogen atom or a C1-C2 alkyl group, and $R_2$ is a C1-C4 alkyl group, General Formula (III)

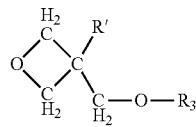

where R' is a C1-C2 alkyl group, and $R_3$ is a hydrogen atom, a C1-C8 alkyl group, a cyclic alkyl group, or an aromatic group, General Formula (IV)

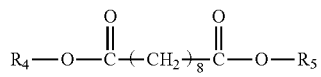

where $R_4$ and $R_5$ are both a C1-C8 alkyl group.

<2> The inkjet ink according to <1>, wherein the colorant is a colorant containing at least one functional group selected from the group consisting of —COOM, —SO$_3$M, —PO$_3$HM, —PO$_3$M$_2$, —CONM$_2$, —SO$_3$NM$_2$, —NH—C$_6$H$_4$—COOM, —NH—C$_6$H$_4$—SO$_3$M, —NH—C$_6$H$_4$—PO$_3$HM, —NH—C$_6$H$_4$—PO$_3$M$_2$, —NH—C$_6$H$_4$—CONM2, and —NH—C$_6$H$_4$—SO$_3$NM2, where M is a quaternary ammonium ion.

<3> The inkjet ink according to <1>, wherein the colorant is a modified pigment, which has been modified with a geminal bisphosphonic acid group or a geminal bisphosphonate group.

<4> The inkjet ink according to <3>, wherein the colorant is a modified pigment, which has been modified with a group represented by any of the following structural formula (1), (2), (3), or (4):

Structural Formula (1)

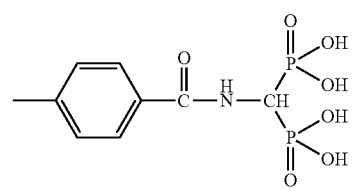

Structural Formula (2)

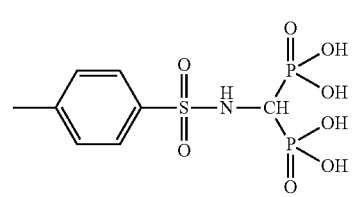

Structural Formula (3)

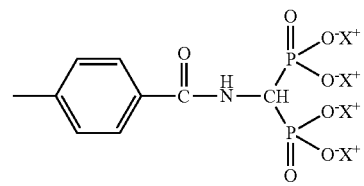

where $X^+$ is Li$^+$, K$^+$, Na$^+$, NH$_4^+$, N(CH$_3$)$_4^+$, N(C$_2$H$_5$)$_4^+$, N(C$_3$H$_7$)$_4^+$, or N(C$_4$H$_9$)$_4^+$, Structural Formula (4)

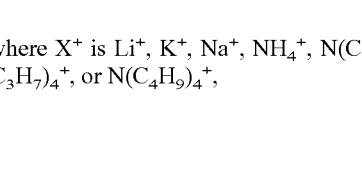

where $X^+$ is Li$^+$, K$^+$, Na$^+$, NH$_4^+$, N(CH$_3$)$_4^+$, N(C$_2$H$_5$)$_4^+$, N(C$_3$H$_7$)$_4^+$, or N(C$_4$H$_9$)$_4^+$.

<5> The inkjet ink according to any one of <1> to <4>, wherein the organic solvent contains the amide compound represented by the following structural formula (V):

Structural Formula (V)

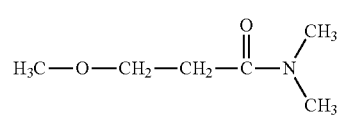

<6> The inkjet ink according to any one of <1> to <5>, wherein the colorant is a black pigment, a cyan pigment, a magenta pigment, a yellow pigment, or a mixture of the preceding pigments.

<7> The inkjet ink according to any one of <1> to <6>, wherein the surfactant contains at least one selected from the group consisting of a silicone surfactant, a fluorosurfactant, an acetylene glycol surfactant, and an acetylene alcohol surfactant.

<8> The inkjet ink according to any one of <1> to <7>, wherein the inkjet ink has a dynamic surface tension of 35 mN/m or lower at 25° C. and with a surface bubble lifetime of 15 ms in the maximum bubble pressure method.
<9> An inkjet recording method, containing:
applying stimuli to the inkjet ink as defined in any one of <1> to <8> to make the inkjet ink jet to thereby form an image on a recording medium,
wherein the stimuli is selected from heat, pressure, vibration, and light.
<10> An inkjet recording device, containing:
the inkjet ink as defined in any one of <1> to <8>; and
an ink jetting unit configured to apply stimuli to the ink to make the ink jet to thereby form an image on a recording medium,
wherein the stimuli is selected from heat, pressure, vibration, and light.

INDUSTRIAL APPLICABILITY

The inkjet ink of the present invention can form images of excellent image quality, particularly excellent image density, color saturation, and image fastness (e.g., water resistance and light fastness), on plain paper, and has excellent drying speed, correspondence to high speed printing, and ejection stability from nozzles, and is capable of forming high quality images. Accordingly, the inkjet ink of the present invention can be suitably used for an ink cartridge, ink recorded matter, an inkjet recording device, and an inkjet recording method.

Further, the inkjet ink of the present invention can form high quality images close to those of industrial printing with excellent drying properties and less occurrences of beading (unevenness in image density), when it is used on common printing paper (a recording medium having a low ink absorption, which contains a support, and a coating layer formed on at least one surface of the support, and to which an amount of pure water transferred as measured by a dynamic scanning absorptometer with contact duration of 100 ms is 1 mL/m² to 35 mL/m², and an amount of pure water transferred as measured with contact duration of 400 ms is 3 mL/m² to 40 mL/m²).

The inkjet recording device and inkjet recording method of the present invention can be applied to various recordings of the inkjet recording system, and for example, can be particularly suitably used as, or for an inkjet recording printer, a facsimile device, a photocopier, a printer-facsimile-photocopier compound device.

REFERENCE SIGNS LIST 1 paper feeding tray
2 pressure plate
3 recording paper
4 paper feeding roller
5 base
6 pressure plate spring
7 conveyance roller
8 conveyance guide
9 conveyance guide
10 platen
11 pinching roller
12 paper feeding roller for manual paper feeding
13 manual feeding tray
14 line-head
101 device main body
102 paper feeding tray
103 paper discharging tray
104 ink cartridge loading section
105 control unit
111 top cover
112 front face
115 front cover
131 guide rod
132 stay
133 carriage
134 recording head
135 sub-tank
141 paper loading section
142 paper
143 paper feeding roller
144 separation pad
145 guide
151 conveyance belt
152 re-counter roller
153 guide
154 pressing member
155 end pressurizing roller
156 charging roller
157 conveyance roller
158 tension roller
161 guide member
171 separation pawl
172 paper discharge roller
173 paper discharge roller
181 double-sided paper feed unit
182 manual paper feed unit
201 ink cartridge
241 ink bag
242 ink inlet
243 ink outlet
244 cartridge case
a rotational axis

The invention claimed is:
1. An inkjet ink, comprising:
water;
an organic solvent;
a surfactant; and
a colorant,
wherein the organic solvent comprises:
a polyhydric alcohol having an equilibrium moisture content of at least 30% by mass at a temperature of 23° C. and a relative humidity of 80%,
an amide compound of Formula (I):

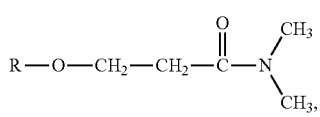

Formula (I)

where R is a C4-C6 alkyl group; and
at least one selected from the group consisting of compounds of Formulae (II) to (IV):

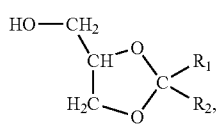

Formula (II)

where $R_1$ is a hydrogen atom or a C1-C2 alkyl group, and $R_2$ is a C1-C4 alkyl group;

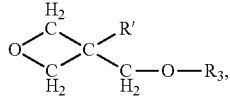
Formula (III)

where R' is a C1-C2 alkyl group, and $R_3$ is a hydrogen atom, a C1-C8 alkyl group, a cyclic alkyl group, or an aromatic group; and

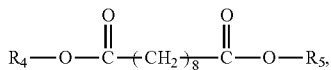
Formula (IV)

where both $R_4$ and $R_5$ are C1-C8 alkyl groups.

2. The inkjet ink according to claim 1,
wherein the colorant is a colorant comprising at least one functional group selected from the group consisting of —COOM, —SO$_3$M, —PO$_3$HM, —PO$_3$M$_2$, —CONM$_2$, —SO$_3$NM$_2$, —NH—C$_6$H$_4$—COOM, —NH—C$_6$H$_4$—SO$_3$M, —NH—C$_6$H$_4$—PO$_3$HM, —NH—C$_6$H$_4$—PO$_3$M$_2$, —NH—C$_6$H$_4$—CONM$_2$, and —NH—C$_6$H$_4$—SO$_3$NM$_2$, where M is a quaternary ammonium ion.

3. The inkjet ink according to claim 1,
wherein the colorant is a pigment modified with a geminal bisphosphonic acid or a geminal bisphosphonate.

4. The inkjet ink according to claim 3,
wherein the colorant is a pigment modified with a group of Formula (1), (2), (3), or (4):

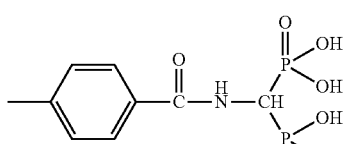
Formula (1)

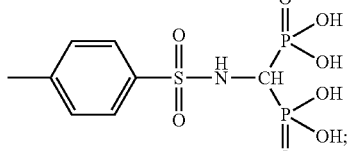
Formula (2)

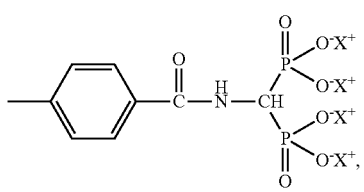
Formula (3)

where $X^+$ is Li$^+$, K$^+$, Na$^+$, NH$_4^+$, N(CH$_3$)$_4^+$, N(C$_2$H$_5$)$_4^+$, N(C$_3$H$_7$)$_4^+$, or N(C$_4$H$_9$)$_4^+$; and

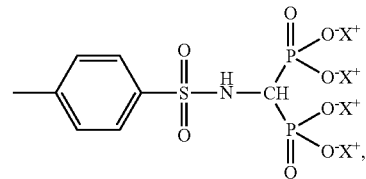
Formula (4)

where $X^+$ is Li$^+$, K$^+$, Na$^+$, NH$_4^+$, N(CH$_3$)$_4^+$, N(C$_2$H$_5$)$_4^+$, N(C$_3$H$_7$)$_4^+$, or N(C$_4$H$_9$)$_4^+$.

5. The inkjet ink according to claim 1,
wherein the organic solvent further comprises a compound of Formula (V):

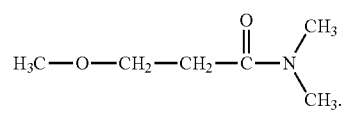
Formula (V)

6. The inkjet ink according to claim 1,
wherein the colorant is a black pigment, a cyan pigment, a magenta pigment, a yellow pigment, or a mixture thereof.

7. The inkjet ink according to claim 1,
wherein the surfactant comprises at least one selected from the group consisting of a silicone surfactant, a fluorosurfactant, an acetylene glycol surfactant, and an acetylene alcohol surfactant.

8. The inkjet ink according to claim 1,
wherein the inkjet ink has a dynamic surface tension of 35 mN/m or lower at 25° C. when a surface bubble lifetime is 15 ms measured by a maximum bubble pressure method.

9. An inkjet recording method, comprising:
applying a stimulus to an inkjet ink to make an inkjet ink jet, thereby forming an image on a recording medium,
wherein the stimulus is selected from the group consisting of heat, pressure, vibration, and light,
the inkjet ink comprises:
water;
an organic solvent;
a surfactant; and
a colorant,
wherein the organic solvent comprises
a polyhydric alcohol having an equilibrium moisture content of at least 30% by mass at a temperature of 23° C. and a relative humidity of 80%,
an amide compound of Formula (I):

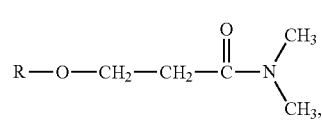
Formula (I)

where R is a C4-C6 alkyl group; and
at least one selected from the group consisting of compounds of Formulae (II) to (IV):

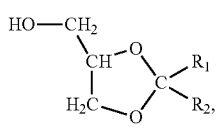

Formula (II)

where $R_1$ is a hydrogen atom or a C1-C2 alkyl group, and $R_2$ is a C1-C4 alkyl group;

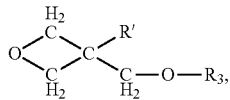

Formula (III)

where R' is a C1-C2 alkyl group, and $R_3$ is a hydrogen atom, a C1-C8 alkyl group, a cyclic alkyl group, or an aromatic group; and

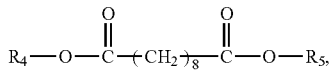

Formula (IV)

where both $R_4$ and $R_5$ are C1-C8 alkyl groups.

10. An inkjet recording device, comprising:
an inkjet ink; and
an ink jetting unit configured to apply a stimulus to the inkjet ink to make an ink jet, thereby forming an image on a recording medium,
wherein the stimulus is selected from the group consisting of heat, pressure, vibration, and light,
wherein the inkjet ink comprises:
water;
an organic solvent;
a surfactant; and
a colorant,
wherein the organic solvent comprises
a polyhydric alcohol having an equilibrium moisture content of 30% by mass or higher at a temperature of 23° C. and a relative humidity of 80%,
an amide compound of Formula (I):

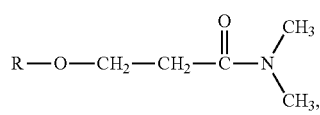

Formula (I)

where R is a C4-C6 alkyl group; and
at least one selected from the group consisting of compounds of Formulae (II) to (IV):

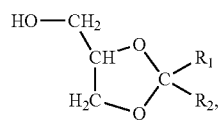

Formula (II)

where $R_1$ is a hydrogen atom or a C1-C2 alkyl group, and $R_2$ is a C1-C4 alkyl group;

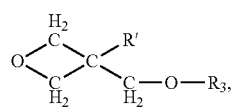

Formula (III)

where R' is a C1-C2 alkyl group, and $R_3$ is a hydrogen atom, a C1-C8 alkyl group, a cyclic alkyl group, or an aromatic group; and

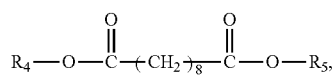

Formula (IV)

where both $R_4$ and $R_5$ are C1-C8 alkyl groups.

* * * * *